US010495277B2

(12) United States Patent
Suwa et al.

(10) Patent No.: US 10,495,277 B2
(45) Date of Patent: Dec. 3, 2019

(54) HEADLIGHT MODULE WITH TWO LIGHT GUIDES RECEIVING LIGHT FROM TWO LIGHT SOURCES

(71) Applicant: MITSUBISHI ELECTRIC CORPORATION, Tokyo (JP)

(72) Inventors: Masashige Suwa, Tokyo (JP); Ritsuya Oshima, Tokyo (JP); Keiji Nakamura, Tokyo (JP); Kuniko Kojima, Tokyo (JP); Muneharu Kuwata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/068,622

(22) PCT Filed: Jan. 10, 2017

(86) PCT No.: PCT/JP2017/000459
§ 371 (c)(1),
(2) Date: Jul. 6, 2018

(87) PCT Pub. No.: WO2017/122629
PCT Pub. Date: Jul. 20, 2017

(65) Prior Publication Data
US 2019/0011103 A1 Jan. 10, 2019

(30) Foreign Application Priority Data
Jan. 13, 2016 (JP) .................... 2016-004085

(51) Int. Cl.
*F21S 41/00* (2018.01)
*F21S 41/26* (2018.01)
(Continued)

(52) U.S. Cl.
CPC ............. *F21S 41/26* (2018.01); *F21S 41/143* (2018.01); *F21S 41/147* (2018.01);
(Continued)

(58) Field of Classification Search
CPC . B60Q 1/02; F21S 41/322; F21S 41/24; F21S 41/25–275
(Continued)

(56) References Cited

U.S. PATENT DOCUMENTS 5,601,354 A    2/1997 Horii et al.
6,561,656 B1 *  5/2003 Kojima ................ H04N 5/7441
                                                 348/E5.141
(Continued)

FOREIGN PATENT DOCUMENTS

JP     7-312103 A    11/1995
JP   2006-236588 A    9/2006
(Continued)

OTHER PUBLICATIONS

International Search Report for PCT/JP2017/000459 (PCT/ISA/210) dated Apr. 11, 2017.
(Continued)

*Primary Examiner* — Gerald J Sufleta, II
(74) *Attorney, Agent, or Firm* — Birch, Stewart, Kolasch & Birch, LLP

(57) ABSTRACT

A headlight module for projecting a light distribution pattern includes: a first source for emitting first light; a second source for emitting second light; an element including a first guide for guiding the first light and a second guide for guiding the second light; and a condensing element for concentrating the second light. An emitting surface of the element includes first and second regions. The first light is emitted from the regions. The second light is emitted from the second region. The second region side of the second guide is connected to the first guide. The first light guided by the first guide enters the second guide. The pattern includes a pattern formed at a light concentration position of the condensing element. The second guide includes an incident (Continued)

surface. A focal position of the emitting surface and a focal position of the incident surface coincide with the light concentration position.

2 Claims, 17 Drawing Sheets

(51) Int. Cl.
| | |
|---|---|
| *F21S 41/24* | (2018.01) |
| *F21S 41/143* | (2018.01) |
| *F21S 41/40* | (2018.01) |
| *G02B 19/00* | (2006.01) |
| *F21S 41/147* | (2018.01) |
| *F21S 41/27* | (2018.01) |
| *F21S 41/32* | (2018.01) |
| *F21S 41/151* | (2018.01) |
| *G02B 27/09* | (2006.01) |
| *F21Y 115/10* | (2016.01) |
| *F21S 41/30* | (2018.01) |
| *F21W 107/10* | (2018.01) |
| *F21W 102/13* | (2018.01) |

(52) U.S. Cl.
CPC ............ *F21S 41/151* (2018.01); *F21S 41/24* (2018.01); *F21S 41/27* (2018.01); *F21S 41/322* (2018.01); *F21S 41/40* (2018.01); *G02B 19/0028* (2013.01); *G02B 19/0061* (2013.01); *G02B 27/0994* (2013.01); *F21S 41/30* (2018.01); *F21W 2102/13* (2018.01); *F21W 2107/10* (2018.01); *F21Y 2115/10* (2016.08)

(58) Field of Classification Search
USPC ........ 362/473–476, 511, 520–522, 538, 551, 362/555
See application file for complete search history.

(56) References Cited

U.S. PATENT DOCUMENTS

| | | | |
|---|---|---|---|
| 9,945,528 B2* | 4/2018 | Suwa | .................... F21S 41/143 |
| 2010/0046243 A1* | 2/2010 | Yatsuda | .................... F21V 5/04 |
| | | | 362/538 |
| 2013/0242589 A1 | 9/2013 | Abe et al. | |
| 2015/0204504 A1 | 7/2015 | Suwa et al. | |
| 2015/0226395 A1 | 8/2015 | Taudt et al. | |
| 2016/0084469 A1 | 3/2016 | Fukui et al. | |
| 2016/0102831 A1* | 4/2016 | Okubo | .................... F21S 41/19 |
| | | | 362/512 |
| 2016/0178155 A1* | 6/2016 | Owada | .................... B60Q 1/08 |
| 2016/0259116 A1* | 9/2016 | Van Bommel | ....... G02B 6/0003 |
| 2016/0312970 A1 | 10/2016 | Suwa et al. | |
| 2017/0122528 A1* | 5/2017 | Kadoriku | ................ F21S 41/00 |
| 2017/0184267 A1* | 6/2017 | Courcier | ................ F21S 41/24 |
| 2017/0227182 A1* | 8/2017 | Hirata | .................... F21S 41/00 |

FOREIGN PATENT DOCUMENTS

| | | |
|---|---|---|
| JP | 2010-49886 A | 3/2010 |
| JP | 2010-205607 A | 9/2010 |
| JP | 2013-73687 A | 4/2013 |
| JP | 2013-196903 A | 9/2013 |
| JP | 2015-526868 A | 9/2015 |
| WO | WO 2014/038177 A1 | 3/2014 |
| WO | WO 2015/004910 A1 | 1/2015 |
| WO | WO 2015/087838 A1 | 6/2015 |

OTHER PUBLICATIONS

Japanese Office Action issued in Japanese Patent Application No. 2017-546929 dated Dec. 19, 2017.

* cited by examiner

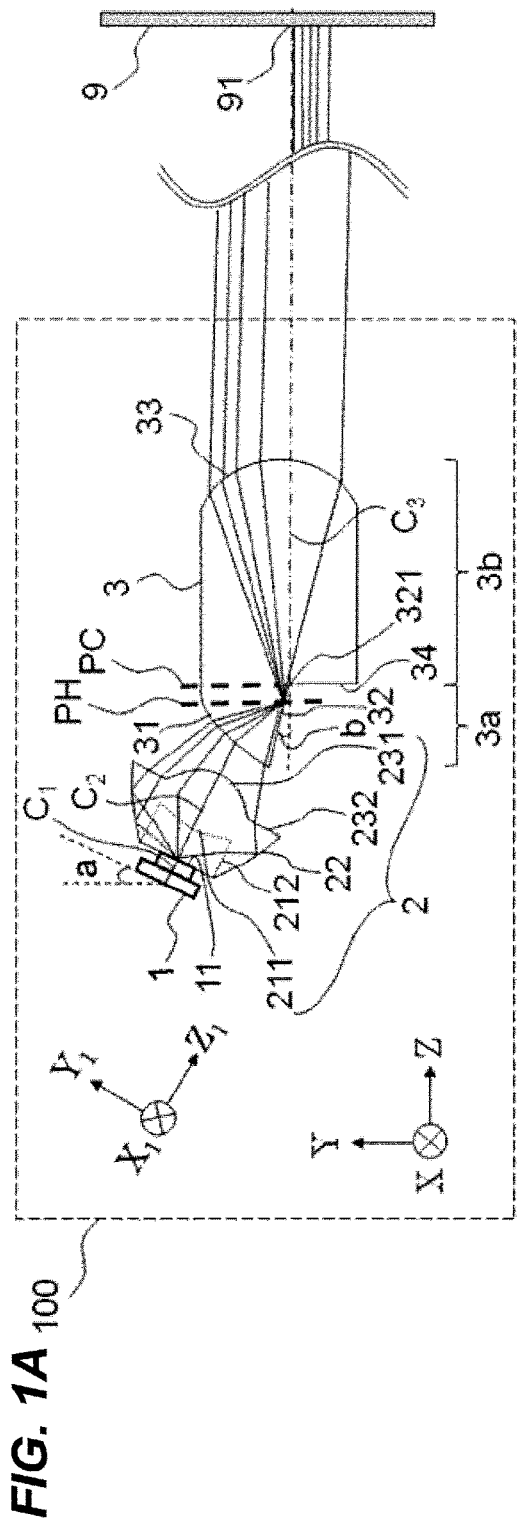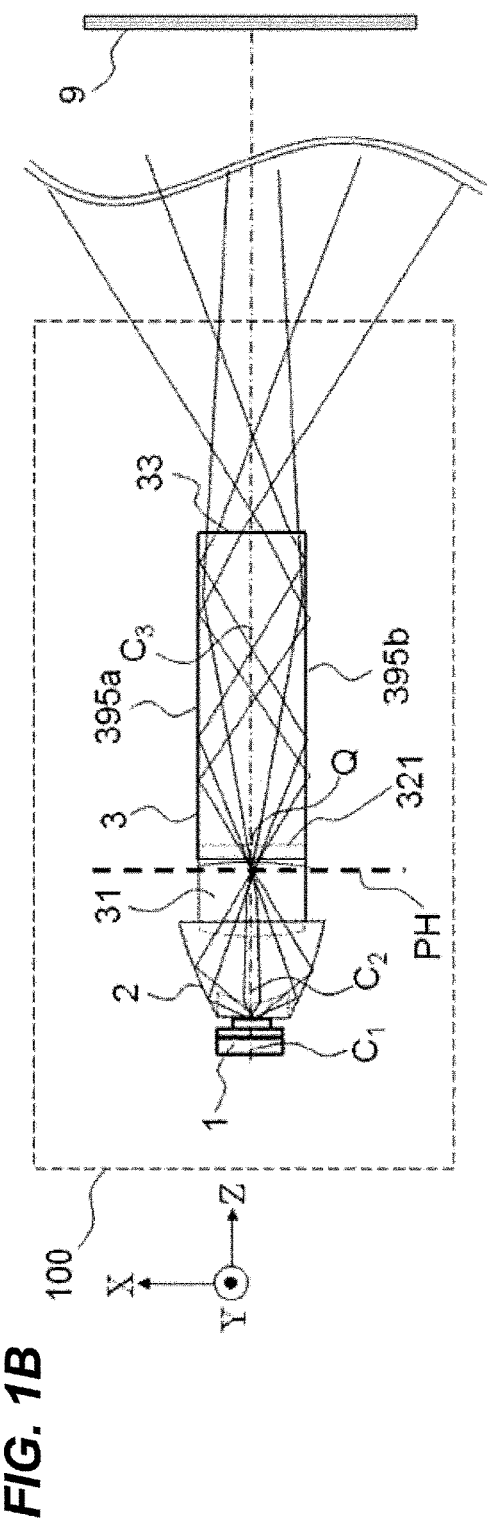
FIG. 1A
FIG. 1B

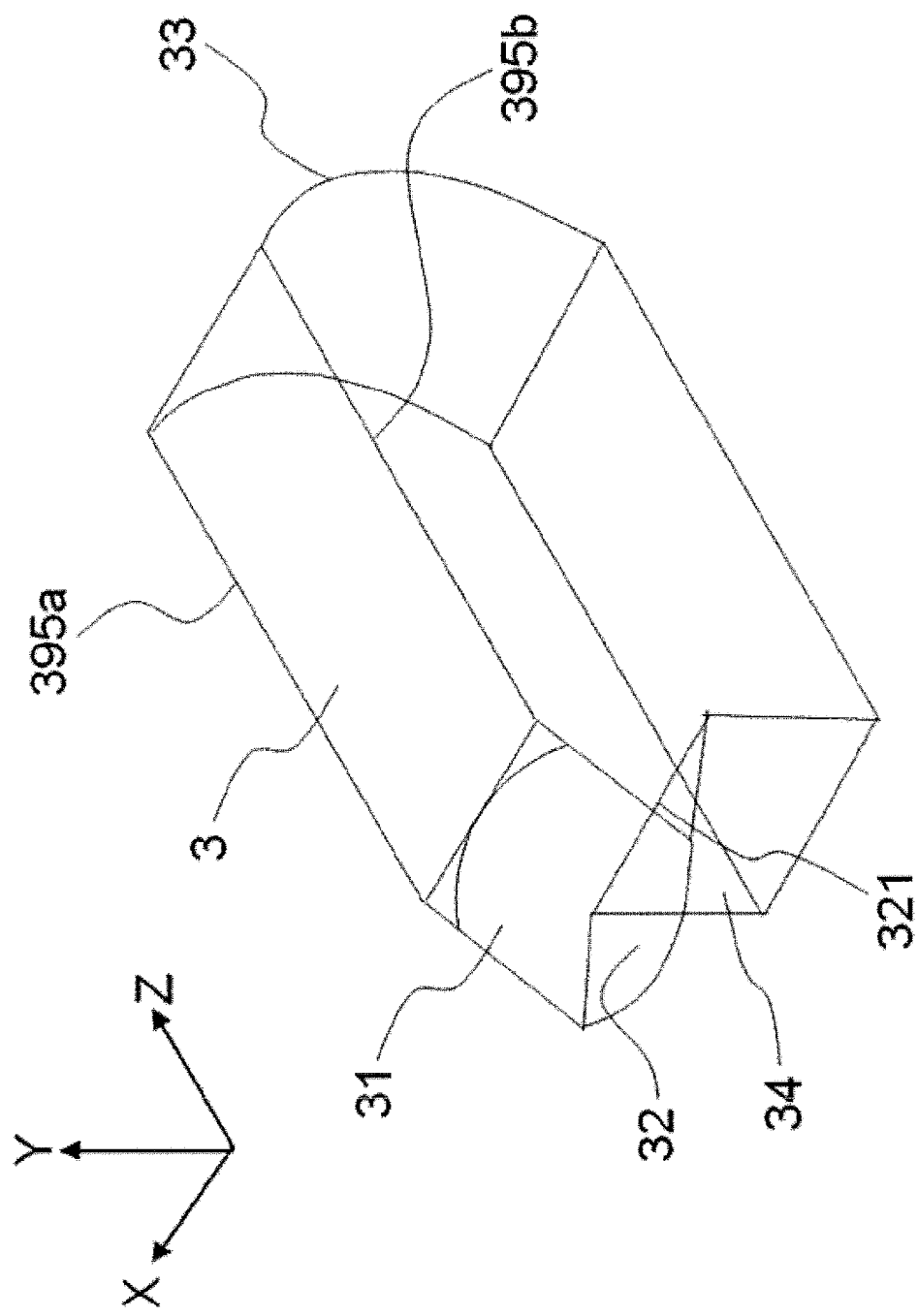

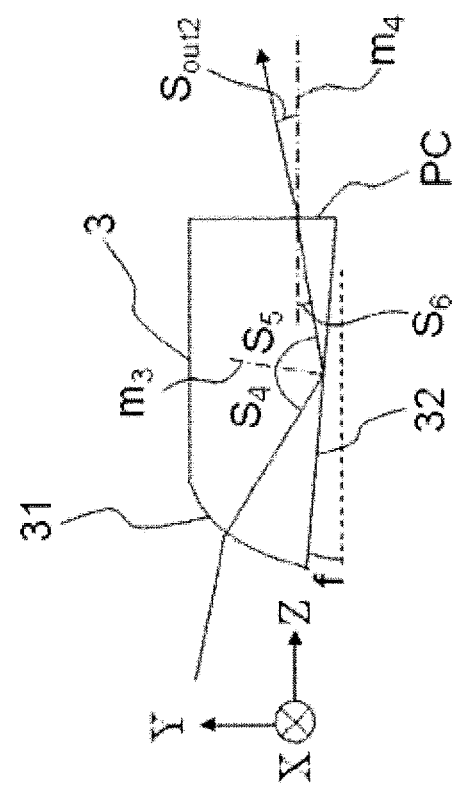
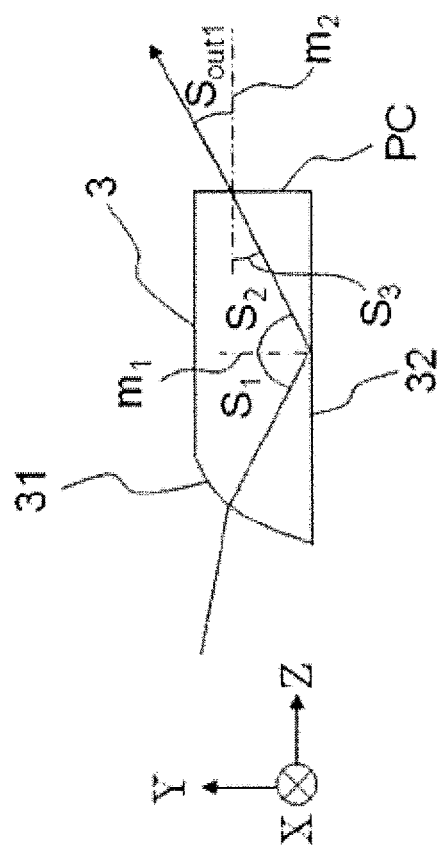
FIG. 3A
FIG. 3B

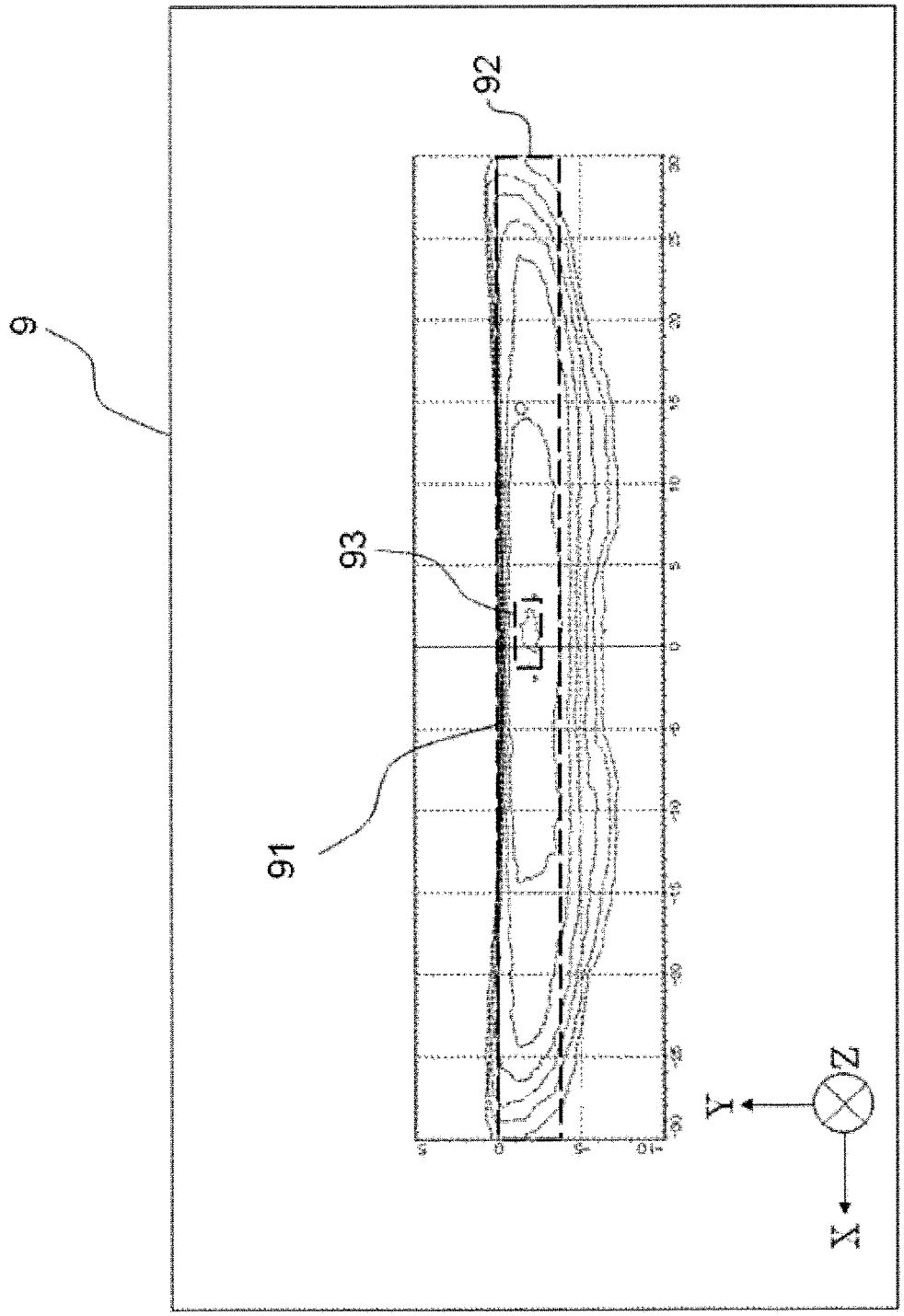

HEADLIGHT MODULE WITH TWO LIGHT GUIDES RECEIVING LIGHT FROM TWO LIGHT SOURCES

TECHNICAL FIELD

The present invention relates to a headlight module and a headlight device for providing illumination ahead of a vehicle or the like.

BACKGROUND ART

A headlight device for a vehicle needs to satisfy the conditions of a predetermined light distribution pattern specified by road traffic rules or the like.

As one of the road traffic rules, for example, a predetermined light distribution pattern for an automobile low beam has a horizontally long shape narrow in an up-down direction. To prevent an oncoming vehicle from being dazzled, a boundary (cutoff line) of light on the upper side of the light distribution pattern is required to be sharp. That is, a sharp cutoff line with a dark area above the cutoff line (outside the light distribution pattern) and a bright area below the cutoff line (inside the light distribution pattern) is required.

The illuminance is highest at a region on the lower side of the cutoff line (inside the light distribution pattern). The region of the highest illuminance is referred to as the "high illuminance region." Here, "region on the lower side of the cutoff line" refers to an upper part of the light distribution pattern, and corresponds to a part for irradiating a distant area, in a headlight device.

A headlight device for a vehicle provides such a complicated light distribution pattern. To provide the complicated light distribution pattern, a light blocking member, such as a shade, is typically used.

Patent Literature 1 discloses a technique in which a shade is disposed at a tip of an optical fiber to form a cutoff line. A sharp cutoff line is formed by disposing the shade at the end of the optical fiber and disposing a light guide lens immediately after the shade in such a manner that a focal position of the lens is located near the shade.

CITATION LIST

Patent Literature

Patent Literature 1: Japanese Patent Application Publication No. 7-312103

SUMMARY OF INVENTION

Technical Problem

However, the lamp of Patent Literature 1 projects a light distribution pattern of light rays that travel while being repeatedly and multiply reflected in the optical fiber. The luminous intensity distribution on the emitting surface of the optical fiber has high uniformity. Thus, the illuminance distribution of the light distribution pattern has high uniformity. It is difficult for the lamp device of Patent Literature 1 to form a high illuminance region near the cutoff line.

The present invention has been made in consideration of the problem of the prior art, and can form a high luminous intensity region near a cutoff line.

Solution to Problem

A headlight module is a headlight module for a vehicle for forming a light distribution pattern and projecting the light distribution pattern, the headlight module including: a first light source for emitting first light; and an optical element including a reflecting surface for reflecting the first light and a first light guide portion for guiding the first light reflected by the reflecting surface, wherein in a direction corresponding to a vertical direction of the vehicle, a part of the first light that has been reflected by the reflecting surface and another part of the first light that has not been reflected by the reflecting surface are superposed to form a high luminous intensity region, and the light distribution pattern including the high luminous intensity region is projected, and wherein in a direction corresponding to a horizontal direction of the vehicle, the first light reflected in the first light guide portion is emitted.

Advantageous Effects of Invention

The headlight module according to the present invention can form a high luminous intensity region in a light distribution pattern.

BRIEF DESCRIPTION OF DRAWINGS

FIGS. 1A and 1B are configuration diagrams illustrating a configuration of a headlight module 100 according to a first embodiment.

FIG. 2 is a perspective view of a light guide projection optical element 3 according to the first embodiment.

FIGS. 3A and 3B are diagrams for explaining the shape of a reflecting surface 32 of the light guide projection optical element 3 of the headlight module 100 according to the first embodiment.

FIG. 4 is a diagram illustrating, in contour display, an illuminance distribution of the headlight module 100 according to the first embodiment.

DESCRIPTION OF EMBODIMENTS

Figure 5:
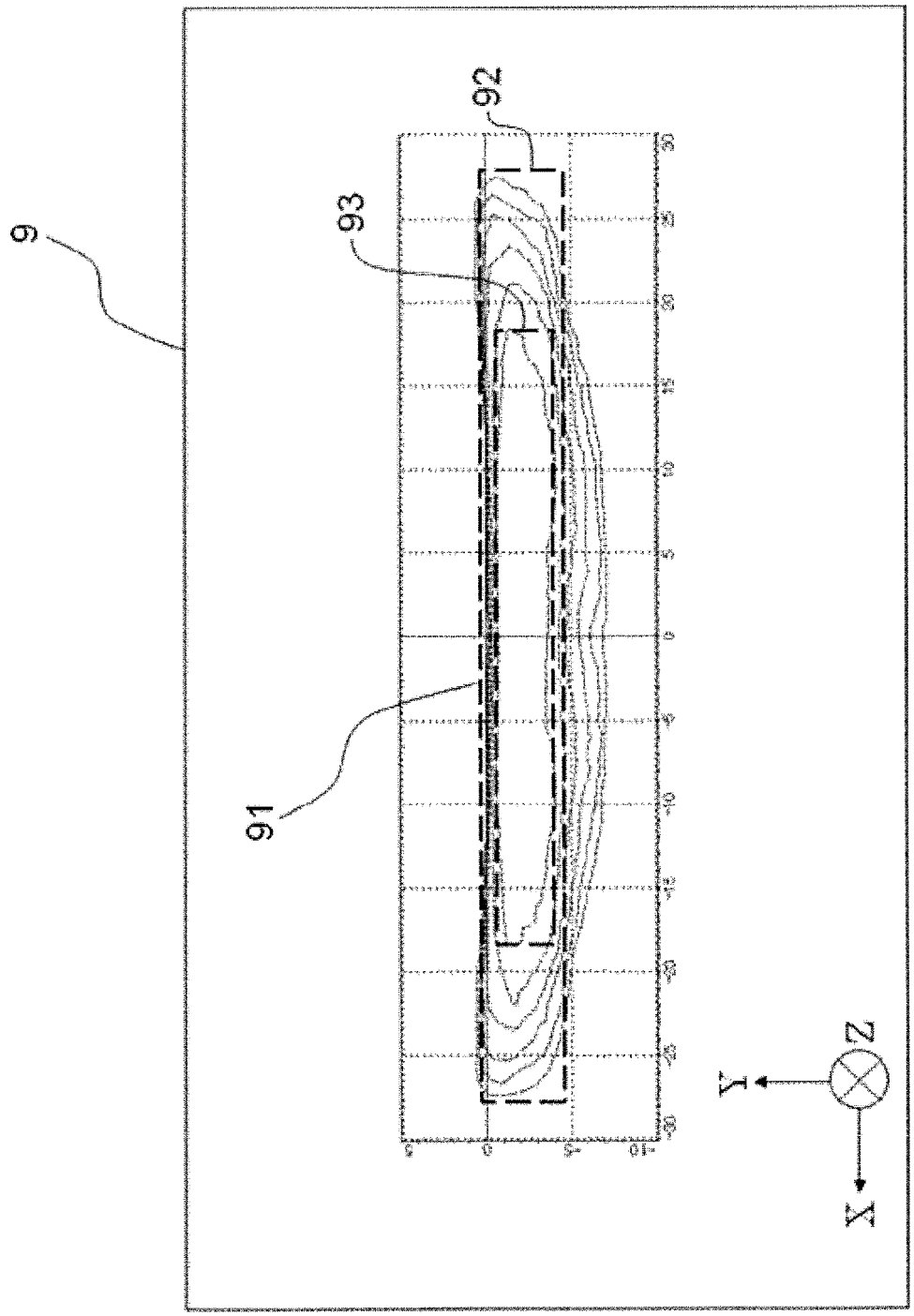
FIG. 5 is a diagram illustrating, in contour display, another illuminance distribution of the headlight module 100 according to the first embodiment.

The lamp device of Patent Literature 1 forms the cutoff line using the shade. Thus, the lamp device of Patent Literature 1 has a problem in that the light use efficiency is low. Part of light emitted from a light source is blocked by the shade and is not used as projection light.

The present invention uses no shade and thereby can prevent reduction in the light use efficiency.

Further, in general, downsizing an optical system increases the accuracy required for placement of a reflector, a light blocking plate, or a projection lens. Thus, when a headlight device is produced by combining components, such as a reflector, a light blocking plate, or a projection lens, the manufacturability of the headlight device is low.

The present invention integrates elements for forming a light distribution pattern, and thereby can improve the manufacturability.

Further, a headlight device is typically provided with a low beam and a high beam. The low beam and high beam have different light distribution patterns. Thus, the headlight device is provided with two types of headlight modules.

Japanese Patent Application Publication No. 2006-236588 describes a vehicle lamp with a passing beam lamp LBL mounted on an upper portion of a reflector unit and a driving beam lamp HBL mounted on a lower portion of the reflector unit. Here, the passing beam is a low beam and the driving beam is a high beam.

However, when different headlight modules are used for the low beam and high beam, the light emitting region varies depending on the lighting states of the respective headlight modules. When only the low beam is lighted, one of the headlight modules is lighted. When the high beam is also lighted, both of the headlight modules are lighted. Typically, when the high beam is lighted, both the high beam and low beam are lighted. Thus, when only the low beam is lighted, there is one light emitting region, and when the high beam is also lighted, there are two light emitting regions.

This means that the design of the vehicle varies depending on the lighting state of the headlight device. To improve the design of a vehicle with its headlight device lighted, it is preferable that the light emitting region should not vary between when only the low beam is lighted and when both the low beam and high beam are lighted.

Headlight modules 110 and 120, to be described later, according to a second embodiment can improve the design when the headlight device is lighted. The headlight modules 110 and 120 according to the second embodiment make it possible to change a light distribution pattern without changing the design in a state in which the headlight device is lighted.

Here, "cutoff line" refers to a light/dark borderline formed when a wall or screen is irradiated with light from a headlight device, and a borderline on the upper side of the light distribution pattern. "Cutoff line" is a borderline portion between a bright portion and a dark portion that is formed in an outline portion of the light distribution pattern. That is, it refers to a borderline between the bright portion and the dark portion on the upper side of the light distribution pattern. It refers to a borderline between a bright area (inside of the light distribution pattern) and a dark area (outside of the light distribution pattern) on the upper side of the light distribution pattern. Thus, the upper side of the cutoff line (outside of the light distribution pattern) is dark, and the lower side of the cutoff line (inside of the light distribution pattern) is bright.

Cutoff line is a term used when an irradiating direction of a passing headlight device is adjusted. The passing headlight is also referred to as a low beam.

The "low beam" is a downward beam and used in a case of passing an oncoming vehicle, or other cases. The low beam typically provides illumination about 40 m ahead. "Up-down direction" refers to a direction perpendicular to the ground (road surface). The "up-down direction" is an up-down direction of the vehicle.

To achieve a sharp cutoff line as described above, large chromatic aberration, blur, or the like must not occur on the cutoff line. "Blur occurs on the cutoff line" indicates that the cutoff line is unclear. That is, the cutoff line is not sharp.

In the light distribution pattern, it is desirable to reduce light distribution unevenness. The light distribution unevenness appears as a dark line or a bright line when the headlight illuminates a road surface. The light distribution unevenness may cause the driver to misjudge distances. Thus, it is desirable that a headlight device have a light distribution with reduced light distribution unevenness.

"Headlight device" refers to an illuminating device that is mounted on a transportation machine or the like and used to improve visibility for an operator and conspicuity to the outside. A vehicle headlight device is also referred to as a headlamp or headlight.

Further, recently, from the viewpoint of reducing the burden on the environment, such as reducing emission of carbon dioxide ($CO_2$) and consumption of fuel, it is desired to improve energy efficiency of vehicles, for example. Accordingly, in vehicle headlight devices, downsizing, weight reduction, and improvement in power efficiency are required. Thus, it is desired to employ, as a light source of a vehicle headlight device, a semiconductor light source having higher luminous efficiency than conventional halogen bulbs (lamp light sources).

"Semiconductor light source" refers to, for example, a light emitting diode (LED), laser diode (LD), or the like.

Conventional lamp light sources (bulb light sources) are light sources having directivity lower than those of semiconductor light sources. Lamp light sources include an incandescent lamp, a halogen lamp, a fluorescent lamp, and the like. Thus, a lamp light source uses a reflector (e.g., a reflecting mirror) to provide directivity to the emitted light. On the other hand, a semiconductor light source has at least one light emitting surface and emits light to the light emitting surface side.

As such, a semiconductor light source is different from a lamp light source in light emitting characteristics. Thus, it is desirable to use an optical system suitable for a semiconductor light source instead of a conventional optical system using a reflecting mirror.

The above-described semiconductor light source is a type of solid-state light sources. Solid-state light sources include, for example, an organic electroluminescence (organic EL) light source, a light source that irradiates phosphor applied on a plane with excitation light to cause the phosphor to emit light, and the like. Also, for these solid-state light sources, it is desirable to use optical systems similar to those for the semiconductor light sources.

Excluding bulb light sources, light sources having directivity are referred to as "solid-state light sources."

"Directivity" refers to a property that the intensity of light or the like emitted into space depends on direction. "Having directivity" here indicates that light travels to the light emitting surface side and does not travel to the side opposite to the light emitting surface, as described above. Thus, the divergence angle of light emitted from the light source is 180 degrees or less.

Light sources described in the following embodiments are described as light sources (solid-state light sources) having directivity. As described above, the main examples thereof are semiconductor light sources, such as light emitting diodes or laser diodes. The light sources also include organic electroluminescence light sources, light sources that irradiate phosphor applied on planes with excitation light to cause the phosphor to emit light, and the like.

The reason why solid-state light sources are exemplarily employed in the embodiments is because the use of a bulb light source makes it difficult to meet the demand for improvement in energy efficiency or the demand for downsizing of the device. However, if there is no demand for improvement in energy efficiency, the light sources may be bulb light sources.

Thus, bulb light sources, such as incandescent lamps, halogen lamps, or fluorescent lamps may be used as light sources of the present invention. Also, semiconductor light sources, such as light emitting diodes (LEDs) or laser diodes (LDs) may be used as the light sources of the present invention. The light sources of the present invention are not limited to specific ones and may be any light sources.

However, from the viewpoint of reducing the burden on the environment, such as reducing emission of carbon dioxide ($CO_2$) and consumption of energy, it is desirable to employ a semiconductor light source as a light source of a headlight device. A semiconductor light source has higher luminous efficiency than a conventional halogen bulb (lamp light source).

Also, from the viewpoint of downsizing and weight reduction, it is desirable to employ a semiconductor light source. A semiconductor light source has higher directivity than a conventional halogen bulb (lamp light source), and allows downsizing and weight reduction of the optical system.

Thus, in the following description of the present invention, the light sources are described as LEDs, which are a type of semiconductor light sources.

In a light emitting diode, the shape of a light emitting surface is typically a square shape, a rectangular shape, or a circular shape. Thus, if an image of a light source is formed by a convex lens, the boundary of the shape of the light emitting surface is directly projected by the projection lens, and light distribution unevenness occurs when the light distribution pattern is formed.

"Light distribution" refers to a luminous intensity distribution of a light source with respect to space. That is, it refers to a spatial distribution of light emitted from a light source. The light distribution indicates in which direction and how strongly light is emitted from a light source.

"Light distribution pattern" refers to the shape of a light beam and an intensity distribution (luminous intensity distribution) of light due to the direction of light emitted from a light source. "Light distribution pattern" will also be used to mean an illuminance pattern on an irradiated surface 9 to be described below. Thus, it indicates the shape of the area irradiated with light on the irradiated surface 9 and an illuminance distribution. "Light distribution" refers to an intensity distribution (luminous intensity distribution) of light emitted from a light source with respect to the direction of the light. "Light distribution" will also be used to mean an illuminance distribution on the irradiated surface 9 to be described below.

When the light distribution pattern is described as the illuminance distribution, the brightest region is referred to as the "high illuminance region." On the other hand, when the light distribution pattern is considered as the luminous intensity distribution, the brightest region in the light distribution pattern is the "high luminous intensity region."

"Luminous intensity" indicates the degree of intensity of light emitted by a luminous body and is obtained by dividing the luminous flux passing through a small solid angle in a given direction by the small solid angle. "Luminous intensity" refers to a physical quantity indicating how strong light emitted from a light source is.

"Illuminance" refers to a physical quantity indicating the brightness of light radiated to a planar object. It is equal to a luminous flux radiated per unit area.

The irradiated surface 9 is a virtual surface defined at a predetermined position in front of the vehicle. The irradiated surface 9 is, for example, a surface parallel to an X-Y plane to be described later. The predetermined position in front of the vehicle is a position at which the luminous intensity or illuminance of the headlight device is measured, and is specified in road traffic rules or the like. For example, in Europe, United Nations Economic Commission for Europe (UNECE) specifies a position 25 m from a light source as the position at which the luminous intensity of an automobile headlight device is measured. In Japan, Japanese Industrial Standards Committee (JIS) specifies a position 10 m from a light source as the position at which the luminous intensity is measured.

The present invention is applicable to, for example, the low beam and high beam or the like of a headlight device for a vehicle. The present invention is also applicable to, for example, the low beam and high beam or the like of a motorcycle headlight device. The present invention is also applicable to, for example, headlight devices for other vehicles, such as three-wheelers, four-wheelers. The present invention is also applicable to, for example, the low beam of a headlight device for a motor tricycle or the low beam of a headlight device for a four-wheeled automobile.

However, in the following description, a case where a light distribution pattern of the low beam of a headlight device for a motorcycle is formed will be described as an example. The light distribution pattern of the low beam of the headlight device for a motorcycle has a cutoff line that is a straight line parallel to the left-right direction (X axis direction) of the vehicle. Further, it is brightest at a region on the lower side of the cutoff line (inside the light distribution pattern).

The four-wheelers are, for example, typical four-wheeled automobiles or the like. The three-wheelers include, for example, a motor tricycle called a gyro. "Motor tricycle called a gyro" refers to a scooter with three wheels including one front wheel and two rear wheels about one axis. In Japan, the motor tricycle corresponds to, for example, a motorbike. The motor tricycle has a rotational axis near the center of the vehicle body and allows most of the vehicle body including the front wheel and a driver seat to be tilted in the left-right direction, for example. With this mechanism, the motor tricycle can move the center of gravity inward during, for example, turning, similarly to a motorcycle.

Examples of embodiments of the present invention will be described below with reference to the drawings by taking vehicle headlight devices as examples. In the following description of the embodiments, XYZ coordinates will be used to facilitate explanation.

It will be assumed that a left-right direction of a vehicle is the X axis direction; the left direction with respect to a forward direction of the vehicle is the +X axis direction; the right direction with respect to the forward direction of the vehicle is the −X axis direction. Here, "forward direction" refers to a traveling direction of the vehicle. Thus, "forward direction" refers to a direction in which the headlight device radiates light.

It will be assumed that an up-down direction of the vehicle is the Y axis direction; the upward direction is the +Y axis direction; the downward direction is the −Y axis direction. The "upward direction" is a direction toward the sky; the "downward direction" is a direction toward the ground (road surface or the like).

It will be assumed that the traveling direction of the vehicle is the Z axis direction; the traveling direction is the +Z axis direction; the opposite direction is the −Z axis direction. The +Z axis direction will be referred to as the "forward direction"; the −Z axis direction will be referred to as the "backward direction." Thus, the +Z axis direction is the direction in which the headlight device radiates light.

As described above, in the following embodiments, a Z-X plane is a plane parallel to a road surface. This is because the road surface is usually considered to be a "horizontal plane." Thus, a Z-X plane is considered as a "horizontal plane." "Horizontal plane" refers to a plane perpendicular to the direction of gravity.

However, the road surface may be inclined with respect to the traveling direction of the vehicle. Specifically, it is an uphill, a downhill, or the like. In these cases, the "horizontal plane" is considered as a plane parallel to the road surface. Thus, the "horizontal plane" is not a plane perpendicular to the direction of gravity.

On the other hand, a typical road surface is seldom inclined in the left-right direction with respect to the traveling direction of the vehicle. "Left-right direction" refers to a width direction of a road. In these cases, the "horizontal plane" is considered as a plane perpendicular to the direction of gravity. For example, even if a road surface is inclined in the left-right direction and the vehicle is upright with respect to the left-right direction of the road surface, this is considered to be equivalent to a state in which the vehicle is tilted with respect to the "horizontal plane" in the left-right direction.

To simplify explanation, the following description will be made on the assumption that the "horizontal plane" is a plane perpendicular to the direction of gravity. That is, the description will be made on the assumption that a Z-X plane is a plane perpendicular to the direction of gravity.

First Embodiment

FIGS. 1A and 1B are configuration diagrams illustrating a configuration of a headlight module 100 according to a first embodiment. FIG. 1A is a view from the right side (−X axis direction) with respect to the forward direction of the vehicle. FIG. 1B is a view from the top (+Y axis direction).

As illustrated in FIGS. 1A and 1B, the headlight module 100 according to the first embodiment includes a light source 1 and a light guide projection optical element 3. The headlight module 100 according to the first embodiment may include a condensing optical element 2. In the headlight module 100, the condensing optical element 2 may be mounted to the light source 1 to form a unit.

The light source 1 and condensing optical element 2 are disposed with their optical axes $C_1$ and $C_2$ inclined in the −Y axis direction by an angle a. "With their optical axes inclined in the −Y axis direction" indicates that when viewed from the −X axis direction, the optical axes parallel to the Z axis are rotated clockwise about the X axis. In FIG. 1A, when viewed from the −X axis direction, the optical axes $C_1$ and $C_2$ of the light source 1 and condensing optical element 2 are rotated clockwise about the X axis by the angle a with respect to the Z axis.

To facilitate explanation of the light source 1 and condensing optical element 2, $X_1Y_1Z_1$ coordinates will be used as a new coordinate system. The $X_1Y_1Z_1$ coordinates are coordinates obtained by rotating the XYZ coordinates clockwise about the X axis by the angle a as viewed from the −X axis direction.

In the first embodiment, the optical axis $C_1$ of the light source 1 is parallel to the $Z_1$ axis. The optical axis $C_2$ of the condensing optical element 2 is also parallel to the $Z_1$ axis. The optical axis $C_2$ of the condensing optical element 2 also coincides with the optical axis $C_1$ of the light source 1.

<Light Source 1>

The light source 1 has a light emitting surface 11. The light source 1 emits light for illuminating a forward area from the light emitting surface 11. Here, the forward area is an area in front of the vehicle. The light source 1 emits light from the light emitting surface 11.

The light source 1 is located on the $-Z_1$ axis side of the condensing optical element 2. The light source 1 is located on the −Z axis side (in back) of the light guide projection optical element 3. The light source 1 is located on the +Y axis side (upper side) of the light guide projection optical element 3.

In FIGS. 1A and 1B, the light source 1 emits the light in the $+Z_1$ axis direction. The light source 1 may be of any type, but the following description will be made on the assumption that the light source 1 is an LED, as described above.

The optical axis $C_1$ of the light source 1 extends perpendicular to the light emitting surface 11 from a center of the light emitting surface 11.

<Condensing Optical Element 2>

The condensing optical element 2 is located on the $+Z_1$ axis side of the light source 1. The condensing optical element 2 is also located on the $-Z_1$ axis side of the light guide projection optical element 3. The condensing optical element 2 is located on the −Z axis side (in back) of the light guide projection optical element 3. The condensing optical element 2 is located on the +Y axis side (upper side) of the light guide projection optical element 3.

The condensing optical element 2 receives the light emitted from the light source 1. The condensing optical element 2 concentrates the light at an arbitrary position in the forward direction ($+Z_1$ axis direction). The condensing optical element 2 concentrates the light. The condensing optical element 2 is an optical element having a condensing function. In the following embodiments, as an example, the condensing optical element 2 is a lens. This lens concentrates the light using refraction and reflection. The same applies to condensing optical elements 5 to be described later.

When an incident surface 31, to be described later, of the light guide projection optical element 3 has a condensing function, the condensing optical element 2 may be omitted.

When the headlight module 100 is not provided with the condensing optical element 2, the light guide projection optical element 3 receives the light emitted from the light source 1. The light emitted from the light source 1 enters through the incident surface 31.

In FIGS. 1A and 1B, the condensing optical element 2 is illustrated as an optical element having positive power (refractive power).

The inside of the condensing optical element 2 described in the first embodiment is filled with refractive material, for example.

In FIGS. 1A and 1B, the condensing optical element 2 consists of a single optical element, but may use multiple optical elements. However, use of multiple optical elements reduces manufacturability due to reasons, such as ensuring the accuracy of positioning of each optical element.

The light source 1 and condensing optical element 2 are disposed above (on the +Y axis direction side of) the light guide projection optical element 3. The light source 1 and condensing optical element 2 are also disposed in back (−Z axis direction side) of the light guide projection optical element 3.

With respect to a reflecting surface 32, the light source 1 and condensing optical element 2 are located on a light reflecting side of the reflecting surface 32. That is, with respect to the reflecting surface 32, the light source 1 and condensing optical element 2 are located on a front surface side of the reflecting surface 32.

The "front surface of the reflecting surface" is a surface for reflecting light. A "back surface of the reflecting surface" is a surface opposite the front surface and is, for example, a surface that does not reflect light.

With respect to the reflecting surface 32, the light source 1 and condensing lens 2 are located in a normal direction of the reflecting surface 32 and on the front surface side of the reflecting surface 32. The condensing optical element 2 is disposed to face the reflecting surface 32. The reflecting surface 32 is a surface provided in the light guide projection optical element 3.

The optical axis $C_2$ of the condensing optical element 2 is, for example, a straight line connecting centers of curvature of two surfaces: an incident surface 211 and an emitting surface 231.

In FIGS. 1A and 1B, the optical axis $C_1$ of the light source 1 coincides with the optical axis $C_2$ of the condensing optical element 2. The optical axes $C_1$ and $C_2$ of the light source 1 and condensing optical element 2 have an intersection on the reflecting surface 32. When light is refracted at the incident surface 31, a central light ray emitted from the condensing optical element 2 reaches the reflecting surface 32. That is, the optical axis $C_2$ or central light ray of the condensing optical element 2 has an intersection on the reflecting surface 32.

The central right ray emitted from the condensing optical element 2 is a light ray on the optical axis $C_2$ of the condensing optical element 2.

The condensing optical element 2 has, for example, the incident surface 211, an incident surface 212, a reflecting surface 22, the emitting surface 231, and an emitting surface 232.

The condensing optical element 2 is disposed immediately after the light source 1. "After" here refers to a side toward which the light emitted from the light source 1 travels. Here, "immediately after" indicates that the light emitted from the light emitting surface 11 is directly incident on the condensing optical element 2.

A light emitting diode emits light with a Lambertian light distribution. "Lambertian light distribution" refers to a light distribution in which the luminance of a light emitting surface is constant regardless of the viewing direction. That is, the directivity of light distribution of a light emitting diode is wide. Thus, by reducing the distance between the light source 1 and the condensing optical element 2, it is possible to increase the amount of light incident on the condensing optical element 2.

The condensing optical element 2 is made of, for example, transparent resin, glass, or silicone. The material of the condensing optical element 2 may be any material having transparency, and may be transparent resin or the like. "Transparency" refers to the property of being transparent. However, from the viewpoint of light use efficiency, materials having high transparency are appropriate as the material of the condensing optical element 2. Further, since the condensing optical element 2 is disposed immediately after the light source 1, the material of the condensing optical element 2 preferably has excellent heat resistance.

The incident surface 211 is an incident surface formed at a central part of the condensing optical element 2. "A central part of the condensing lens 2" indicates that the optical axis $C_2$ of the condensing optical element 2 has an intersection on the incident surface 211.

The incident surface 211 has, for example, positive power. The incident surface 211 has, for example, a convex shape. The convex shape of the incident surface 211 is a shape projecting in the $-Z_1$ axis direction. The power is also referred to as the "refractive power." The incident surface 211 has, for example, a shape rotationally symmetric about the optical axis $C_2$.

The incident surface 212 has, for example, a shape that is a part of the surface shape of a solid of revolution obtained by rotating an ellipse about its major or minor axis. A solid of revolution obtained by rotating an ellipse about its major or minor axis is referred to as a "spheroid." The rotational axis of the spheroid coincides with the optical axis $C_2$. The incident surface 212 has a surface shape obtained by cutting off both ends of the spheroid in the direction of the rotational axis. Thus, the incident surface 212 has a tubular shape.

The incident surface 212 need not necessarily be rotationally symmetric, as described later. For example, the incident surface 212 has, for example, an ellipsoidal shape. The incident surface 212 has an elliptical surface shape. An elliptical surface is a quadric surface whose section taken in any plane parallel to any of three coordinate planes is an ellipse.

One end (end on the $+Z_1$ axis direction side) of the tubular shape of the incident surface 212 is connected to the outer periphery of the incident surface 211. The tubular shape of the incident surface 212 is formed on the light source 1 side ($-Z_1$ axis side) of the incident surface 211. That is, the tubular shape of the incident surface 212 is formed on the light source 1 side of the incident surface 211.

The reflecting surface 22 has a tubular shape whose cross-sectional shape in an $X_1$-$Y_1$ plane is, for example, a circular shape centered on the optical axis $C_2$. In the tubular shape of the reflecting surface 22, the diameter of the circular shape in the $X_1$-$Y_1$ plane at the end on the $-Z_1$ axis direction side is smaller than the diameter of the circular shape in the $X_1$-$Y_1$ plane at the end on the $+Z_1$ axis direction side. The diameter of the reflecting surface 22 increases in the $+Z_1$ axis direction.

The reflecting surface 22 has, for example, the shape of the side surface of a circular truncated cone. The shape of the side surface of the circular truncated cone in a plane including a central axis is a linear shape. However, the shape of the reflecting surface 22 in a plane including the optical axis $C_2$ may be a curved line shape. "Plane including the optical axis $C_2$" indicates that the line of the optical axis $C_2$ can be drawn on the plane.

One end (end on the $-Z_1$ axis direction side) of the tubular shape of the reflecting surface 22 is connected to the other end (end on the $-Z_1$ axis direction side) of the tubular shape of the incident surface 212. The reflecting surface 22 is located on the outer peripheral side of the incident surface 212.

The emitting surface 231 is located on the +Z axis direction side of the incident surface 211. The emitting surface 231 has, for example, positive power. The emitting surface 231 has, for example, a convex shape. The convex shape of the emitting surface 231 is a shape projecting in the +Z axis direction. The optical axis $C_2$ of the condensing optical element 2 has an intersection on the emitting surface 231. The emitting surface 231 has, for example, a shape rotationally symmetric about the optical axis $C_2$.

The emitting surface 231 may be a toroidal surface. Likewise, the incident surface 211 may also be a toroidal surface. Toroidal surfaces include cylindrical surfaces.

The emitting surface 232 is located on the outer peripheral side of the emitting surface 231. The emitting surface 232 has, for example, a planar shape parallel to an $X_1$-$Y_1$ plane. An inner periphery and an outer periphery of the emitting surface 232 have circular shapes.

The inner periphery of the emitting surface 232 is connected to an outer periphery of the emitting surface 231. The outer periphery of the emitting surface 232 is connected to the other end (end on the +$Z_1$ axis direction side) of the tubular shape of the reflecting surface 22.

In the light emitted from the light emitting surface 11, light rays having small emission angles are incident on the incident surface 211. The light rays having small emission angles have, for example, a divergence angle of 60 degrees or less. The light rays having small emission angles enter through the incident surface 211 and are emitted from the emitting surface 231.

The light rays with small emission angles emitted from the emitting surface 231 are concentrated at an arbitrary position in front (+$Z_1$ axis direction) of the condensing optical element 2. The light rays emitted from the emitting surface 231 are concentrated. The light rays emitted from the light source 1 at small emission angles are concentrated by refractions at the incident surface 211 and emitting surface 231. Refraction of light is used for concentration of the light rays emitted from the light source 1 at small emission angles.

In the light emitted from the light emitting surface 11, light rays having large emission angles are incident on the incident surface 212. The light rays having large emission angles have, for example, a divergence angle greater than 60 degrees. The light rays incident on the incident surface 212 are reflected by the reflecting surface 22. The light rays reflected by the reflecting surface 22 travel in the +$Z_1$ axis direction. The light rays reflected by the reflecting surface 22 are emitted from the emitting surface 232.

The light rays with large emission angles emitted from the emitting surface 232 are concentrated at an arbitrary position in front (+$Z_1$ axis direction) of the condensing optical element 2. The light rays emitted from the emitting surface 232 are concentrated. The light rays emitted from the light source 1 at large emission angles are concentrated by reflection at the reflecting surface 22. Reflection of light is used for concentration of light rays emitted from the light source 1 at large emission angles.

In each of the following embodiments, as an example, the condensing optical element 2 will be described as an optical element having the following functions. The condensing optical element 2 concentrates, due to refraction, light rays emitted from the light source 1 at small emission angles. The condensing optical element 2 concentrates, due to reflection, light rays emitted from the light source 1 at large emission angles.

For example, at a light concentration position of the light emitted from the emitting surface 231, an image similar to a pattern of the light source 1 (the shape of the light emitting surface 11) is formed. Thus, projection of the shape of the light emitting surface 11 of the light source 1 by an emitting surface 33 may cause light distribution unevenness.

In such a case, by making the light concentration position of the light emitted from the emitting surface 232 different from the light concentration position of the light emitted from the emitting surface 231 as described above, it becomes possible to reduce the light distribution unevenness due to the light emitted from the emitting surface 231.

The light concentration position of the light rays emitted from the emitting surface 232 and the light concentration position of the light rays emitted from the emitting surface 231 need not coincide with each other. For example, the light concentration position of the light emitted from the emitting surface 232 may be closer to the condensing optical element 2 than the light concentration position of the light emitted from the emitting surface 231.

Further, by making the position of a conjugate plane PC different from a light concentration position PH of the light emitted from the condensing optical element 2, it becomes possible to reduce the light distribution unevenness due to the light emitted from the emitting surface 231.

Further, for example, the light emitting surface 11 of the LED typically has a rectangle shape or a circular shape. The light distribution pattern has a horizontally long shape narrow in the up-down direction, as described above. A high beam for a vehicle may have a light distribution pattern having a circular shape. Thus, it is possible to form a light distribution pattern using the shape of the light emitting surface 11 of the light source 1.

For example, it is possible to form an intermediate image based on the shape of the light emitting surface 11 by means of the condensing optical element 2 and project the intermediate image. In FIGS. 1A and 1B, an image of the light emitting surface 11 is formed at the light concentration position PH. In the image of the light emitting surface 11 formed at the light concentration position PH, an image on the +$Y_1$ axis direction side of the light emitting surface 11 is folded by the reflecting surface 32 and superposed on an image on the −$Y_1$ axis direction side of the light emitting surface 11. As such, the image of the light emitting surface 11 may be an image obtained by performing deformation or the like on the shape of the light emitting surface 11.

Further, by making the position of the conjugate plane PC different from the position of the image of the light emitting surface 11 formed in this manner, it becomes possible to reduce the light distribution unevenness due to the light emitted from the emitting surface 231.

Further, in the first embodiment, each of the incident surfaces 211 and 212, reflecting surface 22, and emitting surfaces 231 and 232 of the condensing optical element 2 has a shape rotationally symmetric about the optical axis $C_2$. However, the shapes are not limited to rotationally symmetric shapes as long as the condensing optical element 2 can concentrate light emitted from the light source 1.

For example, by changing the cross-sectional shape of the reflecting surface 22 in an $X_1$-$Y_1$ plane to an elliptical shape, it is possible to form a light concentration spot at the light concentration position into an elliptical shape. This facilitates formation of a wide light distribution pattern by the headlight module 100.

Also when the shape of the light emitting surface 11 of the light source 1 is a rectangular shape, the condensing optical element 2 can be downsized by changing the cross-sectional shape of the reflecting surface 22 in an $X_1$-$Y_1$ plane to an elliptical shape, for example.

Further, it is sufficient that the condensing optical element 2 totally have positive power. Each of the incident surfaces 211 and 212, reflecting surface 22, and emitting surfaces 231 and 232 may have any power.

When the light is concentrated by the combination of the condensing optical element 2 and incident surface 31, it is sufficient that the condensing optical element 2 and incident surface 31 have positive power in total.

As described above, when a bulb light source is employed as the light source 1, a reflector or the like may be used as the condensing optical element. The reflector is, for example, a reflecting mirror or the like.

In the description of the shape of the condensing optical element 2, as an example, it has been described that the incident surface 211, 212, reflecting surface 22, or emitting surface 231, 232 is connected to an adjacent surface. However, it is not always necessary that surfaces be connected to each other. For example, "one end (end on the $+Z_1$ axis direction side) of the tubular shape of the incident surface 212 is connected to the outer periphery of the incident surface 211" can be rephrased as "one end (end on the $+Z_1$ axis direction side) of the tubular shape of the incident surface 212 is located on the outer peripheral side of the incident surface 211." It is sufficient that the incident light be guided to the light guide projection optical element 3 due to the positional relationship between the surfaces.

<Light Guide Projection Optical Element 3>

The light guide projection optical element 3 is located on the $+Z_1$ axis side of the condensing optical element 2. The light guide projection optical element 3 is located on the $+Z$ axis side of the condensing optical element 2. The light guide projection optical element 3 is located on the $-Y$ axis side of the condensing optical element 2.

The light guide projection optical element 3 receives light emitted from the condensing optical element 2. The light guide projection optical element 3 emits the light in the forward direction ($+Z$ axis direction).

When the headlight module 100 is not provided with the condensing optical element 2, the light guide projection optical element 3 receives light emitted from the light source 1. The light guide projection optical element 3 emits the light in the forward direction ($+Z$ axis direction).

The light guide projection optical element 3 is an example of an optical element. The light guide projection optical element 3 has a function of guiding light by means of the reflecting surface 32. The light guide projection optical element 3 also has a function of projecting light from the emitting surface 33. To facilitate understanding, the optical element 3 will be described as the light guide projection optical element 3.

"Project" refers to emitting light. "Project" also refers to causing an image to appear. When the light guide projection optical element 3 projects a light distribution pattern to be described later, the light guide projection optical element 3 can also be referred to as the light guide projection optical element. Projection optical elements 350 to be described later can also be referred to as projection optical elements since they project light distribution patterns.

In FIGS. 1A and 1B, the emitting surface 33 is a projection optical portion for projecting a light distribution pattern. The emitting surface 33 can also be referred to as a projection optical portion for projecting a light distribution pattern. When a projection optical element 350 is provided as described later, the projection optical element 350 is a projection optical portion (projection optical portion) for projecting a light distribution pattern. When a light distribution pattern is projected by the emitting surface 33 and a projection optical element 350, the emitting surface 33 and projection optical element 350 are a projection optical portion (projection optical portion) for projecting a light distribution pattern.

FIG. 2 is a perspective view of the light guide projection optical element 3. The light guide projection optical element 3 includes the reflecting surface 32, side surfaces 395*a* and 395*b*, and the emitting surface 33. The light guide projection optical element 3 may include the incident surface 31. The light guide projection optical element 3 may include an incident surface 34. In FIG. 2, leading lines of the side surfaces 395*a* and 395*b* are drawn from edges on the +Y axis side of the side surfaces 395*a* and 395*b*.

The light guide projection optical element 3 is made of, for example, transparent resin, glass, silicone, or the like.

The inside of the light guide projection optical element 3 described in the first embodiment is filled with refractive material, for example.

The incident surface 31 is provided at an end portion on the −Z axis direction side of the light guide projection optical element 3. The incident surface 31 is provided on a portion on the +Y axis direction side of the light guide projection optical element 3.

In FIGS. 1A, 1B, and 2, the incident surface 31 of the light guide projection optical element 3 has a curved surface shape. The curved surface shape of the incident surface 31 is, for example, a convex shape having positive power in both the horizontal direction (X axis direction) and vertical direction (Y axis direction).

In the horizontal direction (X axis direction), the incident surface 31 has positive power. In the horizontal direction (X axis direction), the incident surface 31 has a convex shape. In the vertical direction (Y axis direction), the incident surface 31 has positive power. In the vertical direction (Y axis direction), the incident surface 31 has a convex shape.

When light is concentrated by the combination of the condensing optical element 2 and incident surface 31 as described above, the curved surface shape of the incident surface 31 may be a concave shape.

By setting the curvature of the incident surface 31 in the Y axis direction and the curvature of the incident surface 31 in the X axis direction to different values, it is possible to locate a focal position of the incident surface 31 on a Y-Z plane and a focal position of the incident surface 31 on a Z-X plane at different positions.

Further, it is possible that the power of the incident surface 31 in the Y axis direction is positive, and the power of the incident surface 31 in the X axis direction is negative.

When light is incident on the incident surface 31 having the curved surface shape, the divergence angle of the light changes. The incident surface 31 can form a light distribution pattern by changing the divergence angle of the light. The incident surface 31 has a function of forming the shape of the light distribution pattern. The incident surface 31 functions as a light distribution pattern shape forming portion.

Further, for example, by providing the incident surface 31 with a light condensing function, the condensing optical element 2 can be omitted. The incident surface 31 functions as a light condensing portion.

The incident surface 31 can be considered as an example of a light distribution pattern shape forming portion. The incident surface 31 can also be considered as an example of a light condensing portion.

However, the shape of the incident surface 31 is not limited to a curved surface shape, and may be, for example, a planar shape.

The first embodiment first describes a case where the shape of the incident surface 31 of the light guide projection optical element 3 is a convex shape having positive power.

The reflecting surface 32 is disposed at an end portion on the −Y axis direction side of the incident surface 31. The reflecting surface 32 is located on the −Y axis direction side of the incident surface 31. The reflecting surface 32 is located on the +Z axis direction side of the incident surface 31. In the first embodiment, an end portion on the −Z axis direction side of the reflecting surface 32 is connected to an end portion on the −Y axis direction side of the incident surface 31. However, the end portion on the −Z axis direction side of the reflecting surface 32 need not necessarily be connected to the end portion on the −Y axis direction side of the incident surface 31.

The reflecting surface 32 reflects light reaching the reflecting surface 32. The reflecting surface 32 has a function of reflecting light. The reflecting surface 32 functions as a light reflecting portion. The reflecting surface 32 is an example of the light reflecting portion.

The reflecting surface 32 is a surface facing in the +Y axis direction. A front surface of the reflecting surface 32 is a surface facing in the +Y axis direction. The front surface of the reflecting surface 32 is a surface for reflecting light. A back surface of the reflecting surface 32 is a surface facing in the −Y axis direction. In the first embodiment, for example, the back surface of the reflecting surface 32 does not reflect light.

The reflecting surface 32 is a surface rotated clockwise about an axis parallel to the X axis with respect to a Z-X plane, as viewed from the −X axis direction. In FIGS. 1A and 1B, the reflecting surface 32 is a surface rotated by an angle b with respect to the Z-X plane.

However, the reflecting surface 32 may be a surface parallel to a Z-X plane.

In FIGS. 1A and 1B, the reflecting surface 32 is illustrated as a flat surface. However, the reflecting surface 32 need not be a flat surface. The reflecting surface 32 may have a curved surface shape.

The reflecting surface 32 may be a curved surface having curvature only in the Y axis direction. The reflecting surface 32 may be a curved surface having curvature only in the Z axis direction. The reflecting surface 32 may be a curved surface having curvature only in the X axis direction. The reflecting surface 32 may be a curved surface having curvature in both the X axis direction and the Y axis direction. The reflecting surface 32 may be a curved surface having curvature in both the X axis direction and the Z axis direction.

In FIGS. 1A and 1B, the reflecting surface 32 is illustrated as a flat surface. Thus, a plane parallel to an optical axis $C_3$ and perpendicular to the reflecting surface 32 is a Y-Z plane. A plane including the optical axis $C_3$ and perpendicular to the reflecting surface 32 is parallel to a Y-Z plane. A plane perpendicular to this plane (the Y-Z plane) and parallel to the optical axis $C_3$ is a Z-X plane. A plane including the optical axis $C_3$ and perpendicular to this plane (the Y-Z plane) is parallel to a Z-X plane.

For example, when the reflecting surface 32 is a cylindrical surface having curvature only on a Y-Z plane, a Y-Z plane, which is a plane perpendicular to the X axis, is the plane parallel to the optical axis $C_3$ and perpendicular to the reflecting surface 32.

"Having curvature only on a Y-Z plane" refers to having curvature in the Z axis direction; or "having curvature only on a Y-Z plane" refers to having curvature in the Y axis direction.

For example, when the reflecting surface 32 is a cylindrical surface having curvature only on an X-Y plane, the reflecting surface 32 is considered as a flat surface approximating the curved surface. The plane parallel to the optical axis $C_3$ and perpendicular to the reflecting surface 32 is a plane parallel to the optical axis $C_3$ and perpendicular to the flat surface approximating the curved surface of the reflecting surface 32. For example, the least squares method or the like may be used for approximation of the curved surface.

"Having curvature only on an X-Y plane" refers to having curvature in the X axis direction.

Also, when the reflecting surface 32 is a toroidal surface, the reflecting surface 32 is considered as a flat surface approximating the curved surface. A toroidal surface is a surface having different curvatures in two orthogonal axial directions, like a surface of a barrel or a surface of a doughnut. Toroidal surfaces include cylindrical surfaces.

"Having curvature on a Y-Z plane" refers to, for example, viewing the shape of a section of the reflecting surface 32 taken in a plane parallel to a Y-Z plane. "Having curvature on a Y-Z plane" also refers to, for example, viewing the shape of the reflecting surface 32 with a Y-Z plane as a projection plane. The same applies to "having curvature only on an X-Y plane."

When a plane perpendicular to the reflecting surface 32 having a curved surface shape, the reflecting surface 32 can be considered as a flat surface approximating the curved surface. The plane parallel to the optical axis $C_3$ and perpendicular to the reflecting surface 32 is, for example, a plane parallel to the optical axis $C_3$ and perpendicular to the flat surface approximating the curved surface of the reflecting surface 32. For example, the least squares method or the like may be used for approximation of the curved surface.

The reflecting surface 32 may be a mirror surface obtained by mirror deposition. However, the reflecting surface 32 desirably functions as a total reflection surface, without mirror deposition. This is because a total reflection surface is higher in reflectance than a mirror surface, contributing to improvement in light use efficiency. Further, elimination of the step of mirror deposition can simplify the manufacturing process of the light guide projection optical element 3, contributing to reduction in the manufacturing cost of the light guide projection optical element 3. In particular, the configuration illustrated in the first embodiment has the feature that the incident angles of light rays on the reflecting surface 32 are shallow, thus allowing the reflecting surface 32 to be used as a total reflection surface, without mirror deposition. "Incident angles are shallow" indicates that the incident angles are great. The "incident angles" are angles formed by the incident directions of the incident light rays and the normal of the boundary surface.

The incident surface 34 is, for example, a surface parallel to an X-Y plane. However, the incident surface 34 may have a curved surface shape. By changing the shape of the incident surface 34 to a curved surface shape, it is possible to change the light distribution of incident light. The incident surface 34 may be, for example, a surface inclined with respect to an X-Y plane.

The incident surface 34 is located on the −Y axis direction side of the reflecting surface 32. The incident surface 34 is located on the back surface side of the reflecting surface 32. In FIGS. 1A and 1B, an end portion on the +Y axis direction side of the incident surface 34 is connected to an end portion on the +Z axis direction side of the reflecting surface 32. However, the end portion on the +Y axis direction side of the incident surface 34 need not necessarily be connected to the end portion on the +Z axis direction side of the reflecting surface 32.

In FIGS. 1A and 1B, the incident surface 34 is located at a position optically conjugate to the irradiated surface 9. "Optically conjugate" refers to a relation in which light emitted from one point is imaged at another point. The shape of light on the incident surface 34 and conjugate plane PC extending from the incident surface 34 is projected onto the irradiated surface 9. In FIGS. 1A and 1B, no light enters through the incident surface 34. Thus, the shape of light entering through the incident surface 31 on the conjugate plane PC is projected onto the irradiated surface 9.

The image (light distribution pattern) of light on the conjugate plane PC is formed on a part of the conjugate plane PC in the light guide projection optical element 3. A light distribution pattern can be formed within the conjugate plane PC in the light guide projection optical element 3 into a shape appropriate for the headlight module 100. In particular, when a single light distribution pattern is formed by using multiple headlight modules, as described later, light distribution patterns corresponding to the roles of the respective headlight modules are formed.

For example, another light source (not illustrated in FIGS. 1A and 1B) different from the light source 1 is disposed on the −Y axis direction side of the light source 1. Light emitted from the other light source enters the light guide projection optical element 3 through the incident surface 34. The light incident on the incident surface 34 is refracted at the incident surface 34. The light incident on the incident surface 34 is emitted from the emitting surface 33.

Figure 14:
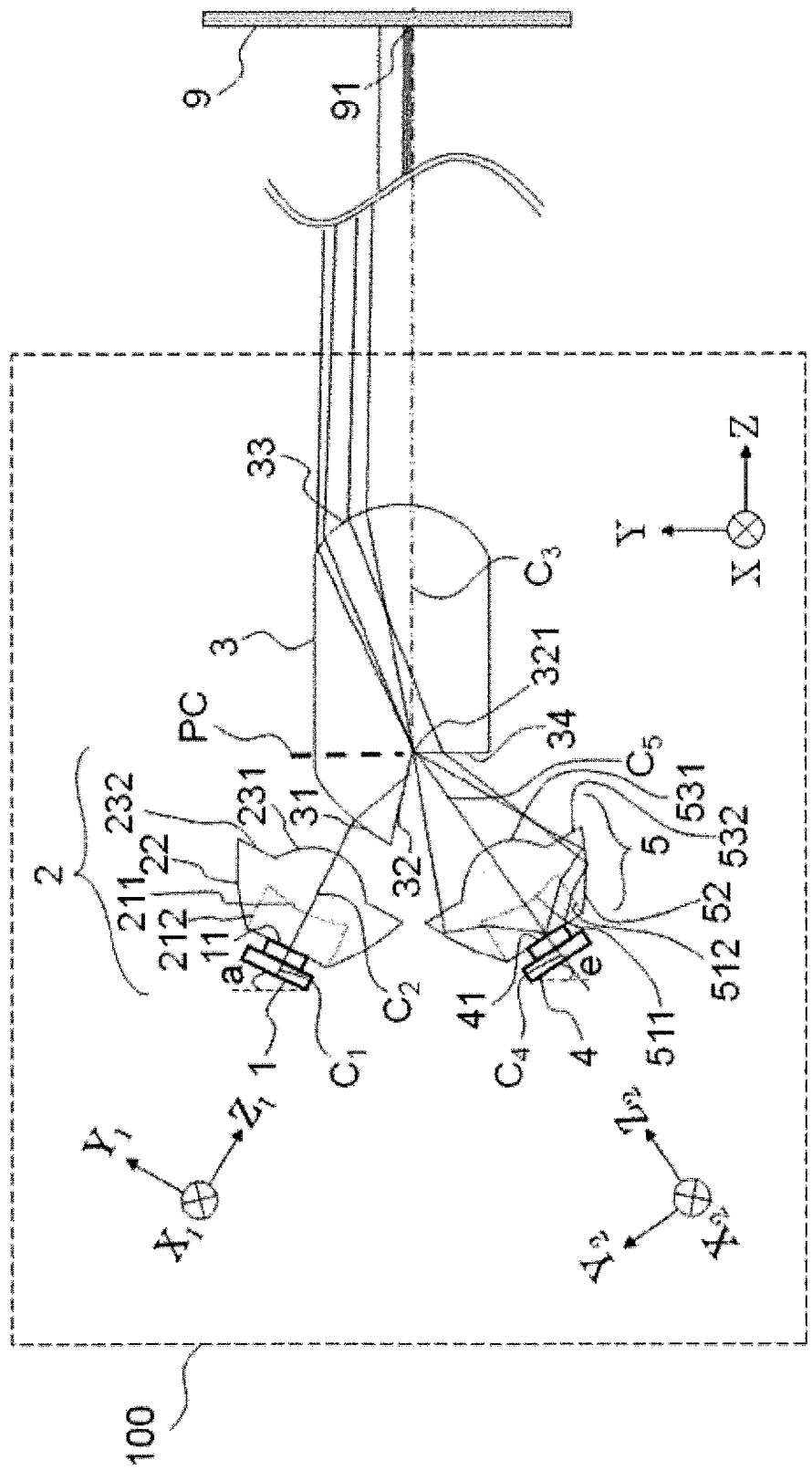
FIG. 14 is a configuration diagram illustrating a configuration of the headlight module 100 according to the first embodiment.

A configuration provided with another light source 4 is illustrated in FIG. 14.

The light source 4 and a condensing optical element 5 are arranged so that their optical axes $C_4$ and $C_5$ are inclined in the +Y axis direction by an angle e. "Their optical axes are inclined in the +Y axis direction" indicates that when viewed from the −X axis direction, their optical axes are rotated counterclockwise about the X axis.

To facilitate explanation of the light source 4 and condensing optical element 5, $X_2Y_2Z_2$ coordinates will be used as a new coordinate system. The $X_2Y_2Z_2$ coordinates are coordinates obtained by rotating the XYZ coordinates counterclockwise about the X axis by the angle e when viewed from the −X axis direction.

<Light Source 4>

The light source 4 includes a light emitting surface 41. The light source 4 emits light for providing illumination ahead of the vehicle from the light emitting surface 41. The light source 4 emits light from the light emitting surface 41.

The light source 4 is located on the −$Z_2$ axis side of the condensing optical element 5. The light source 4 is located on the −Z axis side (in back) of the light guide projection optical element 3. The light source 4 is located on the −Y axis side (lower side) of the light guide projection optical element 3.

In FIG. 14, the light source 4 emits light in the +$Z_2$ axis direction. The light source 4 may be of any type, but the following description will be made on the assumption that the light source 4 is an LED, as described above.

<Condensing Optical Element 5>

The condensing optical element 5 is located on the +$Z_2$ axis side of the light source 4. The condensing optical element 5 is also located on the −$Z_2$ axis side of the light guide projection optical element 3. The condensing optical element 5 is located on the −Z axis side (in back) of the light guide projection optical element 3. The condensing optical element 5 is located on the −Y axis side (lower side) of the light guide projection optical element 3.

The condensing optical element 5 receives light emitted from the light source 4. The condensing optical element 5 concentrates the light forward (+$Z_2$ axis direction). In FIG. 14, the condensing optical element 5 is illustrated as a condensing optical element 5 having positive power.

For example, in a case where the incident surface 34 of the light guide projection optical element 3 is provided with a light condensing function, or in other cases, the condensing optical element 5 may be omitted. When the headlight module 100 is not provided with the condensing optical element 5, the light guide projection optical element 3 receives light emitted from the light source 4. Light emitted from the light source 4 enters through the incident surface 34.

The inside of the condensing optical element 5 is filled with refractive material, for example.

In FIG. 14, the condensing optical element 5 consists of the single condensing optical element 5, but may use multiple optical elements. However, use of multiple optical elements reduces manufacturability due to reasons, such as ensuring the accuracy of positioning of each optical element.

The condensing optical element 5 includes, for example, incident surfaces 511 and 512, a reflecting surface 52, and emitting surfaces 531 and 532.

In FIG. 14, the optical axis $C_5$ of the condensing optical element 5 is parallel to the $Z_2$ axis. The optical axis $C_5$ of the condensing optical element 5 also coincides with the optical axis $C_4$ of the light source 4. Thus, the optical axis $C_4$ of the light source 4 is parallel to the $Z_2$ axis.

The detailed configuration and function of the condensing optical element 5 are the same as those of the condensing optical element 2. Thus, the description of the condensing optical element 2 applies to the condensing optical element 5. However, optical properties, such as a focal length, of the condensing optical element 5 may be different from those of the condensing optical element 2.

The incident surface 511 of the condensing optical element 5 corresponds to the incident surface 211 of the condensing optical element 2. The incident surface 512 of the condensing optical element 5 corresponds to the incident surface 212 of the condensing optical element 2. The emitting surface 531 of the condensing optical element 5 corresponds to the emitting surface 231 of the condensing optical element 2. The emitting surface 532 of the condensing optical element 5 corresponds to the emitting surface 232 of the condensing optical element 2. The reflecting surface 52 of the condensing optical element 5 corresponds to the reflecting surface 22 of the condensing optical element 2.

The light source 4 and condensing optical element 5 are disposed on the lower side (−Y axis direction side) of the light guide projection optical element 3. The light source 4 and condensing optical element 5 are also disposed in back (on the −Z axis direction side) of the light guide projection optical element 3. As illustrated in FIG. 14, the condensing optical element 5 is disposed on the lower side (−Y axis direction side) of the condensing optical element 2. Further, in the headlight module 100, the light source 4 is disposed on the lower side (−Y axis direction side) of the light source 1.

As illustrated in FIG. 14, light concentrated by the condensing optical element 5 reaches the incident surface 34 of the light guide projection optical element 3. The incident surface 34 is a refractive surface. In FIG. 14, the incident surface 34 has a planar shape. Light entering through the incident surface 34 is refracted at the incident surface 34. Light incident on the incident surface 34 is emitted from the emitting surface 33.

The inside of the light guide projection optical element 3 illustrated in FIG. 14 is filled with refractive material, for example.

The incident surface 34 is in a conjugate relation with the irradiated surface 9. That is, the incident surface 34 is located at a position optically conjugate to the irradiated surface 9. Thus, an image of a light distribution pattern formed on the incident surface 34 by the condensing optical element 5 is magnified and projected by the light guide projection optical element 3 onto the irradiated surface 9 in front of the vehicle. The light distribution pattern formed on the incident surface 34 by the condensing optical element 5 is magnified and projected by the light guide projection optical element 3 onto the irradiated surface 9 in front of the vehicle.

The incident surface 34 is located on the lower side (−Y axis direction side) of a ridge line portion 321. Thus, the image of the light distribution pattern formed on the incident surface 34 is projected on the upper side (+Y axis direction side) of a cutoff line 91 on the irradiated surface 9. The light distribution pattern formed on the incident surface 34 is projected on the upper side (+Y axis direction side) of the cutoff line 91 on the irradiated surface 9. Thus, the light source 4 and condensing optical element 5 can illuminate an area to be illuminated by the high beam.

Further, by adjusting a light concentration position of the light emitted from the condensing optical element 5 as illustrated in FIG. 14, the light distribution of the high beam can be changed. Further, by adjusting the geometric relationship between the condensing optical element 5 and the light guide projection optical element 3, the light distribution of the high beam can be changed.

"Adjusting the geometric relationship" refers to, for example, adjusting the positional relationship between the condensing optical element 5 and the light guide projection optical element 3 in the direction (Z axis direction) of the optical axis $C_3$. Depending on the positional relationship between the condensing optical element 5 and the light guide projection optical element 3 in the direction of the optical axis $C_3$, the size of the light concentration spot of light concentrated by the condensing optical element 5 on the incident surface 34 varies. That is, the light beam diameter of light concentrated by the condensing optical element 5 on the incident surface 34 varies. Accordingly, the light distribution on the irradiated surface 9 varies.

In the above example, the incident surface 34 is located on the conjugate plane PC. However, the incident surface 34 may be located on the −Z axis direction side of the conjugate plane PC. That is, the conjugate plane PC is located on the +Z axis side of the incident surface 34. The conjugate plane PC is located inside the light guide projection optical element 3.

In such a configuration, an image of a light distribution pattern formed on the conjugate plane PC on the lower side (−Y axis direction side) of the ridge line portion 321 can be controlled with the shape of the incident surface 34. The light distribution pattern can be controlled with the shape of the incident surface 34.

For example, the incident surface 34 has a curved surface shape having positive power. Light emitted from the condensing optical element 5 is concentrated at the ridge line portion 321. In such a case, a light distribution pattern in which a region on the upper side (+Y axis side) of the cutoff line 91 is illuminated most brightly is obtained.

As such, by changing the shape of the incident surface 34, it is possible to easily control the light distribution pattern of the high beam.

Such a control of the light distribution pattern can be performed with the condensing optical element 5. However, even when the condensing optical element 5 is not provided, it is possible to control the light distribution pattern by changing the shape of the incident surface 34. Also, it is possible to control the light distribution pattern with the total power of the combination of the condensing optical element 5 and incident surface 34.

As above, with the headlight module 100 illustrated in FIG. 14, both of the light distribution pattern of the low beam and the light distribution pattern of the high beam can be easily formed by the single headlight module. Thus, it is not necessary to separately provide a headlight module for the high beam and a headlight module for the low beam. This makes it possible to provide a headlight device smaller than a conventional headlight device.

Further, it is possible to prevent the light emitting region from varying between when only the low beam is lighted and when both the low beam and high beam are simultaneously lighted. This can improve the design when the headlight device is lighted.

The ridge line portion 321 is an edge on the −Y axis direction side of the reflecting surface 32. The ridge line portion 321 is an edge on the +Z axis direction side of the reflecting surface 32. The ridge line portion 321 is an edge on the +Y axis direction side of the incident surface 34. The ridge line portion 321 is located at a position optically conjugate to the irradiated surface 9.

In general, "ridge line" refers to a boundary between one surface and another surface. However, "ridge line" here includes an end portion of a surface. In the first embodiment, the ridge line portion 321 is a portion joining the reflecting surface 32 and the incident surface 34. That is, a portion where the reflecting surface 32 and the incident surface 34 are connected to each other is the ridge line portion 321.

However, for example, when the light guide projection optical element 3 is hollow and the incident surface 34 is an opening portion, the ridge line portion 321 is an end portion of the reflecting surface 32. The ridge line portion 321 includes a boundary between one surface and another surface. The ridge line portion 321 also includes an end portion of a surface. As described above, in the first embodiment, the inside of the light guide projection optical element 3 is filled with refractive material.

The ridge line portion 321 forms the shape of the cutoff line 91 of the light distribution pattern. This is because the ridge line portion 321 is located at a position optically conjugate to the irradiated surface 9. The light distribution pattern on the irradiated surface 9 has a shape similar to that of the light distribution pattern on the conjugate plane PC including the ridge line portion 321. Thus, the ridge line portion 321 is preferably formed into the shape of the cutoff line 91.

"Ridge line" is not limited to a straight line, and includes a curved line or the like. For example, the ridge line may have a "rising line" shape.

This makes it possible to easily form a "rising line" along which the irradiation on a walkway side (left side) rises for identification of pedestrians and signs. This description is based on the assumption that the vehicle travels on the left side of a road.

In the first embodiment, as an example, the ridge line portion 321 has a straight line shape. In the first embodiment, the ridge line portion 321 has a straight line shape parallel to the X axis.

Further, in the first embodiment, the ridge line portion 321 is an edge on the +Y axis direction side of the incident surface 34. Since the ridge line portion 321 is on the incident surface 34, it is also located at a position optically conjugate to the irradiated surface 9.

Further, in the first embodiment, the ridge line portion 321 intersects with the optical axis $C_3$ of the light guide projection optical element 3. The ridge line portion 321 intersects at a right angle with the optical axis $C_3$ of the emitting surface 33.

The ridge line portion 321 need not necessarily intersect with the optical axis $C_3$ of the emitting surface 33. The ridge line portion 321 may be non-parallel to and non-intersecting with the optical axis $C_3$.

The emitting surface 33 is disposed at an end portion on the +Z axis direction side of the light guide projection optical element 3. As described later, the emitting surface 33 mainly emits light reflected by the reflecting surface 32. The emitting surface 33 emits light reflected by the reflecting surface 32.

The emitting surface 33 is disposed at the end portion on the +Z axis direction side of the light guide projection optical element 3. The emitting surface 33 has a curved surface shape having positive power. The emitting surface 33 has a convex shape projecting in the +Z axis direction. The emitting surface 33 has positive power.

The optical axis $C_3$ is a normal passing through a surface apex of the emitting surface 33. In the case of FIGS. 1A and 1B, the optical axis $C_3$ is an axis passing through the surface apex of the emitting surface 33 and being parallel to the Z axis. When the surface apex of the emitting surface 33 moves parallel to the X axis direction or Y axis direction in an X-Y plane, the optical axis $C_3$ also moves parallel to the X axis direction or Y axis direction similarly. Further, when the emitting surface 33 tilts with respect to an X-Y plane, the normal at the surface apex of the emitting surface 33 also tilts with respect to the X-Y plane and thus the optical axis $C_3$ also tilts with respect to the X-Y plane.

For example, when the emitting surface 33 has curvature only in the Y axis direction, it is assumed to be a center between the side surface 395a and the side surface 395b, in the X axis direction of the optical axis $C_3$.

In FIGS. 1A and 1B, the emitting surface 33 has a function as a cylindrical lens. The emitting surface 33 has curvature only in the Y axis direction, and has no curvature in the X axis direction. The emitting surface 33 has no power in a direction corresponding to the horizontal direction. The emitting surface 33 may be a toroidal surface. As described above, the emitting surface 33 is an example of the projection optical portion for projecting a light distribution pattern.

The side surfaces 395 are a surface on the +X axis side and a surface on the −X axis side of the light guide projection optical element 3. The side surface 395a is the surface on the +X axis side. The side surface 395b is the surface on the −X axis side. When the side surfaces 395a and 395b are collectively described, they are referred to as the side surfaces 395.

The side surfaces 395a and 395b are located so that a Y-Z plane is sandwiched between the side surfaces 395a and 395b, between the reflecting surface 32 and the emitting surface 33. In this case, for example, the Y-Z plane includes the optical axis $C_3$ of the emitting surface 33.

For example, the side surfaces 395a and 395b are parallel to a plane including the optical axis $C_3$ and being perpendicular to the reflecting surface 32. Also, for example, the side surfaces 395a and 395b are located symmetrically with respect to a plane including the optical axis $C_3$ and being perpendicular to the reflecting surface 32.

The side surfaces 395a and 395b are located between the reflecting surface 32 and the emitting surface 33. The side surfaces 395a and 395b are disposed so that light guided inside the light guide projection optical element 3 is sandwiched between the side surfaces 395a and 395b, in a direction corresponding to the horizontal direction of the vehicle.

For example, "direction corresponding to the horizontal direction of the vehicle" indicates, for example, that when the "direction corresponding to the horizontal direction of the vehicle" is assumed to be a certain direction of a light distribution pattern, the certain direction of the light distribution pattern formed in the light guide projection optical element 3 corresponds to a horizontal direction of the light distribution pattern when it is projected outside from the vehicle. Likewise, "direction corresponding to the vertical direction of the vehicle" indicates, for example, that when the "direction corresponding to the vertical direction of the vehicle" is assumed to be a certain direction of a light distribution pattern, the certain direction of the light distribution pattern formed in the light guide projection optical element 3 corresponds to a vertical direction of the light distribution pattern when it is projected outside from the vehicle. The same applies to a light beam in place of the light distribution pattern.

Light rays entering through the incident surface 31 are reflected by the side surfaces 395a and 395b and reach the emitting surface 33. Light rays reflected by the reflecting surface 32 are reflected by the side surface 395a or 395b and reach the emitting surface 33.

The side surfaces 395a and 395b are reflecting surfaces for reflecting light. The side surfaces 395a and 395b also guide light.

The reflection of light by the side surfaces 395a and 395b is desirably total reflection, as described above. However, it is possible to apply reflecting coating to the side surfaces 395a and 395b. It is also possible to dispose reflecting plates or the like at the side surfaces 395a and 395b.

<Behavior of Light Rays>

As illustrated in FIGS. 1A and 1B, light concentrated by the condensing optical element 2 enters the light guide projection optical element 3 through the incident surface 31. As described above, when the condensing optical element 2 is not provided, light emitted from the light source 1 enters the light guide projection optical element 3 through the incident surface 31.

The incident surface 31 is a refractive surface. The light incident on the incident surface 31 is refracted at the incident surface 31. The incident surface 31 has, for example, a convex shape projecting in the −Z axis direction. The incident surface 31 has, for example, positive power.

In the first embodiment, the curvature of the incident surface 31 in the X axis direction contributes to a "width of a light distribution" in a horizontal direction with respect to a road surface. The curvature of the incident surface 31 in the Y axis direction contributes to a "height of the light distribution" in a vertical direction with respect to the road surface. In the first embodiment, the X axis direction of the incident surface 31 is a direction corresponding to the horizontal direction of the vehicle. The X axis direction of the incident surface 31 corresponds to a horizontal direction of the light distribution pattern projected from the vehicle. The Y axis direction of the incident surface 31 is a direction corresponding to the vertical direction of the vehicle. The Y axis direction of the incident surface 31 corresponds to a vertical direction of the light distribution pattern projected from the vehicle.

<Behavior of Light Rays on Z-X Plane>

When viewed in a Z-X plane, the incident surface 31 has a convex shape. The incident surface 31 has positive power with respect to a horizontal direction (X axis direction). Thus, the light incident on the incident surface 31 propagates while further concentrated by the incident surface 31 of the light guide projection optical element 3. "Propagate" refers to traveling of light in the light guide projection optical element 3.

Here, "when viewed in a Z-X plane" refers to being viewed from the Y axis direction. That is, it refers to being projected onto a Z-X plane and viewed. Here, the Z-X plane is a projection plane.

When viewed in a Z-X plane, the light propagating in the light guide component 3 is concentrated at the arbitrary light concentration position PH in the light guide component 3 by the condensing optical element 2 and the incident surface 31 of the light guide projection optical element 3, as illustrated in FIG. 1B. The light concentration position PH is indicated by a dashed line in FIG. 1B. The light concentration position PH indicates that light density per unit area on an X-Y plane is high.

When viewed in a Z-X plane, the light propagating in the light guide component 3 is concentrated at the light concentration position PH by the condensing optical element 2 and the incident surface 31 of the light guide projection optical element 3. In FIG. 1B, the light concentration position PH is located in the light guide component 3. When the condensing optical element 2 is not provided, the light propagating in the light guide component 3 is concentrated at the light concentration position PH by the incident surface 31 of the light guide projection optical element 3.

In FIG. 1B, the light concentrated at the light concentration position PH diverges from the light concentration position PH. The light diverging from the light concentration position PH is repeatedly reflected by the side surfaces 395a and 395b and reaches the emitting surface 33, for example. The light diverging from the light concentration position PH is reflected by the side surfaces 395a and 395b and reaches the emitting surface 33, for example.

In FIGS. 1A and 1B, the emitting surface 33 is, for example, a cylindrical lens. The emitting surface 33 has no curvature in the X axis direction. Thus, when viewed in a Z-X plane, the light rays are not concentrated by the emitting surface 33. The light rays are not caused to diverge by the emitting surface 33.

Thus, the divergence angle of light controlled by the condensing optical element 2 and incident surface 31 is not changed by the emitting surface 33. The divergence angle on a Z-X plane corresponds to the "width of the light distribution" on the irradiated surface 9. By changing the curvature of the incident surface 31 in the X axis direction, it is possible to change the width of the light distribution.

In a direction corresponding to the horizontal direction (X axis direction) of the vehicle, the divergence angle of the light emitted from the light guide projection optical element 3 depends on reflection in a light guide portion 3b. For example, when the side surfaces 395a and 395b are parallel to each other, the divergence angle of the emitted light is changed by the condensing optical element 2 and incident surface 31. The divergence angle of the emitted light is maintained by reflection in the light guide portion 3b. When the side surfaces 395a and 395b are not parallel to each other as viewed on a Z-X plane, as described later with reference to FIGS. 9 and 10, the divergence angle of the emitted light is changed by reflection in the light guide portion 3b.

The emitting surface 33 may have curvature in the X axis direction. In this case, a focal length of the emitting surface 33 on a Z-X plane is longer than a focal length of the emitting surface 33 on a Y-Z plane. The curvature of the emitting surface 33 on a Z-X plane is smaller than the curvature of the emitting surface 33 on a Y-Z plane. The power of the emitting surface 33 on a Z-X plane is smaller than the power of the emitting surface 33 on a Y-Z plane.

A focal position of the emitting surface 33 on a Y-Z plane is located on the emitting surface 33 side of a position where light entering through the incident surface 31 is reflected by the reflecting surface 32. Thereby, it is possible to superpose light reaching the conjugate plane PC after being reflected by the reflecting surface 32 and light reaching the conjugate plane PC directly from the incident surface 31, on the conjugate plane PC, as described later. With this superposition of light, it is possible to form the high illuminance region in the light distribution pattern.

In a direction corresponding to the vertical direction (Y axis direction) of the vehicle, the focal position of the emitting surface 33 is located on the emitting surface 33 side of a position where the light distribution pattern is formed by light emitted from the light source 1. Here, the emitting surface 33 is an example of a projection optical portion.

A focal position of the emitting surface 33 on a Z-X plane is located on the reflecting surface 32 side of a position where the repetitive reflection of light by the side surfaces 395a and 395b ends. Thus, the focal position of the emitting surface 33 on a Z-X plane is not in a conjugate relation with the irradiated surface 9.

A focal position of the emitting surface 33 in a direction corresponding to the horizontal direction (X axis direction) of the vehicle is located on the same side of a position where the reflection of light guided in the light guide portion 3b ends as a position where the light distribution pattern is formed. Alternatively, the power of the emitting surface 33 in a direction corresponding to the horizontal direction (X axis direction) of the vehicle is a negative value.

In the light guide projection optical element 3 described in the first embodiment, a portion from the incident surface 31 to the reflecting surface 32 is a reflection portion 3a. In the reflection portion 3a, a light distribution pattern is formed. Thus, the reflection portion 3a is a light distribution pattern forming portion.

The portion on the +Z axis side of the reflecting surface 32 is the light guide portion 3b. In the horizontal direction (X axis direction), the light guide portion 3b guides light emitted from the light source 1 by reflection. In the horizontal direction (X axis direction), the light guided in the light guide portion 3b is emitted at a divergence angle depending on reflection in the light guide portion 3b.

Thus, a light distribution pattern at the focal position of the emitting surface 33 on a Z-X plane is not projected onto the irradiated surface 9. The light distribution pattern on the irradiated surface 9 in the X axis direction depends on the divergence angle of light emitted from the emitting surface 33.

When a focal point of the emitting surface 33 on a Z-X plane is located at infinity in the −Z axis direction, the emitting surface 33 is a cylindrical surface.

<Behavior of Light Rays on Y-Z Plane>

On the other hand, when the light entering through the incident surface 31 is viewed in a Y-Z plane, the light refracted at the incident surface 31 travels in the light guide projection optical element 3 and is guided to the reflecting surface 32. The light entering through the incident surface 31 reaches the reflecting surface 32. Here, the Y-Z plane is a projection surface.

Light entering the light guide projection optical element 3 and reaching the reflecting surface 32 enters the light guide projection optical element 3 and directly reaches the reflecting surface 32. "Directly reaches" refers to reaching without being reflected by another surface or the like. Light entering the light guide projection optical element 3 and reaching the reflecting surface 32 reaches the reflecting surface 32 without being reflected by another surface or the like. That is, light reaching the reflecting surface 32 undergoes the first reflection in the light guide projection optical element 3.

Further, the light reflected by the reflecting surface 32 is directly emitted from the emitting surface 33. That is, the light reflected by the reflecting surface 32 reaches the emitting surface 33 without being reflected by another surface or the like. That is, the light undergoing the first reflection at the reflecting surface 32 reaches the emitting surface 33 without undergoing further reflection.

In FIGS. 1A and 1B, light emitted from the part of the emitting surfaces 231 and 232 of the condensing optical element 2 on the $+Y_1$ axis direction side of the optical axis $C_2$ of the condensing optical element 2 is guided to the reflecting surface 32. Light emitted from the part of the emitting surfaces 231 and 232 of the condensing optical element 2 on the $-Y_1$ axis direction side of the optical axis $C_2$ of the condensing optical element 2 is emitted from the emitting surface 33 without being reflected by the reflecting surface 32.

That is, part of the light entering the light guide projection optical element 3 reaches the reflecting surface 32. The light reaching the reflecting surface 32 is reflected by the reflecting surface 32 and emitted from the emitting surface 33.

By setting the inclination angle a of the light source 1 and condensing optical element 2, it is possible to cause all the light emitted from the condensing optical element 2 to be reflected by the reflecting surface 32. Further, by setting the inclination angle b of the reflecting surface 32, it is possible to cause all the light emitted from the condensing optical element 2 to be reflected by the reflecting surface 32.

Further, by setting the inclination angle a of the light source 1 and condensing optical element 2, it is possible to reduce the length of the light guide projection optical element 3 in the direction of the optical axis $C_3$ (Z axis direction), and shorten the depth (length in the Z axis direction) of an optical system. Here, "optical system" refers to, in the first embodiment, an optical system including, as its components, the condensing optical element 2 and light guide projection optical element 3. As described above, the condensing optical element 2 may be omitted.

Further, by setting the inclination angle a of the light source 1 and condensing optical element 2, it becomes easy to guide light emitted from the condensing optical element 2 to the reflecting surface 32. Thus, it becomes easy to efficiently concentrate light at a region on the inner side (+Y axis direction side) of the ridge line portion 321 on the conjugate plane PC.

By concentrating light emitted from the condensing optical element 2 on the conjugate plane PC side of the reflecting surface 32, it is possible to increase the emission amount of light emitted from a region on the +Y axis side of the ridge line portion 321. This is because light reaching the conjugate plane PC after being reflected by the reflecting surface 32 and light reaching the conjugate plane PC without being reflected by the reflecting surface 32 are superposed. In this case, an intersection between a central light ray emitted from the condensing optical element 2 and the reflecting surface 32 is located on the conjugate plane PC side of the reflecting surface 32.

Thus, it becomes easy to brighten a region (region 92) on the lower side of the cutoff line 91 of the light distribution pattern projected on the irradiated surface 9. Further, the reduction in the length of the light guide projection optical element 3 in the direction (Z axis direction) of the optical axis $C_3$ reduces internal absorption of light in the light guide projection optical element 3, improving the light use efficiency.

"Internal absorption" refers to light loss inside the material except loss due to surface reflection when light passes through a light guide component (in this embodiment, the light guide projection optical element 3). The internal absorption increases as a length of the light guide component increases.

For a typical light guide element, light travels inside the light guide element while being repeatedly reflected by a side surface of the light guide element. Thereby, the intensity distribution of the light is equalized. In the first embodiment, in the vertical direction (Y axis direction), light entering the light guide projection optical element 3 is reflected by the reflecting surface 32 once and emitted from the emitting surface 33. In this respect, the way of using the light guide projection optical element 3 in the first embodiment differs from the conventional way of using a light guide element.

Further, in general, when a light guide element is used to project light, a focal position of a projection lens is located on an emitting surface of the light guide element. In the first embodiment, the focal position of the emitting surface 33 (a projection lens) is located on the reflecting surface 32 side of a position (an emitting surface of a light guide element) where the repetitive reflection of light by the side surfaces 395a and 395b ends. The focal position of the emitting surface 33 (a projection lens) is located on the reflection portion 3a side of a position (an emitting surface of a light guide element) where the repetitive reflection of light by the side surfaces 395a and 395b ends. In this respect, the way of using the light guide projection optical element 3 in the first embodiment differs from the conventional way of using a light guide element. The emitting surface 33 corresponds to a projection lens. The position where the reflection of light ends corresponds to an emitting surface of a light guide element. In the headlight module 100 described in the first embodiment, a focal point of the projection lens is located inside the light guide element.

In a light distribution pattern specified in road traffic rules or the like, the region (region 92) on the lower side (−Y axis direction side) of the cutoff line 91 has the highest illuminance, for example. As described above, the ridge line portion 321 of the light guide projection optical element 3 is in a conjugate relation with the irradiated surface 9, in the vertical direction (Y axis direction). Thus, to make the region on the lower side (−Y axis direction side) of the cutoff line 91 have the highest illuminance, it is required to make a region on the upper side (+Y axis direction side) of the ridge line portion 321 of the light guide projection optical element 3 have the highest luminous intensity.

It is not necessarily required that the ridge line portion 321 and the optical axis $C_3$ of the emitting surface 33 intersect with each other. The ridge line portion 321 may be displaced from the optical axis $C_3$ in the Y axis direction. In this case, for example, the optical axis $C_3$ is projected onto a plane including the ridge line portion 321 and being parallel to a Z-X plane. The plane (conjugate plane PC) including an intersection of the projected straight line parallel to the optical axis $C_3$ and the ridge line portion 321 and being parallel to an X-Y plane may be in a conjugate relation with the irradiated surface 9.

To produce a light distribution pattern in which a region on the lower side (−Y axis direction side) of the cutoff line 91 has the highest illuminance, it is effective that, when viewed in a Y-Z plane, part of the light entering through the incident surface 31 of the light guide projection optical element 3 is reflected by the reflecting surface 32, as illustrated in FIG. 1A.

This is because light entering through the incident surface 31 and reaching a region on the +Y axis direction side of the ridge line portion 321 without being reflected by the reflecting surface 32 and light entering through the incident surface 31 and reaching the region on the +Y axis direction side of the ridge line portion 321 after being reflected by the reflecting surface 32 are superposed on the conjugate plane PC.

In the vertical direction (Y axis direction), the light reaching the conjugate plane PC without being reflected by the reflecting surface 32 and the light reaching the conjugate plane PC after being reflected by the reflecting surface 32 are superposed in a region on the conjugate plane PC corresponding to the high illuminance region on the irradiated surface 9. Such a configuration makes it possible to make a region on the upper side (+Y axis direction side) of the ridge line portion 321 have the highest luminous intensity on the conjugate plane PC.

The headlight module 100 forms a region having high luminous intensity by superposing, on the conjugate plane PC, light reaching the conjugate plane PC without being reflected by the reflecting surface 32 and exiting through the emitting surface 33 and light reaching the conjugate plane PC after being reflected by the reflecting surface 32. The position of the region having high luminous intensity on the conjugate plane PC can be changed by changing the reflection position of the light on the reflecting surface 32.

By setting the reflection position of the light on the reflecting surface 32 near the conjugate plane PC, it is possible to set the region having high luminous intensity near the ridge line portion 321 on the conjugate plane PC. Thus, it is possible to set a region having high illuminance on the lower side of the cutoff line 91 on the irradiated surface 9.

Further, the amount of the superposed light can be adjusted by changing the curvature of the incident surface 31 in the vertical direction (Y axis direction), as in the case of adjusting the width of the light distribution in the horizontal direction. "Amount of the superposed light" refers to the amount of light resulting from the superposition of the light reaching the region on the +Y axis direction side of the ridge line portion 321 (on the conjugate plane PC) without being reflected by the reflecting surface 32 and the light reaching the region on the +Y axis direction side of the ridge line portion 321 (on the conjugate plane PC) after being reflected by the reflecting surface 32. The superposition of the light is performed on the conjugate plane PC.

In this manner, by adjusting the curvature of the incident surface 31, the light distribution can be adjusted. By adjusting the curvature of the incident surface 31, a desired light distribution can be obtained.

Further, by adjusting the geometric relationship between the condensing optical element 2 and the light guide projection optical element 3, the light distribution can be adjusted. By adjusting the geometric relationship between the condensing optical element 2 and the light guide projection optical element 3, a desired light distribution can be obtained.

Here, "desired light distribution" refers to, for example, a predetermined light distribution or the like specified in road traffic rules or the like. When a single light distribution pattern is formed by using multiple headlight modules, as described later, "desired light distribution" refers to a light distribution required for each headlight module.

"Geometric relationship" refers to, for example, the positional relationship between the condensing optical element 2 and the light guide projection optical element 3 in the direction of the optical axis $C_3$.

As the distance from the condensing optical element 2 to the light guide projection optical element 3 decreases, the amount of light reflected by the reflecting surface 32 decreases, and the dimension of the light distribution in the vertical direction (Y axis direction) decreases. That is, the height of the light distribution pattern decreases.

Conversely, as the distance from the condensing optical element 2 to the light guide projection optical element 3 increases, the amount of light reflected by the reflecting surface 32 increases, and the dimension of the light distribution in the vertical direction (Y axis direction) increases. That is, the height of the light distribution pattern increases.

Further, the position of the superposed light can be changed by adjusting the position of the light reflected by the reflecting surface 32.

"Position of the superposed light" refers to the position at which the light reaching the region on the +Y axis direction side of the ridge line portion 321 (on the conjugate plane PC) without being reflected by the reflecting surface 32 and the light reaching the region on the +Y axis direction side of the ridge line portion 321 (on the conjugate plane PC) after being reflected by the reflecting surface 32 are superposed on the conjugate plane PC. That is, it refers to a high luminous intensity region on the conjugate plane PC. The high luminous intensity region is a region on the conjugate plane PC corresponding to the high illuminance region on the irradiated surface 9.

Further, by adjusting a light concentration position of the light reflected by the reflecting surface 32, the height of the high luminous intensity region on the conjugate plane PC can be adjusted. Specifically, when the light concentration position is near the conjugate plane PC, the dimension of the high luminous intensity region in the height direction is small. Conversely, when the light concentration position is far from the conjugate plane PC, the dimension of the high luminous intensity region in the height direction is large.

In the above description, the high illuminance region is described as a region on the lower side (−Y axis direction side) of the cutoff line 91. This is the position of the high illuminance region in the light distribution pattern on the irradiated surface 9.

As described later, for example, a single light distribution pattern may be formed on the irradiated surface 9 by using multiple headlight modules. In such a case, the high luminous intensity region on the conjugate plane PC of each headlight module is not necessarily a region on the +Y axis direction side of the ridge line portion 321. For each headlight module, the high luminous intensity region is formed, on the conjugate plane PC, at a position appropriate for the light distribution pattern of the headlight module.

As described above, by adjusting the curvature of the incident surface 31 of the light guide projection optical element 3 in the horizontal direction, it is possible to control the width of the light distribution pattern or the width of the high illuminance region. By adjusting the light concentration position PH in the horizontal direction, it is possible to control the width of the light distribution pattern or the width of the high illuminance region. By adjusting the curvature of the incident surface 31 of the light guide projection optical element 3 in a direction corresponding to the horizontal direction of the light distribution pattern, it is possible to control the width of the light distribution pattern or the width of the high illuminance region.

By adjusting the curvature of the incident surface 31 of the light guide projection optical element 3 in the vertical direction, it is possible to control the height of the light distribution pattern or the height of the high illuminance region. By adjusting the light concentration position PH in the vertical direction, it is possible to control the height of the light distribution pattern or the height of the high illuminance region. By adjusting the curvature of the incident surface 31 of the light guide projection optical element 3 in a direction corresponding to the vertical direction of the light distribution pattern, it is possible to control the height of the light distribution pattern or the height of the high illuminance region.

As such, the light concentration position in the horizontal direction and the light concentration position in the vertical direction need not necessarily coincide with each other. By independently setting the light concentration position in the horizontal direction and the light concentration position in the vertical direction, it is possible to control the shape of the light distribution pattern or the shape of the high illuminance region. In this case, for example, the incident surface 31 is a toroidal surface.

The light concentration position PH in the vertical direction is a light concentration position when light rays are projected onto a Y-Z plane. That is, it is the light concentration position illustrated in FIG. 1A. The light concentration position PH in the horizontal direction is a light concentration position when light rays are projected onto a Z-X plane. That is, it is the light concentration position illustrated in FIG. 1B.

An image of the light distribution pattern formed on the conjugate plane PC is magnified and projected by the emitting surface 33 onto the irradiated surface 9 in front of the vehicle. The light distribution pattern formed on the conjugate plane PC is projected by the emitting surface 33.

In FIGS. 1A and 1B, the emitting surface 33 is a cylindrical lens having positive power only in the Y axis direction. The emitting surface 33 has a convex shape only in the Y axis direction. A focal position of the emitting surface 33 in the Y axis direction coincides with the position (position in the Z axis direction) of the ridge line portion 321 on the optical axis $C_3$, for example. That is, a focal position of the emitting surface 33 in the Y axis direction is located at an intersection between the ridge line portion 321 and the optical axis $C_3$.

In the Z axis direction (the direction of the optical axis $C_3$), the position of a focal point of the emitting surface 33 in the Y axis direction coincides with the position of the ridge line portion 321. Thus, the ridge line portion 321 is located on a plane including a focal position of the emitting surface 33 in the Y axis direction and being perpendicular to the optical axis $C_3$.

In a conventional headlight device, since a light blocking plate and a projection lens are used, positional variation between the components causes variation, such as deformation of the cutoff line or variation of light distribution.

However, for the light guide projection optical element 3, depending on the accuracy of the shape of the single component, it is possible to make a focal position of the emitting surface 33 coincide with the position of the ridge line portion 321, in the direction of the optical axis $C_3$. Here, for example, since the emitting surface 33 is a cylindrical surface, the focal position is a focal position of the curved surface in the Y axis direction.

Thereby, the headlight module 100 can reduce variation, such as deformation of the cutoff line 91 or variation of light distribution. This is because, in general, the accuracy of the shape of a single component can be improved more easily than the positional accuracy between two components.

FIGS. 3A and 3B are diagrams for explaining the shape of the reflecting surface 32 of the light guide projection optical element 3 of the headlight module 100 according to the first embodiment. FIGS. 3A and 3B illustrate the part from the incident surface 31 to the conjugate plane PC of the light guide projection optical element 3. That is, FIGS. 3A and 3B illustrate the reflection portion 3a.

FIG. 3A illustrates, for comparison, a case where the reflecting surface 32 is not inclined with respect to a Z-X plane. Thus, the reflecting surface 32 illustrated in FIG. 3A is parallel to a Z-X plane. FIG. 3B illustrates the shape of the reflecting surface 32 of the light guide projection optical element 3.

The reflecting surface 32 of the light guide projection optical element 3 illustrated in FIG. 3B is not a surface parallel to a Z-X plane. For example, as illustrated in FIG. 3B, the reflecting surface 32 is a flat surface inclined about the X axis with respect to a Z-X plane.

The reflecting surface 32 of the light guide projection optical element 3 is a surface rotated clockwise about the X axis, as viewed from the −X axis direction. In FIG. 3B, the reflecting surface 32 is a surface rotated by an angle f with respect to a Z-X plane. The end portion on the incident surface 31 side of the reflecting surface 32 is located on the +Y axis side of the end portion on the conjugate plane PC side. The angle f in FIG. 3B is shown as the angle b in FIG. 41A.

The reflecting surface 32 of the light guide projection optical element 3 illustrated in FIG. 3A is a flat surface parallel to a Z-X plane. Light entering through the incident surface 31 is reflected by the reflecting surface 32 and reaches the conjugate plane PC.

The incident angle of light on the reflecting surface 32 is an incident angle $S_1$. The reflection angle of the light at the reflecting surface 32 is a reflection angle $S_2$. According to the law of reflection, the reflection angle $S_2$ is equal to the incident angle $S_1$. A perpendicular line $m_1$ to the reflecting surface 32 is indicated by a dot-and-dash line in FIG. 3A.

The perpendicular line is a straight line that intersects at a right angle with another straight line or a plane.

The light is incident on the conjugate plane PC at an incident angle $S_3$. The light is emitted from the conjugate plane PC at an emission angle $S_{out1}$. The emission angle $S_{out1}$ is equal to the incident angle $S_3$. A perpendicular line $m_2$ to the conjugate plane PC is indicated by a dot-and-dash line in FIG. 3A. The perpendicular line $m_2$ to the conjugate plane PC is parallel to the optical axis $C_3$.

Since the light is greatly refracted at the incident surface 31, the emission angle $S_{out1}$ of the light emitted from the conjugate plane PC is great. As the emission angle $S_{out1}$ becomes greater, the aperture of the emitting surface 33 becomes larger. This is because light having a great emission angle $S_{out1}$ reaches a position away from the optical axis $C_3$ on the emitting surface 33.

On the other hand, the reflecting surface 32 of the light guide projection optical element 3 illustrated in FIG. 3B is inclined with respect to an X-Z plane. The inclination direction of the reflecting surface 32 is the clockwise rotation direction with respect to an X-Z plane as viewed from the −X axis direction.

The reflecting surface 32 is inclined with respect to the traveling direction (+Z axis direction) of light in a direction such that an optical path in the light guide projection optical element 3 becomes wider. The reflecting surface 32 is inclined so that the optical path in the light guide projection optical element 3 becomes wider in the traveling direction (+Z axis direction) of light. Here, the traveling direction of light is the traveling direction of light in the light guide projection optical element 3. Thus, in the first embodiment, the traveling direction of light is a direction parallel to the optical axis $C_3$ of the light guide projection optical element 3. That is, in the first embodiment, the traveling direction of light is the +Z axis direction.

In the direction of the optical axis $C_3$ of the emitting surface 33, the reflecting surface 32 is inclined to face toward the emitting surface 33. "Face toward the emitting surface 33" indicates that the reflecting surface 32 can be seen from the emitting surface 33 side (+Z axis direction side).

Light entering through the incident surface 31 is reflected by the reflecting surface 32 and reaches the conjugate plane PC.

The incident angle of the light on the reflecting surface 32 is an incident angle $S_4$. The reflection angle of the light at the reflecting surface 32 is a reflection angle $S_5$. According to the law of reflection, the reflection angle $S_5$ is equal to the incident angle $S_4$. A perpendicular line $m_3$ to the reflecting surface 32 is indicated by a dot-and-dash line in FIG. 3B.

The light is incident on the conjugate plane PC at an incident angle $S_6$. The light is emitted from the conjugate plane PC at an emission angle $S_{out2}$. The emission angle $S_{out2}$ is equal to the incident angle $S_6$. A perpendicular line $m_4$ to the conjugate plane PC is indicated by a dot-and-dash line in FIG. 3B. The perpendicular line $m_4$ to the conjugate plane PC is parallel to the optical axis $C_3$.

The incident angle $S_4$ is greater than the incident angle $S_1$ because of the inclination of the reflecting surface 32. Further, the reflection angle $S_5$ is greater than the reflection angle $S_2$. Thus, the incident angle $S_6$ is less than the incident angle $S_3$. When the inclination angles of light emitted from the conjugate planes PC with respect to the optical axes $C_3$ are compared, the emission angle $S_{out2}$ is less than the emission angle $S_{out1}$.

The reflecting surface 32 is inclined so that the optical path in the light guide projection optical element 3 becomes wider in the traveling direction (+Z axis direction), which can reduce the aperture of the emitting surface 33.

The reflecting surface 32 is inclined to face toward the emitting surface 33 in the direction of the optical axis $C_3$ of the emitting surface 33, which can reduce the aperture of the emitting surface 33.

To make the emission angle $S_{out2}$ less than the emission angle $S_{out1}$, it is also possible to form the reflecting surface 32 into a curved surface shape. Specifically, the reflecting surface 32 is formed of a curved surface such that the optical path becomes wider in the traveling direction (+Z axis direction) of light.

In the direction of the optical axis $C_3$ of the emitting surface 33, the reflecting surface 32 is formed of a curved surface facing toward the emitting surface 33.

The inclination of the reflecting surface 32 functions to decrease the emission angle $S_{out}$ at which light reflected by the reflecting surface 32 is emitted from the conjugate plane PC. Thus, the inclination of the reflecting surface 32 can reduce the aperture of the emitting surface 33, downsizing the headlight module 100. In particular, it contributes to thinning the headlight module 100 in the height direction (Y axis direction).

Although the inclination of the reflecting surface 32 allows the headlight module 100 to be downsized as described above, the reflecting surface 32 need not necessarily be inclined. The reflecting surface 32 may be parallel to a Z-X plane.

<Light Distribution Pattern>

In the light distribution pattern of the low beam of the motorcycle headlight device, the cutoff line 91 has a horizontal linear shape. The cutoff line 91 has a linear shape extending in the left-right direction (X axis direction) of the vehicle.

Further, the light distribution pattern of the low beam of the motorcycle headlight device is brightest in a region on the lower side of the cutoff line 91. That is, a region on the lower side of the cutoff line 91 is a high illuminance region.

In the vertical direction (Y axis direction), the conjugate plane PC of the light guide projection optical element 3 and the irradiated surface 9 are in an optically conjugate relation with each other. The ridge line portion 321 is located at the lowermost end (−Y axis direction side) of the region in the conjugate plane PC through which light passes. Thus, the ridge line portion 321 corresponds to the cutoff line 91 of the irradiated surface 9. The cutoff line 91 is located at the uppermost end (+Y axis direction side) of the light distribution pattern on the irradiated surface 9.

In the vertical direction (Y axis direction), the headlight module 100 according to the first embodiment directly projects the light distribution pattern formed on the conjugate plane PC onto the irradiated surface 9. Thus, to achieve a light distribution pattern that is brightest in a region on the lower side of the cutoff line 91, a luminous intensity distribution in which the luminous intensity is highest in a region on the +Y axis direction side of the ridge line portion 321 is formed on the conjugate plane PC.

FIGS. 4 and 5 are diagrams illustrating, in contour display, illuminance distributions of the headlight module 100 according to the first embodiment. FIG. 4 is an illuminance distribution when the light guide projection optical element 3 illustrated in FIG. 2 is used. FIG. 5 is an illuminance distribution when a light guide projection optical element 30 illustrated in FIG. 6 is used.

Figure 6:
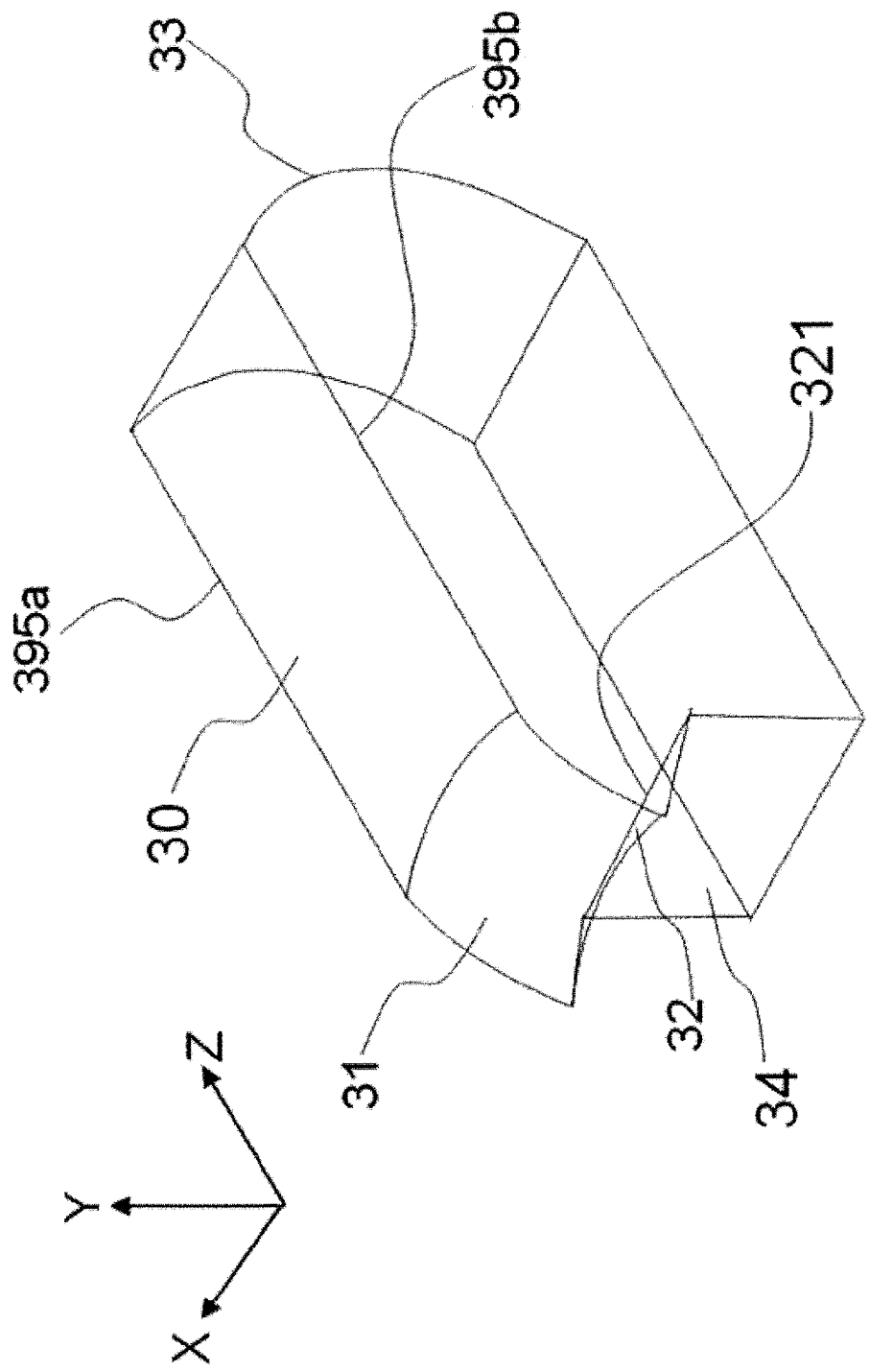
FIG. 6 is a perspective view of a light guide projection optical element 30 of the headlight module 100 according to the first embodiment.

FIG. 6 is a perspective view of the light guide projection optical element 30 of the headlight module 100 according to the first embodiment. The incident surface 31 of the light guide projection optical element 30 illustrated in FIG. 6 has negative power in the horizontal direction (X axis direction).

The incident surface 31 has a concave shape in the horizontal direction (X axis direction). Also, the incident surface 31 has positive power in the vertical direction (Y axis direction). The incident surface 31 has a convex shape in the vertical direction (Y axis direction).

Here, the horizontal direction of the incident surface 31 corresponds to the horizontal direction of the vehicle. The horizontal direction of the incident surface 31 corresponds to the horizontal direction of the light distribution pattern projected from the vehicle. The vertical direction of the incident surface 31 corresponds to the vertical direction of the vehicle. The vertical direction of the incident surface 31 corresponds to the vertical direction of the light distribution pattern projected from the vehicle.

The illuminance distributions illustrated in FIGS. 4 and 5 are illuminance distributions projected on the irradiated surface 9 located 25 m ahead (+Z axis direction). Further, these illuminance distributions are obtained by simulation.

"Contour display" refers to displaying by means of a contour plot. "Contour plot" refers to a diagram depicting a line joining points of equal value.

As can be seen from FIGS. 4 and 5, the cutoff line 91 of the light distribution pattern is a sharp straight line. Intervals between contour lines are small on the lower side of the cutoff line 91. The light distribution has a region having the highest illuminance (high illuminance region) 93 near the cutoff line 91. Further, it can be seen that the length of the light distribution pattern in the width direction is greater than the length of the light distribution pattern in the height direction.

In FIGS. 4 and 5, a center of the high illuminance region 93 is located on the +Y axis direction side of a center of the light distribution pattern. In FIGS. 4 and 5, the entire high illuminance region 93 is on the +Y axis direction side of the center of the light distribution pattern. The center of the light distribution pattern is a center of the light distribution pattern in its width direction and is a center of the light distribution pattern in its height direction. In FIGS. 4 and 5, the region 92 on the lower side of the cutoff line 91 is located between the center of the light distribution pattern and the cutoff line 91.

From FIGS. 4 and 5, it can be seen that the region 92 on the lower side (−Y axis direction side) of the cutoff line 91 in the light distribution pattern is brightest. The region 92 on the lower side (−Y axis direction side) of the cutoff line 91 in the light distribution pattern is illuminated most brightly. The region 92 on the lower side of the cutoff line 91 in the light distribution pattern includes the brightest region 93 in the light distribution pattern.

The incident surface 31 of the light guide projection optical element 30 illustrated in FIG. 6 has negative power in the horizontal direction. Thus, the width (in the X axis direction) of the highest illuminance region (high illuminance region) 93 in the light distribution pattern illustrated in FIG. 5 is wider than that in the light distribution pattern illustrated in FIG. 4.

As such, by changing the curved surface shape of the incident surface 31 of the light guide projection optical element 3, it is possible to easily form many types of light distribution patterns. In particular, it is possible to make a region on the lower side of the cutoff line 91 brightest while keeping the cutoff line 91 sharp.

As described above, to form the cutoff line 91, the headlight module 100 need not use a light blocking plate, which causes reduction in the light use efficiency, as in the conventional headlight device. Further, to provide the high illuminance region in the light distribution pattern, the headlight module 100 needs no complicated optical system. Thus, the headlight module 100 can provide a small and simple headlight device having improved light use efficiency.

Comparative Example

A comparative example for verifying advantages of the headlight module 100 according to the first embodiment will be described below.

In this comparative example, a focal position of an emitting surface 330 of a light guide projection optical element 300 is on a conjugate plane PC. The emitting surface 330 is a spherical surface having a convex shape. A focal point of the emitting surface 330 in the X axis direction and a focal point of the emitting surface 330 in the Y axis direction are both located on the conjugate plane PC. Light reflected by a reflecting surface 32 reaches the emitting surface 330 without being reflected by a side surface of the light guide projection optical element 300.

Figure 7:
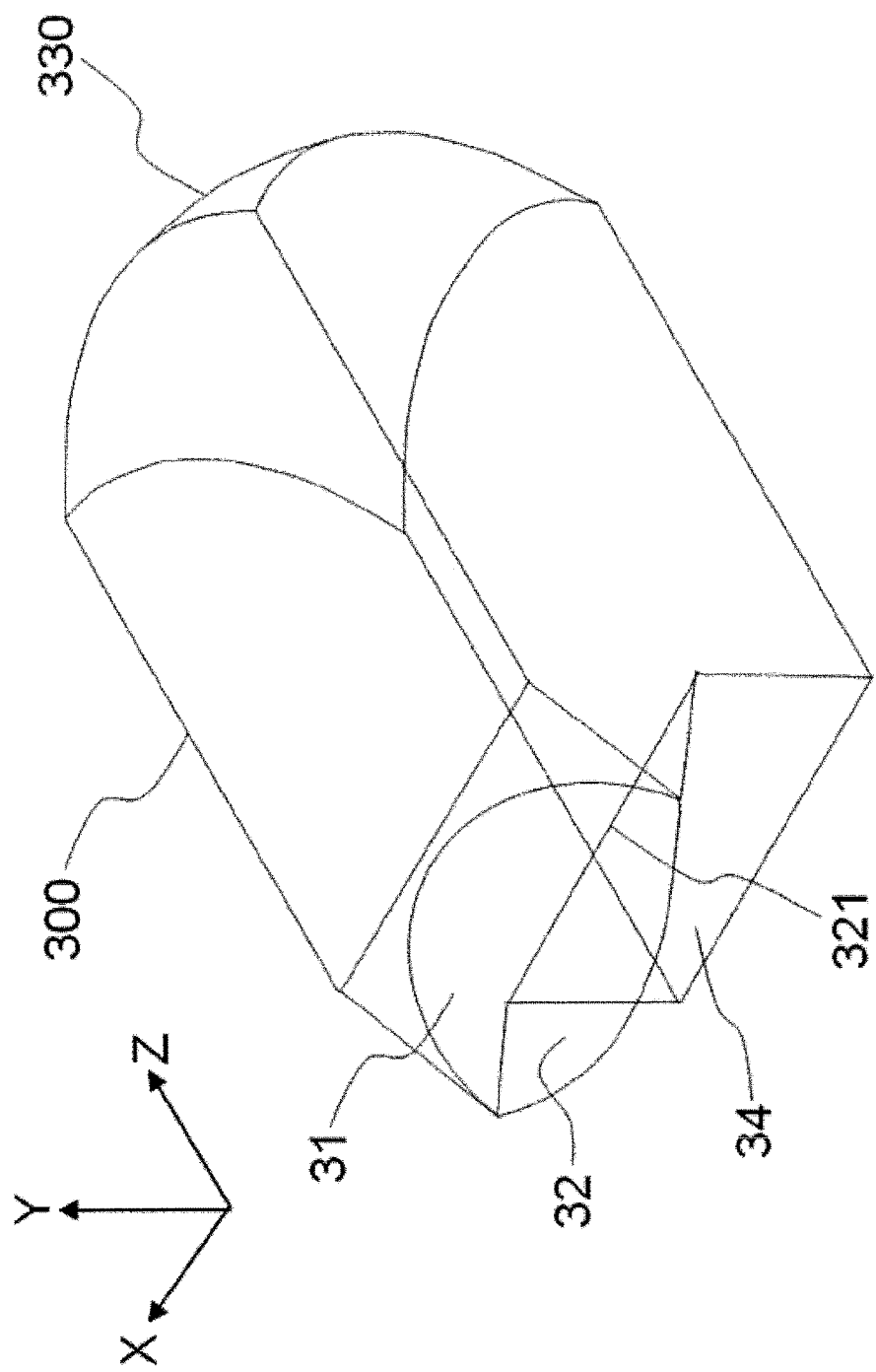
FIG. 7 is a perspective view of a light guide projection optical element 300 of a modification example according to the first embodiment.

FIG. 7 is a perspective view of the light guide projection optical element 300 of the comparative example.

As described above, the emitting surface 33 of the light guide projection optical element 3 is a cylindrical surface having a convex shape having positive power only in the Y axis direction. A focal position of the emitting surface 33 in the Y axis direction coincides with the position of the ridge line portion 321 in the Z axis direction. Here, "focal position in the Y axis direction" refers to the position of a focal point of light rays shown on a Y-Z plane in the direction of the optical axis $C_3$.

For example, in FIG. 2, the focal position of the emitting surface 33 in the Y axis direction is located at an intersection between the ridge line portion 321 and the optical axis $C_3$. Only in the Y axis direction, the light distribution pattern formed on the conjugate plane PC is imaged on the irradiated surface 9.

On the other hand, in the X axis direction, the emitting surface 33 of the light guide projection optical element 3 has no power. Thus, the light distribution pattern formed on the conjugate plane PC is not imaged on the irradiated surface 9. Thus, the spread of the light, distribution in the X axis direction is controlled by the condensing optical element 2 or the incident surface 31 of the light guide projection lens 3.

Figure 8:
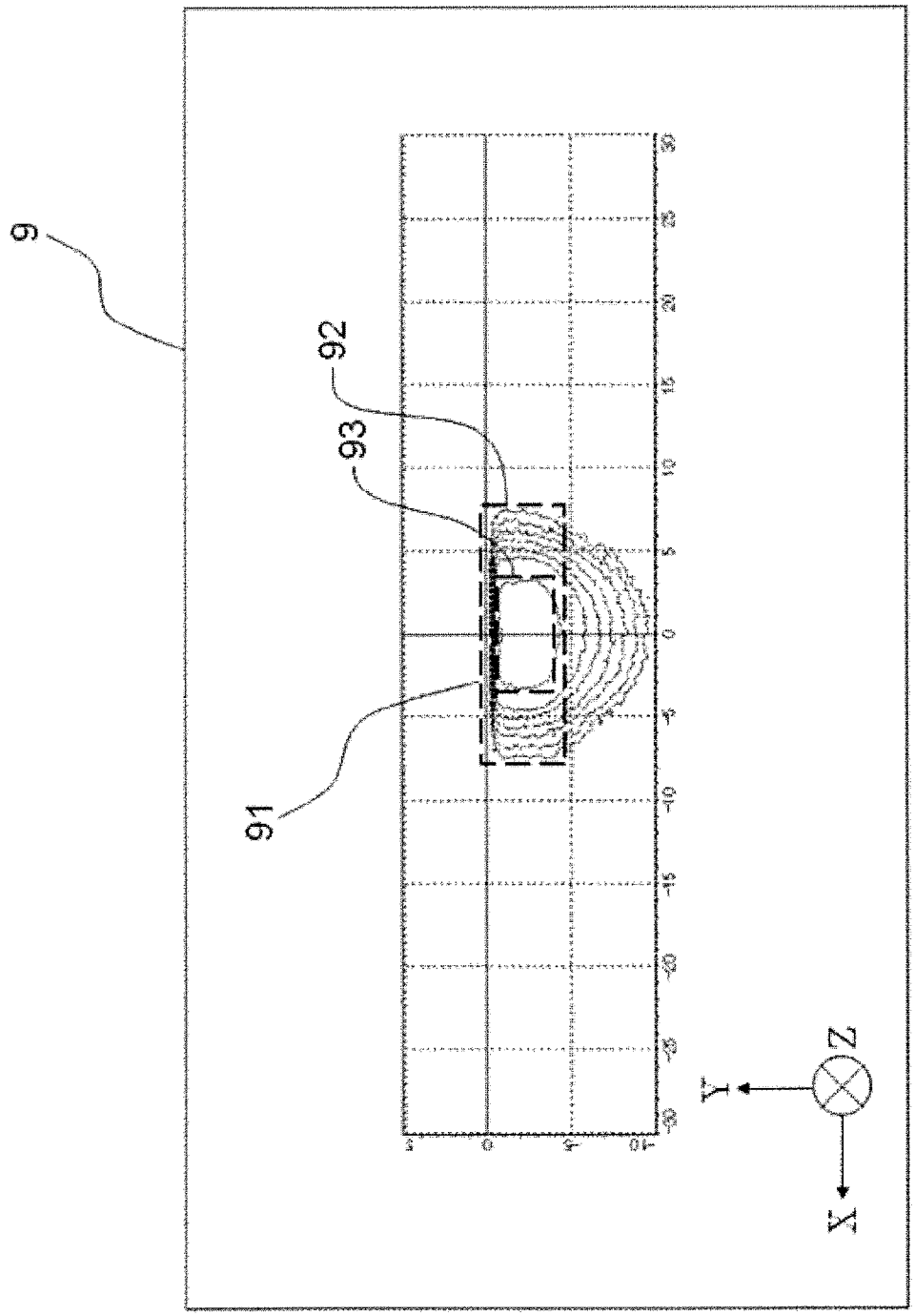
FIG. 8 is a diagram illustrating, in contour display, an illuminance distribution when the light guide projection optical element 300 of the modification example according to the first embodiment is used.

FIG. 8 is a diagram illustrating, in contour display, an illuminance distribution on the irradiated surface 9 when the light guide projection optical element 300 of the comparative example is used.

In FIG. 8, the width (X axis direction) of the light distribution pattern is very narrow as compared to FIGS. 4 and 5.

This is because, since a focal position of the emitting surface 330 in the X axis direction is also located on the conjugate plane PC, the emitting surface 330 images the light distribution pattern formed on the conjugate plane PC on the irradiated surface 9. This is also because, since the light reflected by the reflecting surface 32 reaches the emitting surface 330 without being reflected by the side surface of the light guide projection optical element 300, the emitting surface 330 images the light distribution pattern formed on the conjugate plane PC on the irradiated surface 9.

For the light guide projection optical element 300 to form a light distribution pattern like the light distribution patterns illustrated in FIGS. 4 and 5, it is necessary to form an image of a wide light distribution pattern on the conjugate plane PC of the light guide projection optical element 300. To achieve a wide light distribution as in FIGS. 4 and 5 with the emitting surface 330 of the comparative example illustrated in FIG. 7, it is necessary to form a wide light distribution on the conjugate plane PC.

For this purpose, it is necessary to widen the light guide projection optical element 300 in the X axis direction. It is necessary to increase the dimension of the light guide projection optical element 300 in the width direction (X axis direction). Thus, the light guide projection optical element 300 increases in size.

When the emitting surface 330 is a spherical lens with its focal position on the conjugate plane PC as in the comparative example of FIG. 7, it is difficult to provide a wide light distribution as in FIGS. 4 and 5.

The light guide projection optical element 3 illustrated in FIG. 2 and the light guide projection optical element 300 illustrated in FIG. 7 will be compared using specific numerical values.

To achieve the light distribution pattern of FIG. 4, the width of the light guide projection optical element 3 illustrated in FIG. 2 in the X axis direction is, for example, 17 mm. On the other hand, the width of the light guide projection optical element 300 illustrated in FIG. 7 in the X axis direction is 30 mm.

Thus, by employing the emitting surface 33 illustrated in FIG. 2, it is possible to reduce the width of the light guide projection optical element in the X axis direction by an amount greater than 30%. Each of the emitting surfaces 33 and 330 of the light guide projection optical elements 3 and 300 is designed to have a focal length of 30 mm.

While the above is an example, it can be seen that, when the emitting surface 330 as illustrated in FIG. 7 is formed into a spherical lens shape and its focal position is located on the conjugate plane PC, it is necessary to enlarge the light guide projection optical element to form a light distribution wide in the X axis direction as illustrated in FIGS. 4 and 5.

By forming the emitting surface 33 into a cylindrical shape having no power in the X axis direction, it is possible to downsize the light guide projection optical element 3. It is also possible to easily achieve a wide light distribution pattern.

Further, the light reflected by the reflecting surface 32 is reflected by the side surfaces 395a and 395b of the light guide projection optical element 3. This makes it possible to downsize the light guide projection optical element 3. It is also possible to easily achieve a wide light distribution pattern.

As above, the headlight module 100 described in the first embodiment can easily provide a wide light distribution pattern.

This is achieved by a method in which, in the vertical direction (Y axis direction), an image of the light distribution pattern formed on the conjugate plane PC in the light guide projection optical element 3 is projected by the emitting surface 33 onto the irradiated surface 9, but in the horizontal direction (X axis direction), no image of the light distribution pattern on the conjugate plane PC formed in the light guide projection optical element 3 is projected by the emitting surface 33 onto the irradiated surface 9.

In the vertical direction (Y axis direction), the headlight module 100 forms an image of a light distribution pattern on the conjugate plane PC in the light guide projection optical element 3 and projects it onto the irradiated surface 9, but in the horizontal direction (X axis direction), the headlight module 100 forms no image of a light distribution pattern in the light guide projection optical element 3. "Forms no image of a light distribution pattern in the light guide projection optical element 3" indicates that it is equivalent to forming an image of a light distribution pattern not only in the light guide projection optical element 3 but also outside the light guide projection optical element 3, on the conjugate plane PC.

As a light distribution pattern, for example, as described above, when an intermediate image of the light emitting surface 11 is formed, an "image of a light distribution pattern" is projected onto the irradiated surface 9. However, when no intermediate image is formed, a "light distribution pattern" is projected onto the irradiated surface 9. Thus, "image of a light distribution pattern" can be rephrased as "light distribution pattern."

For the purpose, the following two methods can be conceived.

As the first method, a focal position of the emitting surface 33 in the horizontal direction (X axis direction) can be set on the reflecting surface 32 side of a position (an emitting surface of a light guide element) where the repetitive reflection of light by the side surfaces 395a and 395b ends. In the horizontal direction (X axis direction), light rays are reflected after passing through the focal position of the emitting surface 33, and thus no image of a light distribution pattern is formed in the light guide projection optical element 3.

As the second method, a focal position of the emitting surface 33 in the horizontal direction (X axis direction) can be set on the light source 1 side of the incident surface 31 of the light guide projection optical element 3. In the horizontal direction (X axis direction), no image is formed by light rays at the focal position of the emitting surface 33. No image of a light distribution pattern projected by the emitting surface 33 onto the irradiated surface 9 is formed in the light guide projection optical element 3. In the most typical example, the emitting surface 33 is a cylindrical surface as described above. Also, the emitting surface 33 may have a concave shape.

To increase the width (X axis direction) of the light distribution, it is desirable to reduce the power of the emitting surface 33 in the X axis direction. This is to increase the focal length of the emitting surface 33 to prevent an image of a light distribution pattern projected by the emitting surface 33 onto the irradiated surface 9 from being formed in the light guide projection optical element 3. To adjust the width of the light distribution, the shape of the emitting surface 33 in the X axis direction may be a convex shape or a concave shape. However, to increase the width of the light distribution, the power in the X axis direction is desirably less than the power in the Y axis direction.

To prevent an image of a light distribution pattern from being formed in the light guide projection optical element 3, it is also effective to cause light rays to be reflected by the side surfaces 395a and 395b after passing through the focal position of the emitting surface 33 as illustrated in FIG. 1B.

However, in the case of the second method, it is difficult to form a light distribution having improved uniformity in the horizontal direction. On the other hand, in the case of the first method, for example, repetitive reflection of light by the side surfaces 395a and 395b can improve the uniformity of the light distribution in the horizontal direction (X axis direction). This makes it possible to form a wide bright region in the region 92 on the lower side of the cutoff line as illustrated in FIGS. 4 and 5.

In the vertical direction, the light guide projection optical element 3 of the first embodiment can control the light distribution by the superposition of light to form the high illuminance region 93. On the other hand, in the horizontal direction, the light guide projection optical element 3 can form a light distribution having improved uniformity by the repetitive reflection of light.

In the vertical direction, to control the light distribution by the superposition of light, it is necessary that light rays entering the light guide projection optical element 3 be reflected by the reflecting surface 32. Thus, it is necessary that, in the direction of the optical axis $C_3$, a focal position of the emitting surface 33 in the Y axis direction be located on the emitting surface 33 side of a position where the light rays entering the light guide projection optical element 3 are reflected by the reflecting surface 32. The light entering the light guide projection optical element 3 is a light beam. Thus, the "position where the light rays are reflected by the reflecting surface 32" is a position where the reflection of the light rays is started on the reflecting surface 32. The "position where the light rays are reflected by the reflecting surface 32" is a position where the light rays start to be reflected on the reflecting surface 32.

Thus, in the first embodiment, the focal position of the emitting surface 33 in the Y axis direction coincides with an end portion (the ridge line portion 321) on the emitting surface 33 side of the reflecting surface 32. The focal position of the emitting surface 33 in the Y axis direction coincides with an end portion on the emitting surface 33 side of the reflection portion 3a.

In the headlight module 100 of the first embodiment, the manufacturability is improved by integration of components. The emitting surface 33 of the light guide projection optical element 3 is provided with a projecting function. The emitting surface 33 is provided with power. However, it is possible to employ a projection optical element, such as a projection lens, without providing the emitting surface 33 with power.

Figure 15A:
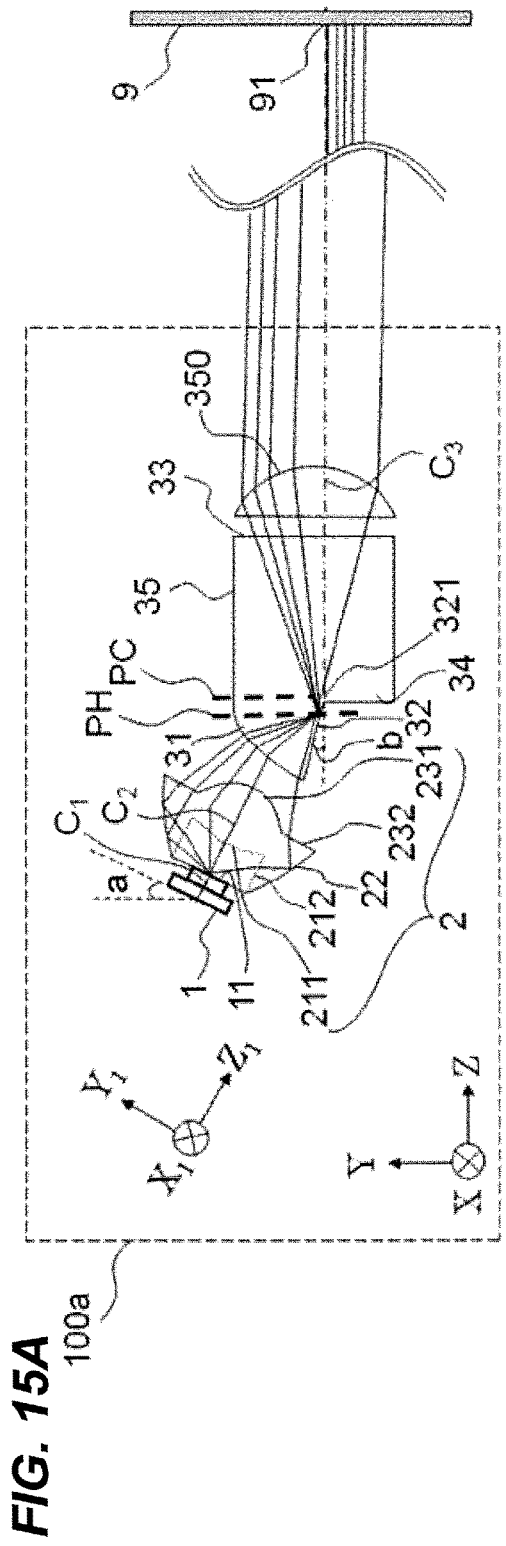
FIGS. 15A and 15B are configuration diagrams illustrating a configuration of a headlight module 100a according to the first embodiment.
Figure 15B:
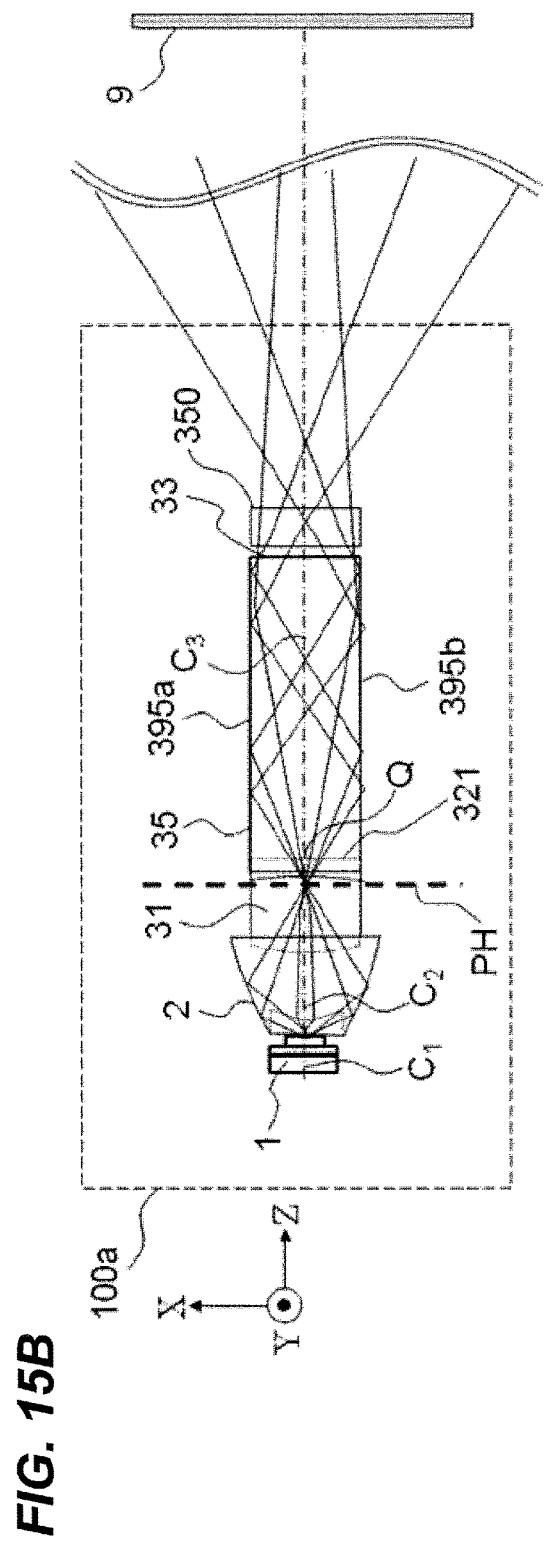

FIGS. 15A and 15B are configuration diagrams illustrating a configuration of a headlight module 100a in which the emitting surface 33 is formed into a flat surface and a projection optical element 350, such as a projection lens, is additionally provided, for example.

A light guide projection optical element 35 of the headlight module 100a is obtained by forming the emitting surface 33 of the light guide projection optical element 3 illustrated in FIGS. 1A and 1B into, for example, a flat surface. The projection optical element 350 is provided with the projecting function of the emitting surface 33 of the light guide projection optical element 3.

The projection optical element 350 is located, for example, on the +Z axis side of the emitting surface 33. Light emitted from the emitting surface 33 is incident on the projection optical element 350.

The projection optical element 350 is provided with all or part of the projecting function of the emitting surface 33 of the light guide projection optical element 3. The headlight module 100a illustrated in FIGS. 15A and 15B implements the function of the emitting surface 33 of the light guide projection optical element 3 illustrated in FIG. 1 FIGS. 1A and 1B by means of the projection optical element 350 and the emitting surface 33. Thus, as the description of the function or the like thereof, the description of the emitting surface 33 of the first embodiment is used.

In the headlight module 100a illustrated in FIGS. 15A and 15B, it is possible to provide the emitting surface 33 with refractive power and implement the function of the emitting surface 33 of the light guide projection optical element 3 illustrated in FIGS. 1A and 1B by means of the combination of the emitting surface 33 and projection optical element 350.

The optical axis $C_3$ is an optical axis of a portion having the projecting function. Thus, when the emitting surface 33 is a flat surface, the optical axis $C_3$ is an optical axis of the projection optical element 350. When the emitting surface 33 and projection optical element 350 have the projecting function, the optical axis $C_3$ is an optical axis of a combined lens obtained by combining the emitting surface 33 and projection optical element 350. The portion having the projecting function is referred to as a projection optical portion.

"Combined lens" refers to a single lens exhibiting the property of the combination of multiple lenses.

Modification Examples

The side surfaces 395a and 395b may be used for control of a width of a light distribution. It is possible to change the divergence angle of light emitted from the headlight module 100 by means of the side surfaces 395a and 395b. The side surfaces 395a and 395b of the light guide projection optical element 3 illustrated in FIG. 2 are parallel to each other. However, this is not mandatory.

Figure 9:
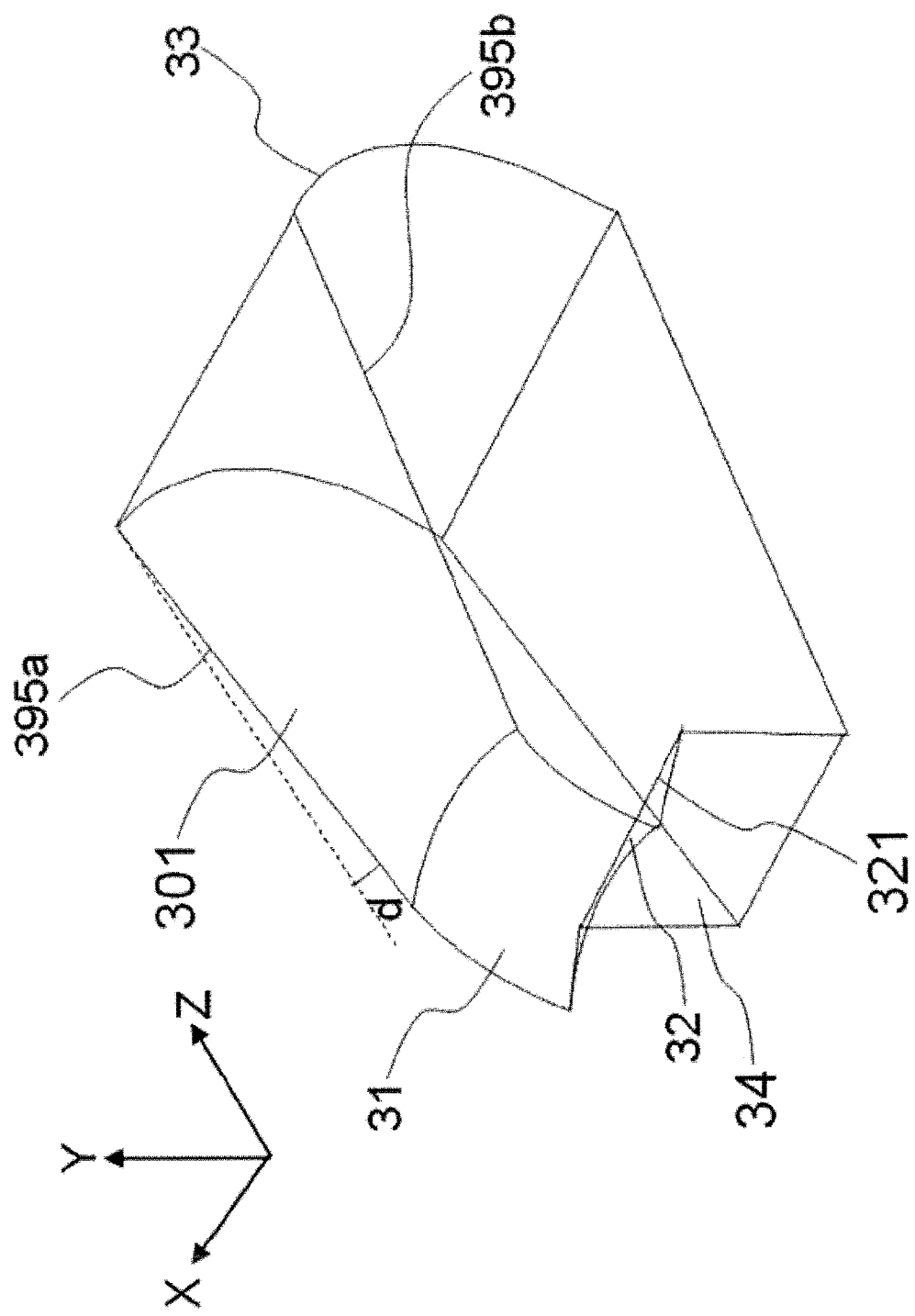
FIG. 9 is a perspective view of a light guide projection optical element 301 of another modification example according to the first embodiment.
Figure 10:
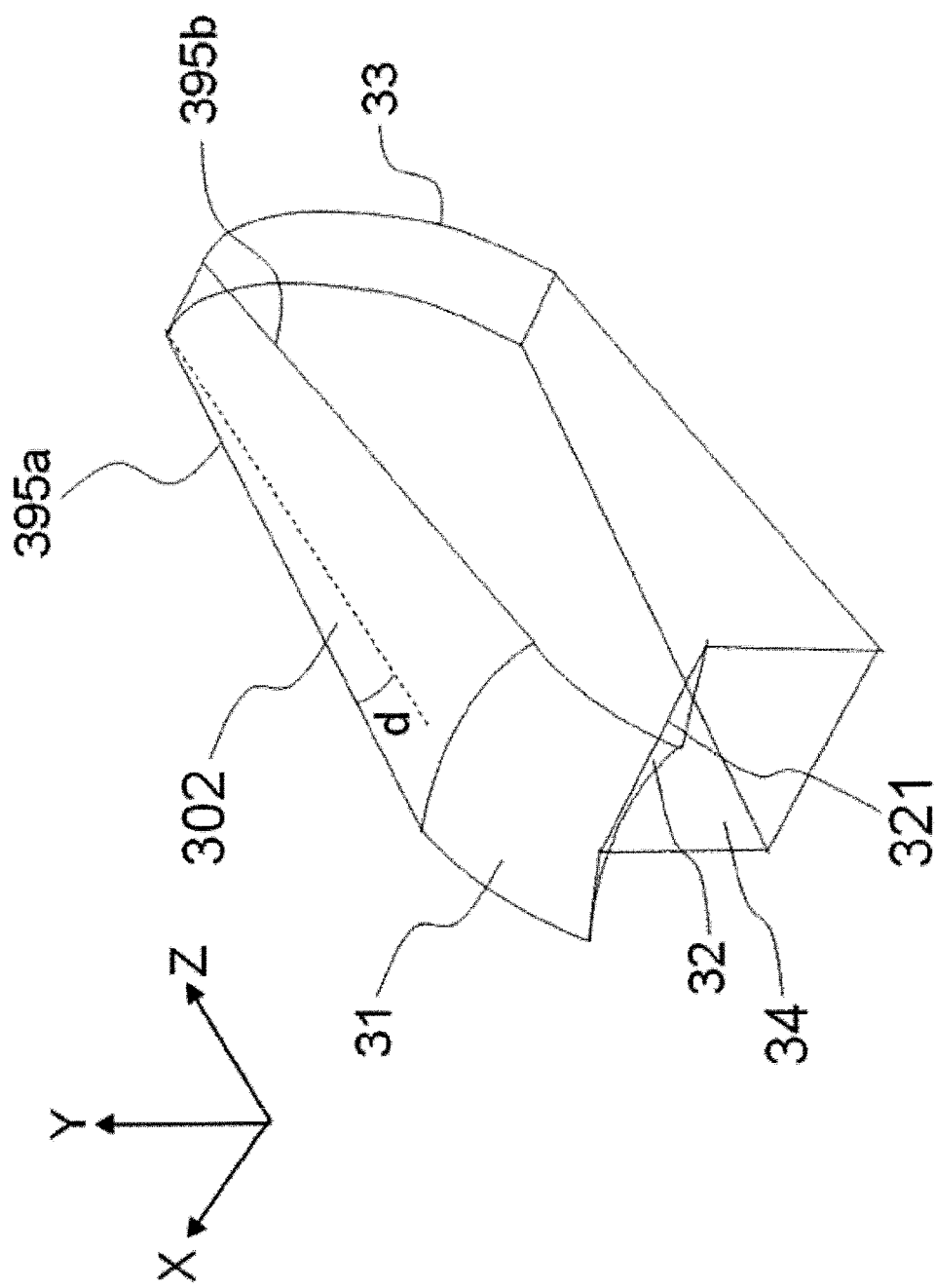
FIG. 10 is a perspective view of a light guide projection optical element 302 of another modification example according to the first embodiment.

FIG. 9 is a perspective view of a light guide projection optical element 301 of a modification example. FIG. 10 is a perspective view of a light guide projection optical element 302 of another modification example.

For example, as illustrated in FIG. 9, the side surfaces 395a and 395b may be inclined so that the width of the emitting surface 33 in the X axis direction is greater than the width of the ridge line 321. The side surfaces 395a and 395b are inclined so that an optical path becomes wider in the traveling direction of light. In FIG. 9, inclination angles of the side surfaces 395a and 395b with respect to the optical axis $C_3$ are each an angle d.

In the case of FIG. 9, the divergence angle in the X axis direction of light that has entered the light guide projection optical element 301 decreases. Thus, the width (the X axis direction) of the light distribution pattern on the irradiated surface 9 decreases.

For example, as illustrated in FIG. 10, the side surfaces 395a and 395b may be inclined so that the width of the emitting surface 33 in the X axis direction is less than the width of the ridge line 321. The side surfaces 395a and 395b are inclined so that an optical path becomes narrower in the traveling direction of light. In FIG. 10, inclination angles of the side surfaces 395a and 395b with respect to the optical axis $C_3$ are each an angle d.

In the case of FIG. 10, the divergence angle in the X axis direction of light that has entered the light guide projection optical element 302 increases. Thus, the width (the X axis direction) of the light distribution pattern on the irradiated surface 9 increases.

As described later, in some vehicles, multiple headlight modules are arranged, and the light distribution patterns of the respective modules are combined to form a light distribution pattern. A light distribution pattern may be formed by arranging multiple headlight modules and combining the light distribution patterns of the respective modules. Even in such a case, the headlight module 100 according to the first embodiment can be easily applied.

In the headlight module 100, by adjusting the curved surface shape of the incident surface 31 of the light guide projection optical element 3, it is possible to change the width and height of the light distribution pattern. It is also possible to change the light distribution.

Further, in the headlight module 100, by adjusting the optical positional relationship between the condensing optical element 2 and the light guide projection optical element 3 or the shape of the incident surface 31 of the light guide projection optical element 3, it is possible to change the width and height of the light distribution pattern. It is also possible to change the light distribution.

Further, by using the reflecting surface 32, it is possible to easily change the light distribution. For example, by changing the inclination angle b of the reflecting surface 32, it is possible to change the position of the high illuminance region.

Further, by using the side surfaces 395a and 395b as reflecting surfaces, it is possible to change the width of the light distribution pattern. It is also possible to change the light distribution. By changing the inclination angle d of the side surfaces 395a and 395b, it is possible to change the width of the light distribution pattern.

Further, by using the side surfaces 395a and 395b as reflecting surfaces, it is possible to easily adjust the light distribution. For example, by changing the inclination angle d of the side surfaces 395a and 395b, it is possible to change the position of the high illuminance region.

Further, by adjusting the power of the emitting surface 33 in the horizontal direction (X axis direction), it is possible to easily adjust the light distribution. For example, by setting the shape of the emitting surface 33 in the X axis direction to a concave shape or a convex shape, it is possible to change the width of the light distribution pattern. However, the power of the emitting surface 33 in the X axis direction is desirably less than the power in the Y axis direction. In such a way, it is possible to obtain a wide light distribution pattern while decreasing the width of the light guide projection optical element.

Further, in the headlight module 100, the shape of the cutoff line 91 can be set to a horizontal shape by the shape of the ridge line portion 321 of the light guide projection optical element 3. The light distribution pattern can be formed depending on the shape of the light guide projection optical element 3. "Horizontal shape" refers to the shape of a straight line extending in the horizontal direction (X axis direction).

Thus, in particular, it is not necessary that the shapes or the like of the condensing optical elements 2 vary between multiple headlight modules. The condensing optical elements 2 can be common parts. This can reduce the number of types of parts, improving ease of assembly, and reducing manufacturing cost.

Further, the function of arbitrarily adjusting the width and height of the light distribution pattern and the function of arbitrarily adjusting the light distribution may be provided by the headlight module 100 as a whole. The optical components of the headlight module 100 include the condensing optical element 2 and light guide projection optical element 3. The functions can be shared by optical surfaces of the condensing optical element 2 and light guide projection optical element 3 constituting the headlight module 100.

For example, the reflecting surface 32 of the light guide projection optical element 3 may be formed into a curved surface shape to have power and form a light distribution.

However, regarding the reflecting surface 32, it is not necessarily required that all the light reaches the reflecting surface 32. Thus, when the reflecting surface 32 is shaped, a limited amount of light contributes to the formation of the light distribution pattern. That is, a limited amount of light is reflected by the reflecting surface 32 and gives the effect due to the shape of the reflecting surface 32 to the light distribution pattern. To optically affecting all the light and easily change the light distribution pattern, it is preferable to provide the incident surface 31 with power to form the light distribution.

From the above, the headlight modules 100 and 100a described in the first embodiment can be described as follows.

The headlight modules 100 and 100a each include the light source 1 that emits light, the reflecting surface 32 that reflects the light emitted by the light source 1, the pair of surfaces 395a and 395b that guide the light reflected by the reflecting surface 32, and the projection portion 33 or 350 that projects the reflected light guided by the pair of surfaces 395a and 395b.

A plane including the optical axis $C_3$ of the projection portion 33 or 350 and being perpendicular to the reflecting surface 32 is a first plane (Y-Z plane), and a plane parallel to the optical axis $C_3$ and perpendicular to the first plane is a second plane (Z-X plane).

The pair of surfaces 395a and 395b is disposed so that the first plane (Y-Z plane) is sandwiched between the pair of surfaces 395a and 395b, between the reflecting surface 32 and the projection portion 33 or 350.

When the reflected light is projected onto the first plane (Y-Z plane), the reflected light reaches the projection portion (33 or 350) without undergoing further reflection after being reflected by the reflecting surface 32; when the reflected light is projected onto the second plane (Z-X plane), the reflected light reaches the projection portion 33 or 350 while being reflected by the surfaces 395a and 395b.

The surfaces 395a and 395b are reflecting surfaces that reflect the reflected light. The surfaces 395a and 395b also guide the reflected light.

Further, in the direction of the optical axis $C_3$, a first focal point of the projection portion 33 or 350 projected onto the first plane (Y-Z plane) is located on the projection portion 33 or 350 side of the position where the light emitted by the light source 1 is reflected by the reflection portion 3a (reflecting surface 32).

Further, in the direction of the optical axis $C_3$, a second focal point of the projection portion 33 or 350 projected onto the second plane (Z-X plane) is located on the reflecting surface 32 side of the position where the reflection of the reflected light by the surfaces 395a and 395b ends.

Alternatively, in the second plane (Z-X plane), the projection portion 33 or 350 has negative refractive power.

In FIGS. 1A and 1B, the light guide projection optical element 3 includes the reflecting surface 32, surfaces 395a and 395b, and projection portion 33 (projection optical portion). In FIGS. 15A and 15B, the light guide projection optical element 35 includes the reflecting surface 32 and surfaces 395a and 395b. In FIGS. 15A and 15B, the projection portion (projection optical portion) includes the projection optical element 350.

Second Embodiment

Figure 11:
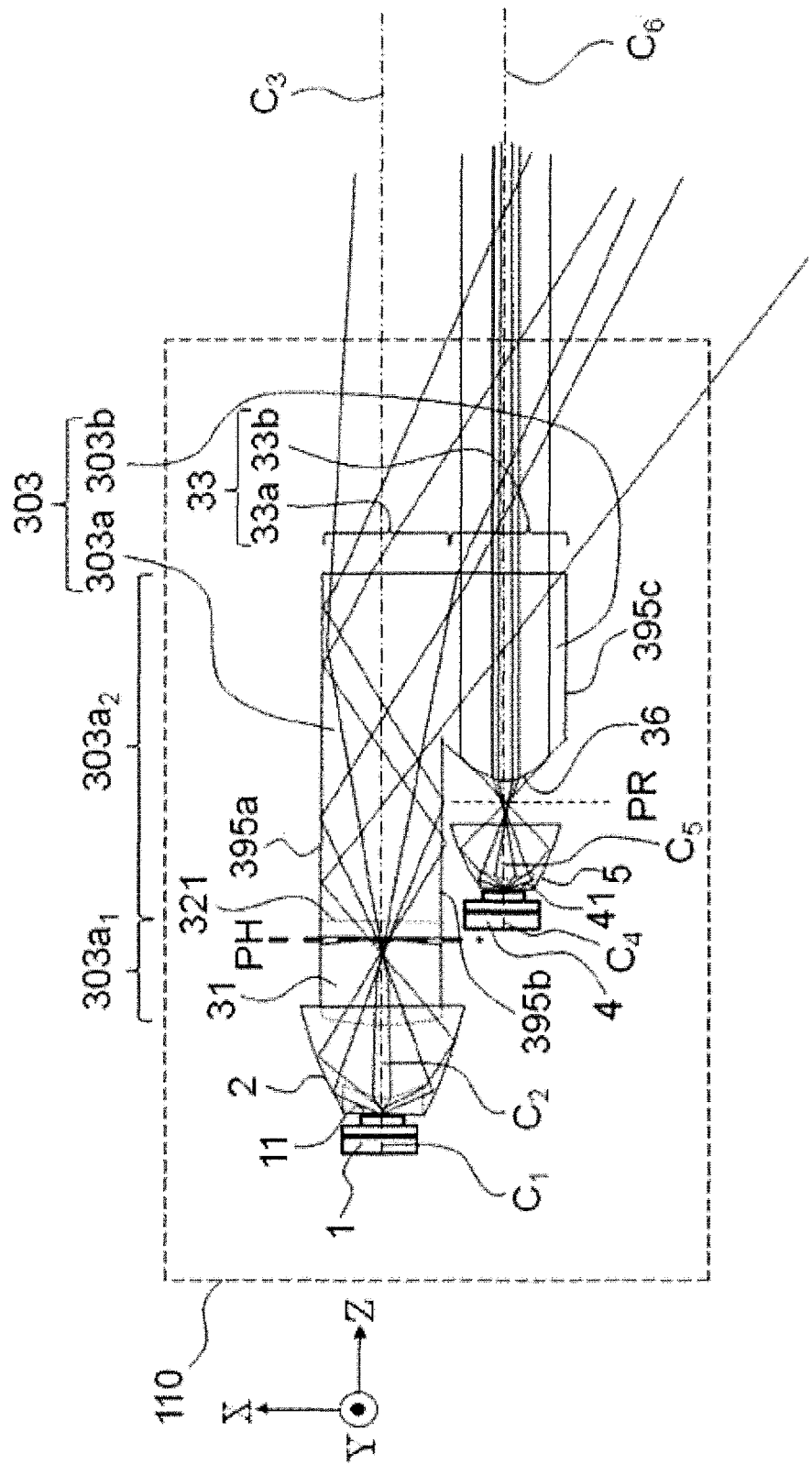
FIG. 11 is a configuration diagram illustrating a configuration of a headlight module 110 according to a second embodiment.
Figure 12:
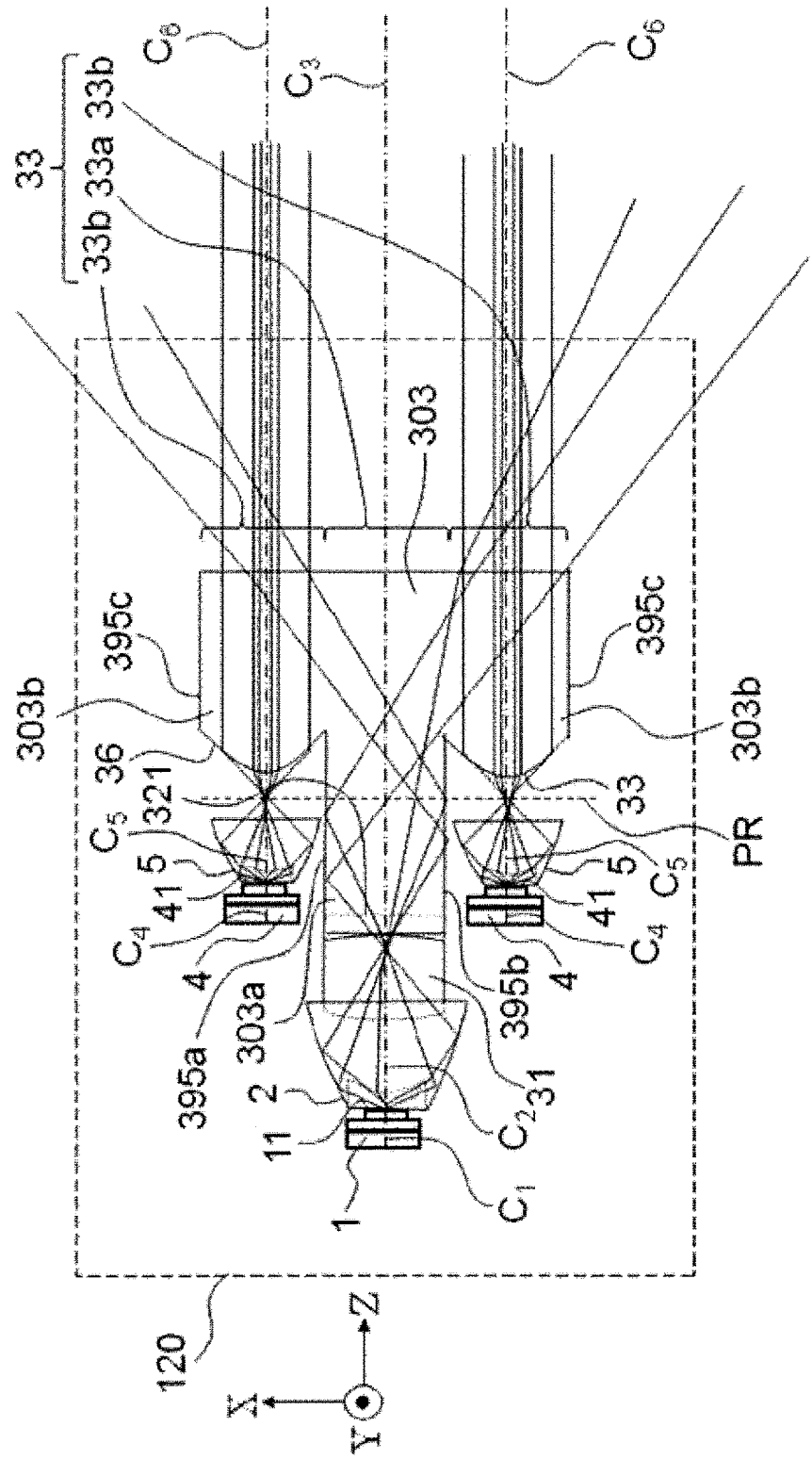
FIG. 12 is a configuration diagram illustrating a configuration of a headlight module 120 according to the second embodiment.

FIG. 11 is a configuration diagram illustrating a configuration of the headlight module 110 according to a second embodiment of the present invention. FIG. 12 is a configuration diagram illustrating a configuration of the headlight module 120 according to the second embodiment of the present invention. Elements that are the same as in FIGS. 1A and 1B will be given the same reference characters, and descriptions thereof will be omitted. The elements that are the same as in FIGS. 1A and 1B are the light source 1 and condensing optical element 2.

As illustrated in FIGS. 11 and 12, the headlight modules 110 and 120 according to the second embodiment each include the light source 1, a light source or sources 4, and a light guide projection optical element 303. The headlight modules 110 and 120 each may include the condensing optical element 2 or a condensing optical element or elements 5.

The headlight modules 110 and 120 according to the second embodiment differ from the headlight module 100 according to the first embodiment in having the light guide projection optical element 303 and light source or sources 4. Also, the headlight modules 110 and 120 according to the second embodiment differ from the headlight module 100 according to the first embodiment in having the condensing optical element or elements 5.

In the headlight modules 110 and 120, the condensing optical element 2 may be mounted to the light source 1 to form a unit. Further, in the headlight modules 110 and 120, the condensing optical element or elements 5 may be mounted to and integrated with the light source or sources 4.

Further, the headlight modules 110 and 120 according to the second embodiment differ from the headlight module 100 according to the first embodiment in having a high beam function and a low beam function.

As described in the first embodiment, for example, by providing another light source different from the light source 1 and causing light to enter through the incident surface 34, it is possible to provide the headlight module 100 with a high beam function.

The headlight modules 110 and 120 each emit a high beam from a low beam emitting region on an emitting surface 33. Thus, in the headlight modules 110 and 120, the light emitting region during driving is the same as the light emitting region during passing. This makes it possible to improve design when a headlight device 10 is lighted.

A headlight device is typically provided with a low beam and a high beam. Thus, it is provided with two types of headlight modules. In the Road Transport Vehicle Act or the like, the formal name of the low beam is "passing headlight" and the formal name of the high beam is "driving headlight." For example, for their irradiation distances, the low beam provides illumination 40 m ahead; the high beam provides illumination 100 m ahead.

As one of the road traffic rules, a light distribution pattern of a high beam for a vehicle has a horizontally long shape narrow in an up-down direction. To improve visibility for a driver, the high beam for a vehicle illuminates a road surface in front of the vehicle farther than a passing headlight.

Thus, the high beam for a vehicle needs to also illuminate an area on the upper side (+Y axis direction side) of the cutoff line 91 of the light distribution pattern of the passing headlight (low beam). The passing headlight (low beam) and driving headlight (high beam) illuminate different areas on the irradiated surface 9. Thus, the two types of headlights have different light distribution patterns.

As described above, the low beam and high beam have different light distribution patterns. Thus, the high beam requires an optical system different from that of the low beam. Thus, the low beam and high beam require different headlight modules. This enlarges a headlight device.

Further, when different headlight modules are used for the low beam and high beam, the light emitting region of the headlight device varies depending on the lighting state of each of the headlight modules. Specifically, when only the low beam is lighted, one of the headlight modules is lighted; when the high beam is also lighted, both of the headlight modules are lighted. Thus, when only the low beam is lighted, the number of light emitting regions is one; when the high beam is also lighted, the number of light emitting regions is two.

This means that the design of the vehicle varies depending on the lighting state of the headlight device. To improve the design of the vehicle with its headlight device lighted, it is preferable that the light emitting region be the same between when only the low beam is lighted and when both of the low beam and high beam are simultaneously lighted.

The headlight modules 110 and 120 according to the second embodiment solve such problems.

Even when a single light distribution pattern is formed by using multiple headlight modules, the headlight modules 110 and 120 according to the second embodiment solve such problems. For example, when the entire light distribution pattern is formed by the light source 1 and the high illuminance region is formed by the light source or sources 4, it is possible to turn on or off the high illuminance region without changing the design of the vehicle. It is also possible to provide an ADB function as described later.

The headlight modules 110 and 120 each provide a small and simple headlight module having a low beam function and a high beam function. Also, it is possible to change the light distribution pattern without changing the design in a state where the headlight device is lighted.

Headlight modules 110*a* and 120*a*, to be described later as modification examples, can also provide the same advantages.

In FIG. 11, the light source 4 and condensing optical element 5 are disposed on the side surface 395*b* side. However, the light source 4 and condensing optical element 5 may be disposed on the side surface 395*a* side. In FIG. 12, the light sources 4 and condensing optical elements 5 are disposed on the side surface 395*a* side and side surface 395*b* side.

<Light Source 4>

Each light source 4 includes a light emitting surface 41. Each light source 4 emits light for providing illumination ahead of the vehicle from the light emitting surface 41. Each light source 4 emits light from the light emitting surface 41.

Each light source 4 is located on the −Z axis side of the condensing optical element 5. In FIG. 11, the light source 4 is located on the −X axis side of the side surface 395*b* of the light guide projection optical element 303. In FIG. 12, one of the light sources 4 is located on the +X axis side of the side surface 395*a* of the light guide projection optical element 303. The other of the light sources 4 is located on the −X axis side of the side surface 395*b* of the light guide projection optical element 303.

In FIGS. 11 and 12, the light sources 4 emit light in the +Z axis direction. The light sources 4 may be of any type, but the following description will be made on the assumption that the light sources 4 are LEDs, as described above.

The light sources 4 are the same as the light source 1. Thus, the description of the light source 1 applies to the light sources 4. However, the light emitting property or the like of the light sources 4 may be different from those of the light source 1.

<Condensing Optical Element 5>

Each condensing optical element 5 is located on the +Z axis side of the light source 4. In FIG. 11, the condensing optical element 5 is located on the −X axis side of the side surface 395*b* of the light guide projection optical element 303. In FIG. 12, one of the condensing optical elements 5 is located on the +X axis side of the side surface 395*a* of the light guide projection optical element 303. The other of the condensing optical elements 5 is located on the −X axis side of the side surface 395b of the light guide projection optical element 303.

Each condensing optical element 5 receives light emitted from the light source 4. Each condensing optical element 5 concentrates light forward (+Z axis direction). In FIGS. 11 and 12, the condensing optical elements 5 have positive power. Light concentration positions PR illustrated in FIGS. 11 and 12 are light concentration positions of the condensing optical elements 5.

The insides of the condensing optical elements 5 described in the second embodiment are filled with refractive material, for example.

In FIGS. 11 and 12, each condensing optical element 5 consists of the single condensing optical element 5, but may use multiple optical elements. However, use of multiple optical elements reduces manufacturability due to reasons, such as ensuring the accuracy of positioning of each optical element.

In the second embodiment, for example, the optical axes $C_4$ of the light sources 4 and the optical axes $C_5$ of the condensing optical elements 5 are parallel to the Z axis. In FIGS. 11 and 12, for example, the optical axes $C_4$ of the light sources 4 coincide with the optical axes $C_5$ of the condensing optical elements 5.

As in the first embodiment, when viewed in a Y-Z plane, the optical axis $C_1$ of the light source 1 and the optical axis $C_2$ of the condensing optical element 2 are inclined with respect to an optical axis $C_3$ of a light guide projection portion 303a. Thus, the $X_1Y_1Z_1$ coordinates are used when the light source 1 and condensing optical element 2 are described. On the other hand, when viewed in a Y-Z plane, the optical axes $C_4$ of the light sources 4 and the optical axes $C_5$ of the condensing optical elements 5 are parallel to optical axes $C_6$ of light guide projection portions 303b. Thus, the XYZ coordinates will be used to describe the light sources 4 and condensing optical elements 5.

For example, in some cases such as when the emitting surface 33 is a cylindrical surface having curvature in the Y axis direction, it is difficult to define the positions of the optical axes $C_6$ in the X axis direction. In such a case, the optical axis $C_6$ of each light guide projection portion 303b is assumed to be at a center between the side surface 395a or 395b and a side surface 395c. The side surfaces 395a, 395b, and 395c form end portions of the light guide projection portions 303b in the X axis direction. The side surfaces 395a and 395b are side surfaces of the light guide projection portions 303a.

In FIG. 12, the optical axis $C_6$ of the light guide projection portion 303b on the +X axis side is at a center between the side surface 395a and the side surface 395c. The optical axis $C_6$ of the light guide projection portion 303b on the −X axis side is at a center between the side surface 395b and the side surface 395c.

As described later, it is also possible to assume that the positions of the optical axes $C_6$ in the X axis direction are the positions of optical axes of lens shapes of incident surfaces 36 and the positions of the optical axes $C_6$ in the Y axis direction are the positions of optical axes of lens shapes of the emitting surfaces 33.

For example, the condensing optical elements 5 have the same configuration and function as the condensing optical elements 2. For example, each condensing optical element 5 includes the incident surfaces 511 and 512, reflecting surface 52, and emitting surfaces 531 and 532. Thus, the description of the condensing optical element 2 in the first embodiment applies to the condensing optical elements 5. However, optical properties, such as focal lengths, of the condensing optical elements 5 may be different from those of the condensing optical element 2.

<Light Guide Projection Optical Element 303>

The light guide projection optical elements 303 each include the light guide projection portion 303a and light guide projection portion or portions 303b.

Each light guide projection portion 303a has the same configuration as the light guide projection optical element 3. Each light guide projection portion 303a includes the reflecting surface 32. Also, each light guide projection portion 303a may include the incident surface 34. Thus, the description of the light guide projection optical element 3 in the first embodiment applies to the light guide projection portions 303a.

In each light guide projection portion 303a described in the second embodiment, a portion from the incident surface 31 to the reflecting surface 32 is a reflection portion $303a_1$. In the reflection portion $303a_1$, a light distribution pattern is formed. Thus, the reflection portion $303a_1$ is a light distribution pattern forming portion.

In each light guide projection portion 303a, a portion on the +Z axis side of the reflecting surface 32 is a light guide portion $303a_2$. The light guide portion $303a_2$ guides light emitted from the light source 1 by reflection. In the horizontal direction (X axis direction), the light guided by the light guide portion $303a_2$ is emitted at a divergence angle depending on the reflection in the light guide portion $303a2$.

Each light guide projection portion 303b is a light guide portion having a column shape. As described later, one side surface of each light guide projection portion 303b is connected to the light guide projection portion 303a. Each light guide projection portion 303b includes no reflecting surface 32 as in the light guide projection portions 303a. In the second embodiment, each light guide projection portion 303b includes no incident surface 34 as in the light guide projection portions 303a.

In FIG. 11, the light guide projection portion 303b is disposed on the −X axis direction side of the light guide projection portion 303a. In FIG. 12, the light guide projection portions 303b are disposed on the −X axis direction side and +X axis direction side of the light guide projection portion 303a.

Each light guide projection optical element 303 includes the light guide projection portion or portions 303b disposed along the light guide projection portion 303a formed with the pair of side surfaces 395a and 395b. Each light guide projection portion 303b is disposed along the light guide projection portion 303a. Each light guide projection portion 303a is disposed alongside the light guide projection portion or portions 303b. Each light guide projection portion 303a is disposed alongside the light guide projection portion or portions 303b in a direction perpendicular to a light guiding direction of the light guide projection portion 303a.

For example, each light guide projection portion 303b is disposed parallel to the light guide projection portion 303a. For example, the direction in which light emitted from the light sources 1 is guided by the light guide projection portions 303a is the same as the direction in which light emitted from the light sources 4 is guided by the light guide projection portions 303b.

The lengths of the light guide projection portions 303b in the Z axis direction are less than the lengths of the light guide projection portions 303a in the Z axis direction.

An emitting surface of each light guide projection portion 303b is formed in the same plane as an emitting surface of the light guide projection portion 303a. The emitting surface 33 of each light guide projection optical element 303 is an emitting surface of the light guide projection portion 303a and light guide projection portion or portions 303b.

The emitting surface 33 of each light guide projection optical element 303 includes the emitting surface 33a of the light guide projection portion 303a and the emitting surface or surfaces 33b of the light guide projection portion or portions 303b. The emitting surface 33a of each light guide projection portion 303a is one region of the emitting surface 33. The emitting surface 33b of each light guide projection portion 303b is one region of the emitting surface 33. The emitting surface 33a and emitting surface or surfaces 33b are formed as regions on the single surface (emitting surface 33).

Each emitting surface 33 has, for example, a cylindrical shape having positive power only in the Y axis direction. Each emitting surface 33 has a convex shape having curvature only in the Y axis direction. Each emitting surface 33 may be a toroidal surface.

As in the first embodiment, for example, in each light guide projection portion 303a, a focal position of the emitting surface 33 in the Y axis direction is located on the ridge line portion 321. In each light guide projection portion 303b, a focal position of the emitting surface 33 in the Y axis direction coincides with the light concentration position PR. In the Y axis direction, the light concentration position PR is in a conjugate relation with the irradiated surface 9.

"Focal position in the Y axis direction" refers to a focal position when light rays are viewed in a Y-Z plane. Likewise, "focal position in the X axis direction" refers to a focal position when light rays are viewed in a Z-X plane.

The incident surface 36 of each light guide projection portion 303b is a refractive surface. The incident surface 36 of each light guide projection portion 303b has, for example, positive power. In FIGS. 11 and 12, each incident surface 36 has a convex shape projecting in the −Z axis direction.

In FIGS. 11 and 12, for example, each incident surface 36 is a cylindrical surface having positive power only in the X axis direction. Each incident surface 36 has a convex shape having curvature only in the X axis direction.

Each incident surface 36 has positive power in the X axis direction. For example, a focal position of each incident surface 36 coincides with the light concentration position PR. In the Z axis direction, a focal position of each incident surface 36 coincides with the light concentration position PR. The Z axis direction is a direction in which light is guided by each light guide projection portion 303b. In the X axis direction, the light concentration position PR is in a conjugate relation with the irradiated surface 9.

The side surfaces 395c are side surfaces of the light guide projection portions 303b. A side of each light guide projection portion 303b opposite to the side surface 395c is connected to the light guide projection portion 303a. Light rays emitted from the light sources 1 enter the light guide projection portions 303b through the sides of the light guide projection portions 303b opposite to the side surfaces 395c.

In each of FIGS. 11 and 12, part of light rays emitted from the light source 1 enters the light guide projection portion or portions 303b after entering the light guide projection portion 303a and being reflected by the side surface 395a or side surface 395b. The light emitted from the light source 1 and entering the light guide projection portion or portions 303b is emitted from the emitting surface or surfaces 33b.

The inside of each light guide projection optical element 303 described in the second embodiment is filled with refractive material, for example.

<Behavior of Light Rays>

The behavior of light rays in the light source or sources 4, condensing optical element or elements 5 and light guide projection portion or portions 303b is the same between the headlight modules 110 and 120. Thus, description with reference to FIG. 12 will be omitted, and description will be made with reference to FIG. 11.

The behavior of light rays in the reflection portion $303a_1$ is the same as that in the reflection portion 3a of the first embodiment. Thus, the description of the reflection portion 3a in the first embodiment is substituted. Also, guide of light in the light guide portion $303a_2$ of the light guide projection portion 303a is the same as that in the light guide portion 3b. Thus, the description of the light guide portion 3b in the first embodiment is substituted.

As illustrated in FIG. 11, light emitted from the light source 4 is concentrated by the condensing optical element 5. The light concentrated by the condensing optical element 5 concentrates at the light concentration position PR.

The light passing through the light concentration position PR enters the light guide projection portion 303b through the incident surface 36. The light reaching the incident surface 36 is refracted at the incident surface 36. When the incident surface 36 is a cylindrical surface having positive power only in the X axis direction as described above, the light reaching the incident surface 36 is refracted only in the X axis direction.

In FIG. 11, as described above, the focal position of the incident surface 36 coincides with the light concentration position PR. Thus, when viewed in a Z-X plane, light rays entering through the incident surface 36 become parallel light, for example.

On the other hand, the incident surface 36 has no power in the Y axis direction. When viewed in a Y-Z plane, light rays entering through the incident surface 36 travel in a direction (the +Z axis direction) toward the emitting surface 33 without being reflected by a side surface on the +Y axis direction side of the light guide projection portion 303b or a side surface on the −Y axis direction side of the light guide projection portion 303b, for example. Thus, when viewed in a Y-Z plane, light rays entering through the incident surface 36 directly reach the emitting surface 33.

In the Y axis direction, the divergence angle of the light entering the light guide projection portion 303b from the light concentration position PR is an angle such that the light is not reflected by both side surfaces in the Y axis direction of the light guide projection portion 303b.

The light entering through the incident surface 36 is emitted from the emitting surface 33. The light entering through the incident surface 36 is emitted from the emitting surface 33b.

The optical path of a light ray depends on a medium in which the light propagates. When an optical path in air is assumed to be L, an optical path in a medium having a refractive index n (n>1) is n×L. This indicates that when a focal length in air is a distance L, a length of n×L is required as a focal length in the medium having the refractive index n. Thus, an optical path in the light guide projection optical element 303 is longer than an optical path in air.

By taking advantage of this nature, it is possible to make a focal position of the emitting surface 33 (emitting surface 33a) in the Y axis direction coincide with the ridge line portion 321, in the portion (light guide projection portion 303a) filled with refractive material, as described above. Simultaneously, it is possible to make a focal position of the emitting surface 33 (emitting surface 33b) in the Y axis direction coincide with the light concentration position PR in air (n=1).

As described above, in the second embodiment, the emitting surface 33 is a cylindrical surface. The emitting surface 33a has the same curvature as the emitting surface 33b. Thus, the emitting surface 33a has the same power as the emitting surface 33b.

This is because the length of the light guide projection portion 303b in the Z axis direction is less than the length of the light guide projection portion 303a in the Z axis direction. A space from the light concentration position PR to the incident surface 36 is in air (n=1).

The distance from the emitting surface 33 to the ridge line portion 321 is greater than the distance from the emitting surface 33 to the light concentration position PR.

As described above, the light concentration position PR is in a conjugate relation with the irradiated surface 9. The light concentration position PR is located at a position optically conjugate to the irradiated surface 9. Thus, an image of a light distribution pattern formed on the light concentration position PR by the condensing optical element 5 is magnified and projected by the light guide projection optical element 303 onto the irradiated surface 9 in front of the vehicle.

In the X axis direction, the light distribution pattern formed at the light concentration position PR is projected by the incident surface 36 onto the irradiated surface 9. In the Y axis direction, the light distribution pattern formed at the light concentration position PR is projected by the emitting surface 33 (emitting surface 33b) onto the irradiated surface 9. That is, the light guide projection portion 303b projects the light distribution pattern. In the second embodiment, the light distribution pattern is formed at a position of the light concentration position PR.

Thus, the light source 4 and condensing optical element 5 form a light distribution pattern on the light concentration position PR, and thereby can project the light distribution pattern onto the irradiated surface 9. The headlight modules 110 and 120 can illuminate an area to be illuminated by the high beam.

Further, by adjusting the light concentration position of the light emitted from the condensing optical element 5, it is possible to change the light distribution of the high beam. Further, by adjusting the geometric relationship between the condensing optical element 5 and the light guide projection optical element 303, it is possible to change the light distribution of the high beam.

"Adjusting the geometric relationship" refers to, for example, adjusting the positional relationship between the condensing optical element 5 and the light guide projection optical element 303 in the direction (Z axis direction) of the optical axis $C_6$. Depending on the positional relationship between the condensing optical element 5 and the light guide projection optical element 303 in the direction of the optical axis $C_6$, the size of the light concentration spot of light concentrated by the condensing optical element 5 on the light concentration position PR varies. That is, the light beam diameter of light concentrated by the condensing optical element 5 on the light concentration position PR varies. Accordingly, the light distribution on the irradiated surface 9 varies.

As can be seen from FIGS. 11 and 12, light rays emitted from the light source 1 are emitted from the entire area of the emitting surface 33. The light rays emitted from the light source 1 are emitted from the emitting surface 33a and emitting surface or surfaces 33b. The light rays emitted from the light source 1 are light rays of the low beam. Also, light rays (light rays of the high beam) emitted from the light source or sources 4 are emitted from the emitting surface 33. The light rays (light rays of the high beam) emitted from the light source or sources 4 are emitted from the emitting surface or surfaces 33b. The light rays emitted from the light source or sources 4 are light rays of the high beam.

In the emitting surface 33, the emitting region of the light rays emitted from the light source 1 and the emitting region of the light rays emitted from the light source or sources 4 overlap each other. Thus, the light emitting region on the emitting surface 33 when only the low beam is lighted is the same as the light emitting region on the emitting surface 33 when both the low beam and high beam are lighted.

Thus, the headlight modules 110 and 120 according to the second embodiment can improve the design when the headlight device is lighted.

As above, with the headlight modules 110 and 120 according to the second embodiment, it is possible to easily form the light distribution pattern of the low beam and the light distribution pattern of the high beam with the same headlight module. It is not necessary to separately provide a headlight module for the high beam and a headlight module for the low beam. This makes it possible to provide a headlight device smaller than a conventional headlight device.

By disposing the multiple light sources 4 and multiple condensing optical elements 5 as in the headlight module 120 illustrated in FIG. 12, it is possible to increase the amount of light without providing multiple headlight modules 110. Thus, it is possible to downsize a headlight device 10.

The headlight modules 110 and 120 according to the second embodiment can form a wide light distribution pattern, as in the first embodiment.

In the headlight module 110 illustrated in FIG. 11 and the headlight module 120 illustrated in FIG. 12, the emitting surface 33 is provided with refractive power. In the headlight modules 110 and 120, the light guide projection optical element 303 is provided with a projecting function. This is to improve manufacturability by integration of components.

For example, it is possible to form the emitting surface 33 into a flat surface and additionally provide a projection optical element, such as a projection lens.

Figure 16:
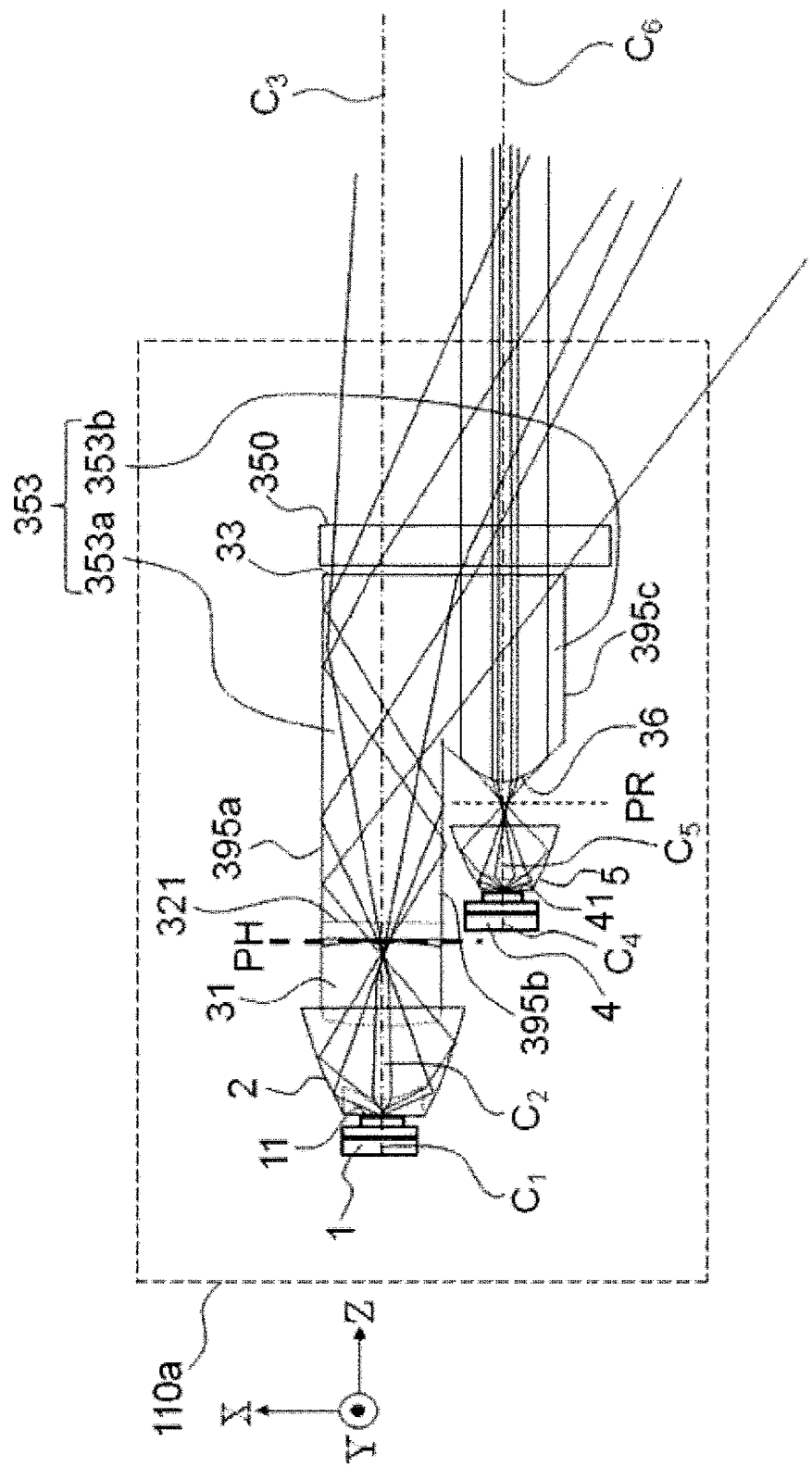
FIG. 16 is a configuration diagram illustrating a configuration of a headlight module 110a according to the second embodiment.
Figure 17:
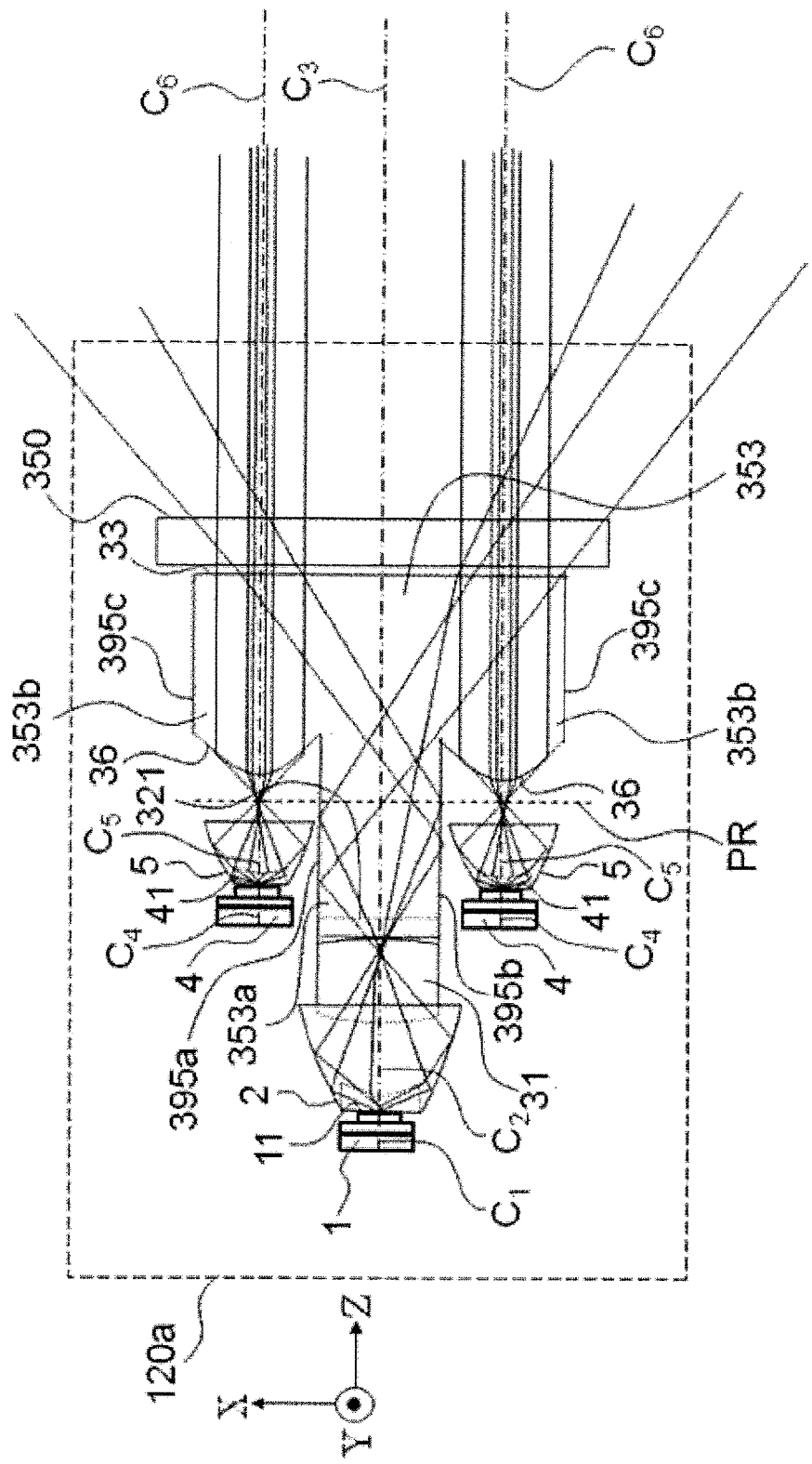
FIG. 17 is a configuration diagram illustrating a configuration of a headlight module 120a according to the second embodiment.

FIGS. 16 and 17 are configuration diagrams illustrating configurations of the headlight modules 110a and 120a in which the emitting surface 33 is formed into a flat surface and a projection optical element 350, such as a projection lens, is additionally provided, for example. The headlight modules 110a and 120a are modification examples of the headlight modules 110 and 120.

A light guide projection optical element 353 of the headlight module 110a is obtained by forming the emitting surface 33 of the light guide projection optical element 303 illustrated in FIG. 11 into, for example, a flat surface and providing the projection optical element 350 with the projecting function of the emitting surface 33 of the light guide projection optical element 303. A light guide projection optical element 353 of the headlight module 120a is obtained by forming the emitting surface 33 of the light guide projection optical element 303 illustrated in FIG. 12 into, for example, a flat surface and providing the projection optical element 350 with the projecting function of the emitting surface 33 of the light guide projection optical element 303.

Each projection optical element 350 is disposed, for example, on the +Z axis side of the emitting surface 33.

Light emitted from each emitting surface 33 is incident on the projection optical element 350.

Each projection optical element 350 is provided with all or part of the projecting function of the emitting surface 33 of the light guide projection optical element 303. The headlight module 110a or 120a illustrated in FIG. 16 or 17 implements the function of the emitting surface 33 of the light guide projection optical element 303 by means of the projection optical element 350 and the emitting surface 33. Thus, as the description of the function or the like thereof, the description of the emitting surface 33 in the second embodiment is used.

In the headlight module 110a or 120a illustrated in FIG. 16 or 17, it is possible to provide the emitting surface 33 with refractive power and implement the function of the emitting surface 33 of the light guide projection optical element 303 illustrated in FIG. 11 or 12 by means of the combination of the emitting surface 33 and projection optical element 350.

An optical axis $C_3$ is an optical axis of a portion having a projecting function. Thus, when the emitting surface 33 is a flat surface, the optical axis $C_3$ is an optical axis of the projection optical element 350. When the emitting surface 33 and projection optical element 350 have the projecting function, the optical axis $C_3$ is an optical axis of a combined lens obtained by combining the emitting surface 33 and projection optical element 350. The portion having the projecting function is referred to as a projection optical portion.

In the case of the headlight module 120, by performing a control for individually turning on the light sources 4 or a control for individually turning off the light sources 4, it is possible to select an illuminated area in front of the vehicle. Thus, it is possible to provide the headlight module 120 with an adaptive driving beam (ADB) function.

"ADB" refers to a headlight that, when an oncoming vehicle or the like appears in front of the vehicle, detects the position of the forward vehicle by means of an in-vehicle camera or the like and illuminates the other region with the high beam without illuminating the region. The ADB makes it easy to perceive pedestrians on both sides of the road, without dazzling an oncoming vehicle or a preceding vehicle. When the ADB is used, it looks like an ordinary low beam and is not dazzling as viewed from an oncoming vehicle.

Although the light sources 4 have been described as light sources for the high beam, their use is not limited to the high beam. For example, they may be used as light sources for the low beam. When multiple light distribution patterns are combined to form the light distribution of the low beam, the headlight modules 110 and 120 may include multiple light sources 1 and 4 for the low beam. Thus, to form different light distribution patterns, it is not necessary to provide multiple headlight modules. This makes it possible to provide a headlight device smaller than a conventional headlight device.

For example, it is possible to further brighten the brightest region 93 illustrated in FIG. 4 using the light source or sources 4.

The projection optical element 350 that receives light (first light) emitted from the emitting surface 33a (first emitting surface), receives light (second light) emitted from the emitting surface or surfaces 33b (second emitting surface or surfaces), and projects the light distribution patterns is provided. The projection optical element 350 is a projection optical portion that projects the light distribution patterns.

The projection optical element 350 that receives light (first light) emitted from the emitting surface 33a (first emitting surface), receives light (second light) emitted from the emitting surface or surfaces 33b (second emitting surface or surfaces), and projects the light distribution patterns together with the emitting surface 33a and emitting surface or surfaces 33b is provided. The emitting surface 33a, emitting surface or surfaces 33b, and projection optical element 350 are a projection optical portion that projects the light distribution patterns.

Third Embodiment

Figure 13:
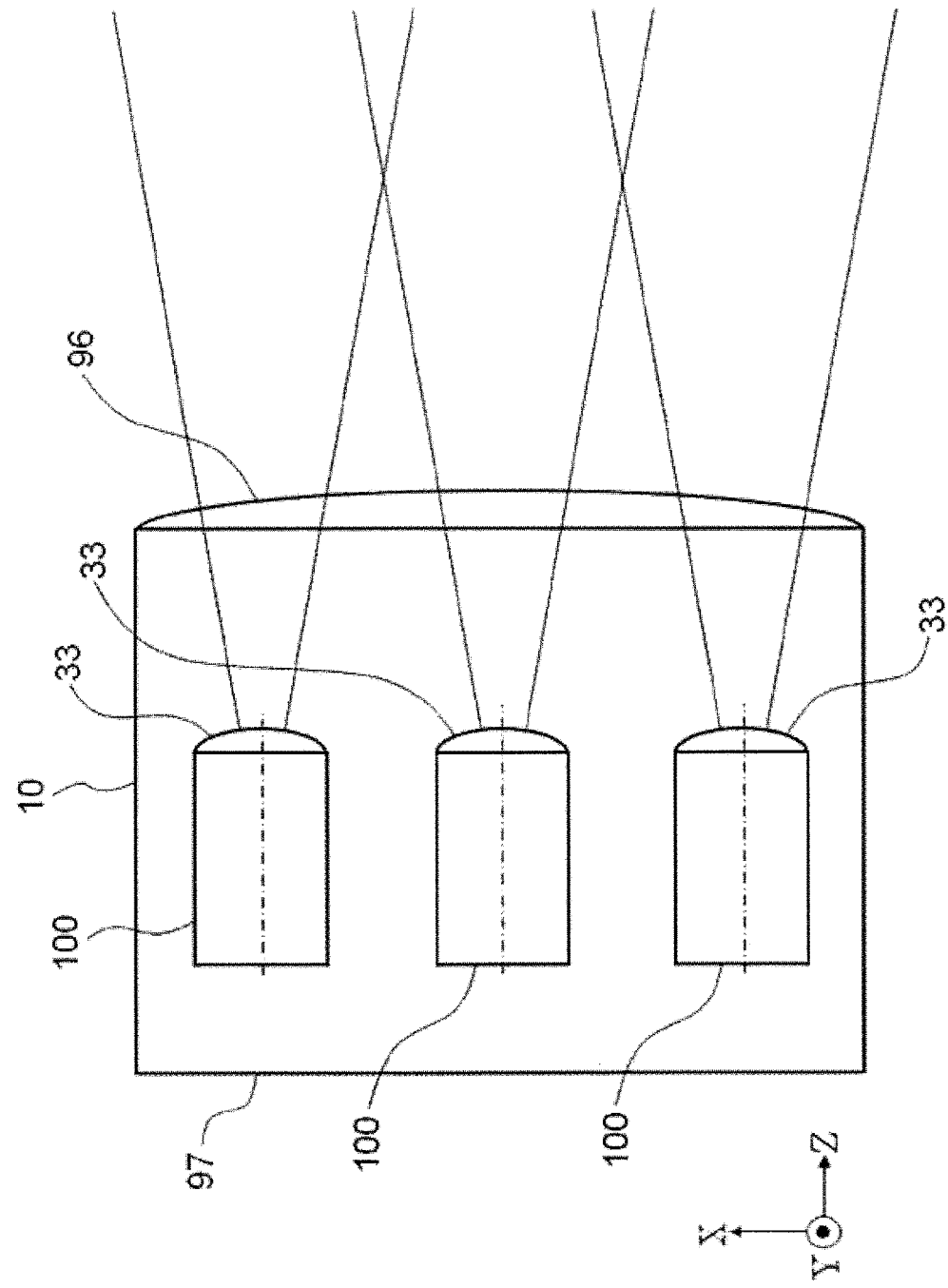
FIG. 13 is a configuration diagram of a headlight device 10 according to a third embodiment in which a plurality of the headlight modules 100 are installed.

FIG. 13 is a configuration diagram of a headlight device 10 including a plurality of the headlight modules 100.

In the above-described embodiments, the embodiments of the headlight modules 100, 110, 120, 100a, 110a, and 120a have been described. FIG. 13 illustrates, as an example, an example in which the multiple headlight modules 100 are installed.

For example, all or a subset of the three headlight modules 100 illustrated in FIG. 13 may be replaced with the headlight module 110 or 120.

The headlight device 10 includes a housing 97. The headlight device 10 may also include a cover 96.

The housing 97 holds the headlight modules 100.

The housing 97 is disposed inside a vehicle body.

The headlight modules 100 are housed inside the housing 97. In FIG. 13, as an example, the three headlight modules 100 are housed. The number of headlight modules 100 is not limited to three. The number of headlight modules 100 may be one or three or more.

The headlight modules 100 are arranged in the X axis direction inside the housing 97. Arrangement of the headlight modules 100 is not limited to the arrangement in the X axis direction. In view of the design, function, or the like, the headlight modules 100 may be displaced from each other in the Y or Z axis direction.

In FIG. 13, the headlight modules 100 are housed inside the housing 97. However, the housing 97 need not have a box shape. The housing 97 may consist of a frame or the like and have a configuration in which the headlight modules 100 are fixed to the frame. This is because in the case of a four-wheeled automobile or the like, the housing 97 is disposed inside the vehicle body. The frame or the like may be a part constituting the vehicle body. In this case, the housing 97 is a housing part that is a part constituting the vehicle body.

In the case of a motorcycle, the housing 97 is disposed near the handlebar. In the case of a four-wheeled automobile, the housing 97 is disposed inside the vehicle body.

The cover 96 transmits light emitted from the headlight modules 100. The light passing through the cover 96 is emitted in front of the vehicle. The cover 96 is made of transparent material.

The cover 96 is disposed at a surface part of the vehicle body and exposed on the outside of the vehicle body.

The cover 96 is disposed on the +Z axis side of the housing 97.

Light emitted from the headlight modules 100 passes through the cover 96 and is emitted in front of the vehicle. In FIG. 13, the light emitted from the cover 96 is superposed with light emitted from the adjacent headlight modules 100 to form a single light distribution pattern.

The cover 96 is provided to protect the headlight modules 100 from weather, dust, or the like. However, if the emitting surfaces 33 of the light guide projection optical elements 3 are configured to protect the components inside the headlight modules 100 from weather, dust, or the like, there is no need to provide the cover 96.

As described above, when the headlight device 10 includes a plurality of the headlight modules 100, 110, 120, 100a, 110a, or 120a, it is an assembly of the headlight modules 100, 110, 120, 100a, 110a, or 120a. When the headlight device 10 has a single headlight module 100, 110, or 120, it is equal to the headlight module 100, 110, 120, 100a, 110a, or 120a. That is, the headlight module 100, 110, 120, 100a, 110a, or 120a is the headlight device 10.

The above-described embodiments use terms, such as "parallel" or "perpendicular", indicating the positional relationships between parts or the shapes of parts. These terms are intended to include ranges taking account of manufacturing tolerances, assembly variations, or the like. Thus, recitations in the claims indicating the positional relationships between parts or the shapes of parts are intended to include ranges taking account of manufacturing tolerances, assembly variations, or the like.

Further, although the embodiments of the present invention have been described as above, the present invention is not limited to these embodiments.

Based on the above embodiments, the content of the invention will be described below as Appendixes (1) and (2). In Appendixes (1) and (2), numbering is made independently. Thus, for example, Appendixes (1) and (2) each include "Appendix 1."

It is possible to combine features in Appendix (1) and features in Appendix (2).

<Appendix (1)>
<Appendix 1>
A headlight module comprising:
a first light source for emitting first light; and
an optical element including a first reflecting surface for reflecting the first light, a first emitting surface for emitting the reflected light reflected by the first reflecting surface, and a pair of side surfaces, wherein
the first emitting surface has refractive power for projecting the reflected light;
a plane including an optical axis of the first emitting surface and being perpendicular to the first reflecting surface is a first plane, and a plane parallel to the optical axis and perpendicular to the first plane is a second plane;
the pair of side surfaces is disposed so that the first plane is sandwiched between the pair of side surfaces, between the first reflecting surface and the first emitting surface; and
when the reflected light is projected onto the first plane, the reflected light reaches the first emitting surface without undergoing further reflection after being reflected by the first reflecting surface, and when the reflected light is projected onto the second plane, the reflected light is reflected by the side surfaces and reaches the first emitting surface.

<Appendix 2>
The headlight module of Appendix 1, wherein
in a direction of the optical axis, a first focal point of the first emitting surface projected on the first plane is located on the first emitting surface side of a position where the first light is reflected by the first reflecting surface; and
in the direction of the optical axis, a second focal point of the first emitting surface projected on the second plane is located on the first reflecting surface side of a position where reflection of the reflected light by the side surfaces ends, or the first emitting surface has negative refractive power in the second plane.

<Appendix 3>
The headlight module of Appendix 2, wherein
a curvature of the first emitting surface projected on the first plane is a first curvature, and a curvature of the first emitting surface projected on the second plane is a second curvature; and
the second curvature is less than the first curvature.

<Appendix 4>
The headlight module of Appendix 3, wherein the first emitting surface is a cylindrical surface having the first curvature.

<Appendix 5>
A headlight module comprising:
a first light source for emitting first light;
an optical element including a first reflecting surface for reflecting the first light, a first emitting surface for emitting the reflected light reflected by the first reflecting surface, and a pair of side surfaces; and
a projection optical element for projecting the reflected light emitted from the optical element, wherein
a plane including an optical axis of the projection optical element and being perpendicular to the first reflecting surface is a first plane, and a plane parallel to the optical axis and perpendicular to the first plane is a second plane;
the pair of side surfaces is disposed so that the first plane is sandwiched between the pair of side surfaces, between the first reflecting surface and the first emitting surface; and
when the reflected light is projected onto the first plane, the reflected light reaches the projection optical element without undergoing further reflection after being reflected by the first reflecting surface, and when the reflected light is projected onto the second plane, the reflected light is reflected by the side surfaces and reaches the first emitting surface.

<Appendix 6>
The headlight module of Appendix 5, wherein
in a direction of the optical axis, a first focal point of the projection optical element projected on the first plane is located on the first emitting surface side of a position where the first light is reflected by the first reflecting surface; and
in the direction of the optical axis, a second focal point of the projection optical element projected on the second plane is located on the first reflecting surface side of the first emitting surface, or the projection optical element has negative refractive power in the second plane.

<Appendix 7>
The headlight module of Appendix 6, wherein
a refractive power of the projection optical element in the first plane is a first refractive power, and a refractive power of the projection optical element in the second plane is a second refractive power; and
the second refractive power is less than the first refractive power.

<Appendix 8>
The headlight module of Appendix 7, wherein the projection optical element is a cylindrical surface having the first refractive power.

<Appendix 9>
The headlight module of any one of Appendixes 1 to 8, wherein the first reflecting surface is inclined to face toward the first emitting surface in a direction of the optical axis.

<Appendix 10>
The headlight module of any one of Appendixes 1 to 9, wherein
the optical element includes a second light guide portion disposed along a first light guide portion formed by the pair of side surfaces; and
an emitting surface of the second light guide portion is the same as the first emitting surface.

<Appendix 11>

The headlight module of Appendix 10, wherein the first emitting surface side of the second light guide portion is connected to the first light guide portion, and the first light guided in the first light guide portion enters the second light guide portion.

<Appendix 12>

The headlight module of Appendix 10 or 11, wherein
the second light guide portion includes a second incident surface; and
a third curvature of the second incident surface projected on the first plane is less than a fourth curvature of the second incident surface projected on the second plane.

<Appendix 13>

The headlight module of Appendix 12, wherein the second incident surface of the second light guide portion is a cylindrical surface having the fourth curvature.

<Appendix 14>

The headlight module of any one of Appendixes 10 to 13, further comprising a second light source for emitting second light,
wherein the second light enters the second light guide portion.

<Appendix 15>

A headlight device comprising the headlight module of any one of Appendixes 1 to 14.

<Appendix (2)>
<Appendix 1>

A headlight module for a vehicle for forming a light distribution pattern and projecting the light distribution pattern, the headlight module comprising:
a first light source for emitting first light; and
an optical element including a reflecting surface for reflecting the first light and a first light guide portion for guiding the first light reflected by the reflecting surface, wherein
in a direction corresponding to a vertical direction of the vehicle, a part of the first light that has been reflected by the reflecting surface and another part of the first light that has not been reflected by the reflecting surface are superposed to form a high luminous intensity region, and the light distribution pattern including the high luminous intensity region is projected; and
in a direction corresponding to a horizontal direction of the vehicle, the first light reflected in the first light guide portion is emitted.

<Appendix 2>

The headlight module of Appendix 1, wherein the reflecting surface is inclined in a direction such that an optical path in the optical element becomes wider.

<Appendix 3>

The headlight module of Appendix 1 or 2, further comprising a second light guide portion disposed alongside the first light guide portion.

<Appendix 4>

The headlight module of Appendix 3, further comprising a second light source for emitting second light,
wherein the second light guide portion guides the second light.

<Appendix 5>

A headlight module for a vehicle for forming a light distribution pattern and projecting the light distribution pattern, the headlight module comprising:
a first light source for emitting first light;
a second light source for emitting second light; and
an optical element including a first light guide portion for guiding the first light and a second light guide portion for guiding the second light,
wherein the first light guide portion and the second light guide portion are disposed alongside each other.

<Appendix 6>

The headlight module of Appendix 5, wherein
in a direction corresponding to a vertical direction of the vehicle, the light distribution pattern formed by the first light entering the first light guide portion is projected; and
in a direction corresponding to a horizontal direction of the vehicle, the first light reflected in the first light guide portion is emitted.

<Appendix 7>

The headlight module of Appendix 4 or 5, wherein the light distribution pattern formed by the second light incident on the second light guide portion is projected.

<Appendix 8>

The headlight module of any one of Appendixes 4 to 7, wherein the first light guide portion includes a pair of side surfaces in a direction corresponding to the horizontal direction.

<Appendix 9>

The headlight module of Appendix 8, wherein the first light is guided by being reflected by the pair of side surfaces.

<Appendix 10>

The headlight module of any one of Appendixes 4 to 9, wherein in a direction corresponding to the horizontal direction, a divergence angle of the first light emitted from the optical element depends on reflection in the first light guide portion.

<Appendix 11>

The headlight module of any one of Appendixes 4 to 10, wherein the second light guide portion includes a second emitting surface.

<Appendix 12>

The headlight module of Appendix 11, wherein the second emitting surface emits the second light.

<Appendix 13>

The headlight module of Appendix 11 or 12, wherein the second emitting surface side of the second light guide portion is connected to the first light guide portion, and the first light guided in the first light guide portion enters the second light guide portion.

<Appendix 14>

The headlight module of any one of Appendixes 1 to 13, wherein the first light entering the second light guide portion is emitted from the second emitting surface.

<Appendix 15>

The headlight module of any one of Appendixes 4 to 10, wherein the first light guide portion includes a first emitting surface from which the first light is emitted.

<Appendix 16>

The headlight module of Appendix 15, wherein the second light guide portion includes a second emitting surface.

<Appendix 17>

The headlight module of Appendix 16, wherein the second emitting surface is formed in the same plane as the first emitting surface.

<Appendix 18>

The headlight module of Appendix 16 or 17, wherein the second light is emitted from the second emitting surface.

<Appendix 19>

The headlight module of any one of Appendixes 16 to 18, wherein the second emitting surface side of the second light guide portion is connected to the first light guide portion, and the first light guided in the first light guide portion enters the second light guide portion.

<Appendix 20>
The headlight module of any one of Appendixes 16 to 19, wherein the first light entering the second light guide portion is emitted from the second emitting surface.

<Appendix 21>
The headlight module of any one of Appendixes 15 to 20, wherein the first emitting surface has positive power.

<Appendix 22>
The headlight module of any one of Appendixes 15 to 21, wherein the first emitting surface is a projection optical portion for projecting the light distribution pattern.

<Appendix 23>
The headlight module of any one of Appendixes 15 to 20, further comprising a projection optical element for receiving the first light emitted from the first emitting surface and projecting the light distribution pattern,
wherein the projection optical element is a projection optical portion for projecting the light distribution pattern.

<Appendix 24>
The headlight module of any one of Appendixes 15 to 20, further comprising a projection optical element for projecting the light distribution pattern together with the first emitting surface,
wherein the first emitting surface and the projection optical element are a projection optical portion for projecting the light distribution pattern.

<Appendix 25>
The headlight module of any one of Appendixes 16 to 20, further comprising a projection optical element for receiving the first light emitted from the optical element and the second light emitted from the optical element and projecting the light distribution pattern,
wherein the projection optical element is a projection optical portion for projecting the light distribution pattern.

<Appendix 26>
The headlight module of any one of Appendixes 16 to 20, further comprising a projection optical element for receiving the first light emitted from the optical element and the second light emitted from the optical element and projecting the light distribution pattern together with the first emitting surface and the second emitting surface,
wherein the first emitting surface, the second emitting surface, and the projection optical element are a projection optical portion for projecting the light distribution pattern.

<Appendix 27>
The headlight module of any one of Appendixes 22 to 26, wherein
in a direction of an optical axis of the projection optical portion in the first light guide portion, a first focal point of the projection optical portion in a direction corresponding to the vertical direction is located on the projection optical portion side of a position where the light distribution pattern is formed by the first light; and
in the direction of the optical axis of the projection optical portion in the first light guide portion, a second focal point of the projection optical portion in a direction corresponding to the horizontal direction is located on the same side of a position where reflection of the first light in the first light guide portion ends as a position where the light distribution pattern of the first light is formed, or a power of the projection optical portion in a direction corresponding to the horizontal direction is negative.

<Appendix 28>
The headlight module of any one of Appendixes 22 to 27, wherein a power of the projection optical portion in a direction corresponding to the vertical direction is greater than a power of the projection optical portion in a direction corresponding to the horizontal direction.

<Appendix 29>
The headlight module of any one of Appendixes 22 to 28, wherein the projection optical portion has no power in a direction corresponding to the horizontal direction.

<Appendix 30>
The headlight module of any one of Appendixes 4 to 29, wherein the second light guide portion includes a second incident surface.

<Appendix 31>
The headlight module of Appendix 30, wherein the second light enters the second light guide portion through the second incident surface.

<Appendix 32>
The headlight module of Appendix 30 or 31, wherein a curvature of the second incident surface in a direction corresponding to the vertical direction is greater than a curvature of the second incident surface in a direction corresponding to the horizontal direction.

<Appendix 33>
The headlight module of any one of Appendixes 30 to 32, wherein a power of the second incident surface in a direction corresponding to the vertical direction is greater than a power of the second incident surface in a direction corresponding to the horizontal direction.

<Appendix 34>
The headlight module of any one of Appendixes 30 to 33, wherein the second incident surface is a cylindrical surface.

<Appendix 35>
The headlight module of any one of Appendixes 5 to 34, wherein the optical element includes a reflecting surface for reflecting the first light emitted from the first light source.

<Appendix 36>
The headlight module of Appendix 35, wherein the reflecting surface forms the light distribution pattern including a high luminous intensity region formed by superposition of a part of the first light that has been reflected by the reflecting surface and another part of the first light that has not been reflected by the reflecting surface.

<Appendix 37>
A headlight device comprising the headlight module of any one of Appendixes 1 to 36.

REFERENCE SIGNS LIST

100, 110, 120, 100a, 110a, 120a headlight module, 10 headlight device, 1, 4 light source, 11 light emitting surface, 2, 5 condensing optical element, 211, 212 incident surface, 22 reflecting surface, 231, 232 emitting surface, 3, 30, 300, 301, 302, 303, 353 light guide projection optical element, 303a, 303b, 353a, 353b light guide projection portion, 31, 34, 36 incident surface, 32 reflecting surface, 321 ridge line portion, 33, 330 emitting surface, 395, 395a, 395b side surface, 350 projection optical element, 9 irradiated surface, 91 cutoff line, 92 region on the lower side of the cutoff line, 93 brightest region, a angle, $C_1, C_2, C_3, C_4$ optical axis, d angle, $m_1, m_2, m_3, m_4$ perpendicular line, PH, PR light concentration position, PC conjugate plane, $S_1, S_3, S_4, S_6$ incident angle, $S_2, S_5$ reflection angle, $S_{out}, S_{out1}, S_{out2}$ emission angle.

The invention claimed is:
1. A headlight module for a vehicle for forming a light distribution pattern and projecting the light distribution pattern, the headlight module comprising:

a first light source for emitting first light;
a second light source for emitting second light;
an optical element including a first light guide portion for guiding the first light and a second light guide portion for guiding the second light; and
a condensing optical element for concentrating the second light emitted from the second light source, wherein
an emitting surface of the optical element includes a first region and a second region;
the first light is emitted from the first region and the second region;
the second light is emitted from the second region;
the first light guide portion and the second light guide portion are disposed alongside each other;
a second region side of the second light guide portion is connected to the first light guide portion, and the first light guided by the first light guide portion enters the second light guide portion;
the light distribution pattern includes a distribution pattern formed at a light concentration position of the condensing optical element, and the light distribution pattern formed at the light concentration position is projected;
the second light guide portion includes an incident surface for receiving the second light;
the emitting surface has a cylindrical shape having positive refractive power in a vertical direction of the vehicle;
the incident surface has a cylindrical shape having positive refractive power in a horizontal direction of the vehicle;
a focal position of the emitting surface coincides with the light concentration position; and
a focal position of the incident surface coincides with the light concentration position.

2. A headlight module for a vehicle for forming a light distribution pattern and projecting the light distribution pattern, the headlight module comprising:

a first light source for emitting first light;
a second light source for emitting second light;
an optical element including a first light guide portion for guiding the first light and a second light guide portion for guiding the second light; and
a condensing optical element for concentrating the second light emitted from the second light source, wherein
an emitting surface of the optical element includes a first region and a second region;
the first light is emitted from the first region and the second region;
the second light is emitted from the second region;
the first light guide portion and the second light guide portion are disposed alongside each other;
a second region side of the second light guide portion is connected to the first light guide portion, and the first light guided by the first light guide portion enters the second light guide portion;
the light distribution pattern includes distribution pattern formed at a light concentration position of the condensing optical element, and the light distribution pattern formed at the light concentration position is projected;
the second light guide portion includes an incident surface for receiving the second light;
the emitting surface has a toroidal shape having positive refractive power in a vertical direction of the vehicle;
the incident surface has a cylindrical shape having positive refractive power in a horizontal direction of the vehicle;
a focal position of the emitting surface due to the positive refractive power in the vertical direction of the vehicle coincides with the light concentration position; and
a focal position of the incident surface coincides with the light concentration position.

* * * * *